United States Patent [19]
Limpaecher

[11] Patent Number: 5,986,907
[45] Date of Patent: Nov. 16, 1999

[54] METHOD AND APPARATUS FOR RECTIFICATION DERECTIFICATION AND POWER FLOW CONTROL

[76] Inventor: Rudolf Limpaecher, 45 Parsonage Ln., Topsfield, Mass. 01983

[21] Appl. No.: 08/973,249

[22] PCT Filed: Jun. 21, 1996

[86] PCT No.: PCT/US96/10740

§ 371 Date: Apr. 1, 1998

§ 102(e) Date: Apr. 1, 1998

[87] PCT Pub. No.: WO97/01213

PCT Pub. Date: Jan. 9, 1997

[51] Int. Cl.⁶ .................................................. H02M 3/18
[52] U.S. Cl. .............................................. 363/61; 363/140
[58] Field of Search ............................... 363/61, 62, 140; 307/109, 110; 320/166

[56] References Cited

U.S. PATENT DOCUMENTS

| | | |
|---|---|---|
| 3,366,799 | 1/1968 | Fitch . |
| 3,505,586 | 4/1970 | Dulin . |
| 3,663,940 | 5/1972 | Schwarz . |
| 3,678,362 | 7/1972 | Amberger et al. . |
| 3,743,914 | 7/1973 | Holz . |
| 3,805,143 | 4/1974 | Tauern et al. . |
| 3,808,512 | 4/1974 | Sakka . |
| 3,839,666 | 10/1974 | Kitaev . |
| 3,849,717 | 11/1974 | Walz et al. . |
| 3,878,449 | 4/1975 | Wilhelmi et al. . |
| 4,079,265 | 3/1978 | Woodburn . |
| 4,274,134 | 6/1981 | Johannessen . |
| 4,460,953 | 7/1984 | Fukushima et al. . |
| 4,523,269 | 6/1985 | Baker et al. . |
| 4,524,289 | 6/1985 | Hammond et al. . |
| 4,636,930 | 1/1987 | Bingham et al. . |
| 4,642,476 | 2/1987 | Honig . |
| 4,649,468 | 3/1987 | Cubbison, Jr. . |
| 4,675,795 | 6/1987 | Takamura et al. . |
| 4,797,899 | 1/1989 | Fuller et al. . |
| 4,807,104 | 2/1989 | Floyd et al. . |

(List continued on next page.)

FOREIGN PATENT DOCUMENTS

| | | |
|---|---|---|
| 20 52 382 | 4/1972 | Germany . |
| 1087933 | 10/1961 | United Kingdom . |
| 975911 | 5/1962 | United Kingdom . |
| 988777 | 1/1963 | United Kingdom . |
| 988778 | 1/1963 | United Kingdom . |
| 1161250 | 12/1966 | United Kingdom . |
| 1161347 | 10/1967 | United Kingdom . |
| 2 104 737 | 8/1981 | United Kingdom . |

OTHER PUBLICATIONS

Crouch et al., "A Compact High Speed Low Impedance Blumlein Line for High Voltage Pulse Shaping", The Review of Scientific Instruments, vol. 43, No. 4, Apr. 1972, pp. 632–637.

Kuffel et al., "High–Voltage Engineering", Applied Electricity and Electronics, Pergamon Press, 1984, pp. 12–23, 64–79.

Von Bergmann, "Photo–Preionization Stabilized High–Pressure Glow–Discharge Lasers", University of Natal, 1980, Ph.D. Thesis, pp. 90–99, 176–178.

(List continued on next page.)

Primary Examiner—Shawn Riley
Attorney, Agent, or Firm—Fish & Richardson P.C.

[57] ABSTRACT

A method of transferring energy from a power source into an output node including the steps of separately charging each of a plurality of energy storage elements from the power source; after the plurality of energy storage elements are charged, discharging a selected one of the energy storage elements through an inductive element into the output node; and as the selected energy storage element is being discharged through the inductive element, when its voltage reaches a preselected value, discharging another one of the energy storage elements through the inductive element into the output node.

6 Claims, 27 Drawing Sheets

U.S. PATENT DOCUMENTS

| | | |
|---|---|---|
| 4,812,961 | 3/1989 | Essaff et al. . |
| 4,882,665 | 11/1989 | Choi et al. . |
| 5,119,010 | 6/1992 | Shirata et al. . |
| 5,270,913 | 12/1993 | Limpaecher . |
| 5,345,376 | 9/1994 | Nourbukhsh . |
| 5,357,419 | 10/1994 | Limpaecher . |
| 5,473,526 | 12/1995 | Svensson et al. . |
| 5,608,614 | 3/1997 | Ohnishi et al. . |
| 5,764,501 | 6/1998 | Limpaecher ............................... 363/61 |

OTHER PUBLICATIONS

Klaassens et al., "Three–Phase AC–to–AC Series–Resonant Power Converter with a Reduced Number of Thyristors", IEEE, vol. 6, No. 3, Jul. 1991, pp. 346–355.

Wernekinck et al., "A High Frequency AC/DC Converter with Unity Power Factor and Minimum Harmonic Distortion", IEEE, vol. 6, No. 3, Jul. 1991, pp. 364–370.

Redl et al., "A Novel Soft–Switching Full–Bridge DC/DC Converter: Analysis, Design Considerations, and Experimental Results at 1.5 kW, 100 kHz", IEEE, vol. 6, No. 3, Jul. 1991, pp. 408–418.

Fitch et al., "Novel Principle of Transient High Voltage Generation", Proceedings, vol. 111, Apr. 1964, pp. 849–855.

Fitch, "Mark—and Mark Like—High Voltage Generators", Maxwell Laboratories, Inc., pp. 190–198 (1970).

Skeist et al., "Recent Advances in High Power, High Voltage Technology", The Power Sources Conference, 1984.

Malesani et al., "Active Power Filter with Hybrid Energy Storage", IEEE, vol. 6, No. 3, Jul. 1991, pp. 392–397.

Bellar et al., "Analysis of the Dynamic and Steady–State Performance of Cockcroft–Walton Cascade Rectifiers", IEEE, vol. 7, No. 3, Jul. 1992, pp. 526–534.

Joos et al., "Performance Analysis of a PWM Inverter VAR Compensator", IEEE, vol. 6, No. 3, Jul. 1991, pp. 380–391.

METHOD AND APPARATUS FOR RECTIFICATION DERECTIFICATION AND POWER FLOW CONTROL

BACKGROUND OF THE INVENTION

The invention relates to AC to DC power conversion, rectification, derectification, and power flow control.

Standard rectification using diode brides causes both harmonics and a reactive power on the AC line. This is because power is drawn from the line when its AC voltage is higher than the output voltage and no power is drawn from the line when its AC voltage is lower than the output voltage. This uneven loading of the line throughout the AC cycle introduces harmonics onto the line. Current is only drawn out of the system when the voltage is high relative to the output voltage. As a consequence, conventional bridge or half wave rectification techniques seriously distort the input waveform. This problem is solved by using harmonic filters and capacitors to eliminate the harmonics. In addition, filtering is added on the DC side to reduce ripple that the processes tends to cause.

In an earlier patent (i.e., U.S. Pat. No. 5,270,913 filed Apr. 6, 1992, and incorporated herein by reference), I described a transformerless power conversion system (referred to hereinafter as PCS). In very general terms, the PCS works by charging a set of capacitors from a power source, possibly transforming the voltage across the set of capacitors by inverting the voltages on selected capacitors, and then discharging the set of capacitors at the transformed voltage into a distribution node or load. In other words, a complete cycle of operation in the PCS includes a charging phase, possibly an inversion phase, and a discharging phase. By employing many cycles of operation per second (e.g. 1 to 2 kHz), the PCS can extract charge from the power source and inject it into the distribution node or load to reconstruct an output having a desired waveform. The PCS is extremely versatile in the transformations which it can be configured to perform. For example, it can be configured to convert AC to DC, DC to DC with step-up or step-down, DC to AC, or AC of one frequency to AC of another frequency, to name a few.

In the case of AC to DC conversion, charging the PCS from a low voltage source (e.g. when the instantaneous voltage of the input AC waveform is low) presents the same type of problem that is encountered with conventional rectification. If the transformed voltage in the PCS is less than at least two times the output voltage, it will not be possible to fully discharge the capacitors into the DC output terminal. Therefore, it follows that the PCS system can also impose a nonuniform load on the input line and thereby distort the input waveform by introducing harmonics back onto the input line.

As described in the earlier patent, however, this problem can be solved by using multiple charging cycles per discharge cycle. In this way, the output voltage of the PCS can be made sufficiently high to permit a complete discharge of the storage capacitors during the discharge cycle. Though that technique works, it may be more complex than necessary, it involves more computation, and it requires capacitors with higher voltage ratings.

SUMMARY OF THE INVENTION

In general, in one aspect, the invention is a system for controlling VAR of a multiphase grid. The system includes a plurality of charge storage elements; a plurality of charge transfer circuits each connected to a corresponding phase of the multiphase grid and to a corresponding one of the plurality of charge storage elements; and a charge redistribution circuit connected to the plurality of charge storage elements, wherein during operation the charge redistribution circuit redistributes charge among the plurality of charge storage devices.

In preferred embodiments, the system further includes a controller which operates the plurality of charge transfer circuits and the charge redistribution circuit, wherein during operation the controller causes the plurality of charge transfer circuits to transfer charge to the plurality of charge storage elements, causes the charge redistribution circuit to redistribute the charge that was transferred to the plurality charge storage elements, and causes the charge transfer circuit to transfer the redistributed charge to the grid.

In general, in yet still another aspect, the invention is a power flow control system for connecting to a multiphase grid. The system includes a plurality of charge storage elements; a plurality of charge transfer circuits each connected to a corresponding phase of the multiphase grid and to a corresponding one of the plurality of charge storage elements; a charge redistribution circuit connected to the plurality of charge storage elements, wherein during operation the charge redistribution circuit redistributes charge among the plurality of charge storage devices; and a controller operates the plurality of charge transfer circuits and the charge redistribution circuit, wherein said controller controls the power flow into the system by establishing non-zero initial conditions on the plurality of charge storage elements prior to a charge transfer cycle during which charge is exchanged between the grid and the charge storage elements.

In general, in another aspect, the invention is a derectification system for generating from a power source a multiphase AC output onto a grid. The system includes a plurality of charge storage elements; a first charge transfer circuit which charges the plurality of charge storage elements from the power source; a second charge transfer circuit which transfers charge between the plurality of storage elements and the multiphase grid; and a controller which operates the first and second charge transfer circuits, wherein the controller causes the second transfer circuit to discharge the plurality of charge storage elements onto the grid in order of increasing voltage, starting with the charge storage element with the lowest voltage and ending with the charge storage element with the highest voltage.

In general, in a further aspect, the invention is a method of operating a system including a plurality of charge storage elements that are coupled to a power source through a circuit which includes an inductor. The method is for generating a multiphase AC output onto a grid and includes the steps of sequentially transferring charge between the power source and each of the plurality of charge storage elements so that each of the charge storage elements is characterized by a voltage corresponding to the charge stored therein; and transferring charge between each of the plurality of charge storage elements and a corresponding one of the phases on the grid, wherein the step of sequentially transferring charge is performed in order of increasing voltage on the charge storage elements.

In general, in still another aspect, the invention a method of controlling power flow between a multiphase grid and a system which includes a plurality of charge storage elements. The method includes establishing non-zero initial conditions on the plurality of charge storage elements, and then transferring charge between the multiphase grid and the plurality of charge storage elements.

One very attractive application of the sequential discharge technique is for a harmonic-free conversion of multi-phase AC power to DC and in AC to AC waveform reconstruction. By charging a capacitor, the sequential discharge technique allows the energy extraction from any phase of a multi-phase AC line to be proportional to the square of the momentary line voltage. Performing the charging at constant intervals loads the AC line to the desired power level at any part of the AC cycle. This enables one to load the multi-phase AC line uniformly and maintain a balanced and constant power. Since the load which the rectification technique imposes on the multiple phase inputs is equivalent to a resistive load, it produces no harmonic distortions that must be filtered out. Thus, the sequential discharge technique substantially eliminates the generation of harmonics. Though the rectification approach of the invention includes about the same number of components as a conventional bridge rectification approach, it completely eliminates the need for expensive, harmonic filters on the input side of the system. Thus, the invention permits the elimination of harmonic filters, VAR capacitor banks, and DC ripple filters. In addition, the load current is in phase with the AC voltage, yielding a unity power factor. This eliminates the requirement for phase angle correction.

The invention is particularly well suited for application to multiphase AC input but it may be also may be used for other specialized operations. For example, the same technique can also be used in a more effective AC to AC asynchronous power conversion system and other applications.

The invention may also be used in conjunction with a PCS yielding transformation and rectification for either voltage step-up or step-down. The invention significantly simplifies control and operation of the PCS system and permits a larger power throughput. When used in connection with the PCS, the PCS does not store any significant amount of energy in the conversion process. Therefore, as a consequence of the constant power throughput, the DC output is ripple-free, which also saves on filtering on the DC side. Full and continued regulation is obtained for both applications. This rectification system is relatively simple and could be used for many industrial applications.

An attractive application of the invention would be to rectify and step-up the power from an AC source and feed it directly into a two-line (plus and minus) DC overland transmission line. For existing converters, it is necessary to install filters to reduce harmonics on the AC side and a ripple filter on the DC side. Such filters are of considerable size and form an appreciable part of the power generation costs. The problem comes from the fact that standard rectification techniques load the AC lines disproportionately at the higher voltage part of the AC cycle.

The potential uses of the invention in the industrial world are manifold. Efficient and harmonic-free rectification is required for many applications. For the purposes of DC transmission, AC rectification has to be performed on a large scale and high voltage level. Approximately 12% of US power is consumed for the production of aluminum. In addition, industry uses electrowinning and electrolytic refining processing for the production of sodium, magnesium, copper, silver, lead, nickel, zinc, chlorine, fluorine and hydrogen. And this is not a complete list.

The rectification of AC power is also required for most motor drives, where AC is rectified to DC and then the DC is converted back to AC having the desired frequency. An additional application is in Uninterruptible Power Supplies (UPS) where the AC input is typically rectified and converted back to AC. Using the invention, energy can be extracted from the grid without distorting the voltage on the grid. Moreover, the extracted energy can then be used to generate a new AC waveform at the desired frequency using the transformation techniques that were described in U.S. Pat. No. 5,270,913 or using other standard DC conversion techniques. This technique is also very useful for variable speed motor control.

In addition, a rectification steps are required in many other areas. For example, rectification is used in the front end of UPS (uninterruptible Power Supplies) and other temporary battery power storage. Moreover, once the electric car gets on the road, these vehicles will need to be charged during the night from an AC grid. To that, add the potential of inductive energy storage, where electric energy is stored in large magnetic coils to be used during peak consumption or short power interruption.

There has been a significant increase in nonlinear loads that are being attached to the grid. This increase has prompted an increased concern about harmonics. Harmonic current flow in the power system as reactive power (VAR), adds to the increased apparent power demand of nonlinear loads. The harmonic current causes additional heat and stress on the power system components due to their higher frequency. For some components, such as transformers, the derating for harmonic currents can be substantial (e.g. 30% to 40%).

Industry standards are being formulated to limit harmonics in the power system and to encourage the development of electrical loads that do not generate harmonics. Two such standards are IEC 555 and IEEE 519. IEC 555 limits the levels of harmonic current generated from individual load equipment connected to public power systems in Europe. In the US, IEEE 519 has been revived to establish recommended limits on the level of harmonics that users can inject into the public power system. The use of the three phase rectification system which embodies the invention would eliminate harmonics generation in the rectification system.

Other advantages and features will become apparent from the following description of the preferred embodiment and from the claims.

DESCRIPTION OF THE PREFERRED EMBODIMENTS

Figure 1:
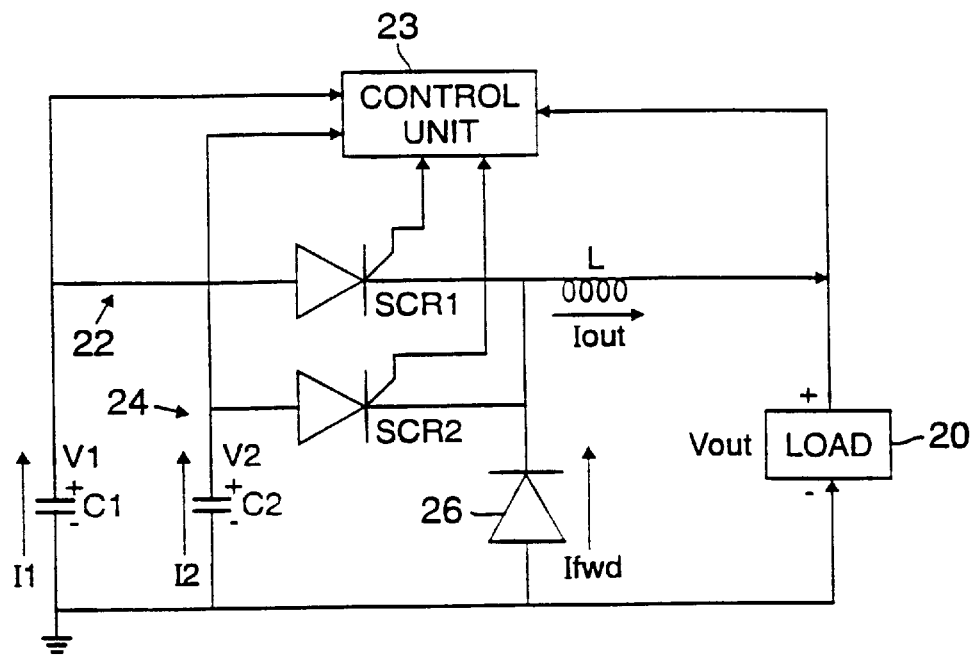
FIG. 1 is a circuit which is used to illustrate the sequential discharge technique.

Overview of the Sequential Discharge Technique:

To illustrate the invention and to make some representative numerical computations, we will use the sequential discharge circuit 10 shown in FIG. 1. Circuit 10 includes two capacitors, $C_1$ and $C_2$, from which power will be extracted into a load 20 to produce an output voltage, $V_{out}$. It should be understood that there is an implied charging system in front of the capacitors. For example, the capacitors might be the capacitors of a PCS module that is configured to provide DC step-up or step-down module, such as is described in U.S. Pat. No. 5,270,913. Or the capacitors might be the output capacitors of a simple LC charging stage, an example of which will be presented later (see FIG. 7). In general, the capacitors are first charged during a charging cycle to some predetermined level and then they are sequentially discharged into load 20 during a discharge cycle.

Circuit 10 includes two discharge paths 22 and 24, one connected to capacitor $C_1$ and the other connected to capacitor $C_2$. The first discharge path includes a silicon controlled rectifier, $SCR_1$, that is connected through inductor L to load 20. The second discharge path includes a second silicon controlled rectifier, $SCR_2$, that is also connected through the same inductor L to load 20. $SCR_1$ and $SCR_2$ are arranged so that when they are triggered on they discharge their respective capacitors through inductor L. A free wheeling diode 26 is connected between ground and the side of inductor L to which $SCR_1$ and $SCR_2$ are connected. Free wheeling diode prevents the voltage on either of the capacitors to reversing at the end of a complete discharge. A programmable control unit 23 (e.g. a computer or general data processing unit) samples the voltages across the capacitors $V_1$ and $V_2$, samples the output voltage $V_{out}$, and triggers the SCR's at the appropriate times.

In general, discharge circuit 10 discharges capacitors $C_1$ and $C_2$ in sequence and through the shared output inductor L. In addition, for every charge cycle, there is a discharge cycle in which both capacitors are typically discharged. The capacitor with the highest voltage is discharged first, followed by the discharge of the capacitor with the lower voltage. If properly timed, the excess energy from the high voltage input module helps to pull out the energy from the low voltage input module. This method enables input charging to occur at constant intervals and thus it reduces the computational requirements.

As an aside, it should be understood that the term "load" when used herein, is meant to have a very general meaning unless indicated otherwise by the specification or the context in which it is being used. It includes a node, a power distribution point, a motor, a simple resistive load, the input of a circuit to which power is being supplied, etc. In addition, though we have referred to SCR's in this and subsequent embodiments, any of a wide variety of switching devices can be substituted for the SCR, depending upon the requirements of the particular application, including, for example, thyristors, Crossatrons, GTO's, any semiconductor unidirectional switching devices, etc.

The following discussion presents the details of a discharging cycle that immediately follows a charging cycle during which capacitors $C_1$ and $C_2$ are charged to initial voltages of $V_{01}$ and $V_{02}$, respectively. For the following discussion, we assume the output voltage to be $V_{out}$=10 kV and an initial voltage condition of $V_{01}$>$V_{02}$.

Two different sequential discharge modes of operation will be described. In both modes of operation, it is assumed that the voltage $V_{01}$ is greater than or equal to twice the output voltage $V_{out}$ and $SCR_1$ is triggered first to discharge $C_1$ and then $SCR_2$ is triggered to discharge $C_2$. The requirement that $V_{01} \geq V_{out}$ is necessary in order to assure that $C_1$ will completely discharge during its discharge cycle. In the following example, we select $V_{01}=25$ kV which meets this requirement. The difference between the two modes is in the timing of the triggering of $SCR_2$. In the first mode, $SCR_2$ is triggered when $V_1$ reaches zero volts. In the second mode, $SCR_2$ is triggered when $V_1$ reaches the value of $V_{02}$.

When $SCR_1$ is triggered, capacitor $C_1$ discharges through inductor L into output load 20. At the end of discharge (i.e., when $V_1$ equal zero), free wheeling diode 26 prevents the voltage on $C_1$ from reversing and it permits the energy remaining in the inductor L to be transferred to output load 20. At the point that $V_1$ reaches zero, the current in the inductor is given by:

$$I_o = \frac{(V_{01}^2 - 2 \times V_{01} \times V_{out})^{1/2}}{(L/C_1)^{1/2}}$$

and at that point the energy stored in the inductor L is:

$$E_L = \frac{1}{2} \times C_1 \times (V_{01}^2 - 2 \times V_{01} \times V_{out})$$

If we trigger $SCR_2$ when $V_1$ reaches 0 and connect capacitor $C_2$ through inductor L to output load 20, the current in the inductor, $I_{out}$, represents an initial condition for the discharge of the second capacitor $C_2$. Thus, there will be a certain range of voltages $V_2 < 2 V_{out}$ for which it will be possible to fully discharge the capacitor $C_2$. If $V_{02} \geq 2 V_{out}$, then sequential discharge is not required, since the voltage on $C_2$ is sufficiently large to enable the capacitor to completely discharge by itself. However, sequential discharging may still be used in this case in order to combine the effect of the excess voltage of $C_1$ and $C_2$ to aid in discharging additional capacitors that have lower voltage levels.

The range of voltages less than $2 V_{out}$ for which this is true can be solved either analytically, graphically, or with the use of circuit modeling codes. If we plot the voltage and current for a discharge with a capacitor r volt age equal to twice that of the output voltage, both the voltage and current will be zero at the end of the discharge. If we look at the curve, we will find that for any current th at is less than the maximum current of:

$$I_{max} = V_{out} \times \left(\frac{C_1}{L}\right)^{\frac{1}{2}}$$

the capacitor voltage $V_2$ has two solutions. The two solutions correspond to the initial voltages that capacitor $C_2$ must have in order to fully discharge all of the energy from capacitor $C_2$. If the initial voltage of $C_2$ is between those two solutions, the capacitor cannot be completely discharged. If current remains in inductor L when $V_2$ reaches zero, an additional capacitor, such as the input from a third phase, can then be discharged.

As should be readily apparent, the energy and voltage in each capacitor varies throughout the 60 Hz cycle if the capacitors are charged from the AC grid. However, what may not be so apparent is that the total energy of all of the capacitors is constant and that this is true for any number of capacitors charged from a multi-phase power source with any number of phases larger than one. This fact has a very important implication. It does not matter when in the 60 Hz cycle the discharge is begun since the total energy in all of the capacitors remains constant throughout the cycle. Thus, there will be a constant power flow through the circuit so long as the capacitors are completely discharged and they are originally charged at constant time intervals.

Figure 2:
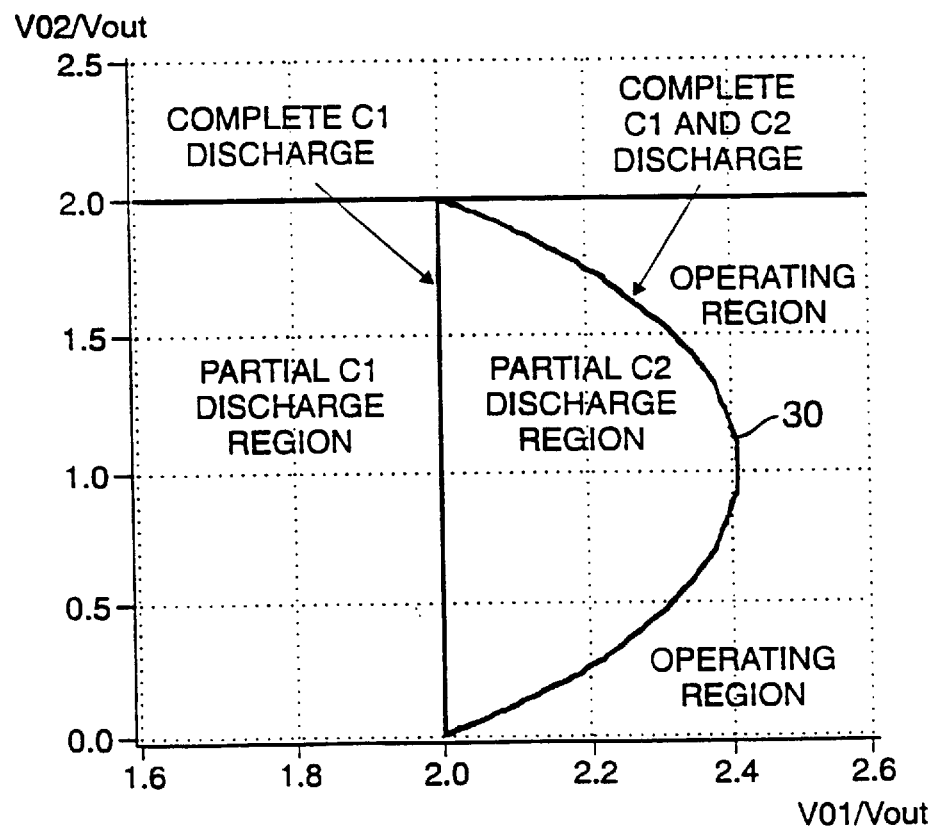
FIG. 2 is a plot of the various operating regions of the circuit of FIG. 1.

The complete discharge of $C_1$ and $C_2$ is possible only if their initial conditions are properly selected. $V_{01}$ must be at least $2 V_{out}$ to enable it to fully discharge into a node that is at $V_{out}$. Even if $V_{01}$ is above $2 V_{out}$, if it is not sufficiently above $2 V_{out}$, the residual current that remains in inductor L when $V_1$ reaches zero may not be sufficient to cause the complete discharge of $C_2$ into the node at $V_{out}$. FIG. 2 presents a plot of the different operating regions of the circuit shown in FIG. 1. The x-axis represents the ratio of the initial voltage across $C_1$ to the output voltage (i.e., $V_{01}/V_{out}$); and the y-axis represents the ratio of the initial voltage across $C_2$ to the output voltage (i.e., $V_{02}/V_{out}$).

If the initial voltages on capacitors $C_1$ and $C_2$ are properly selected, both capacitors can be fully discharged at the end of a sequential discharge cycle, with no residual current remaining in inductor L. The set of conditions which produce such a result are shown by curve 30. The equation for curve 30 is as follows:

$$V_{02}=V_{out} \pm (V_{out}^2 - V_{01}^2 + 2 \times V_{out} \times V_{01})^{1/2}$$

The condition can be put in a simpler form:

$$E_1 + E_2 = 2 \times (E_1^{1/2} + E_2^{1/2})$$

where $E_m$ is the ratio of the initial energy stored in capacitor $C_m$ divided by the energy remaining when its voltage equals the output voltage, $V_{out}$. If the condition is such that the left side of the equation is smaller than the right side, then the initial condition falls to the left of the curve in the FIG. 2 and the second capacitor cannot be discharged.

If the initial conditions fall within the region to the left of curve 30 but to the right of $V_{01}/V_{out}=2.0$, then it will be possible to fully discharge capacitor $C_1$ but not capacitor $C_2$. In the region to the left of the line $V_{01}/V_{out}=2.0$, it will not be possible to fully discharge either $C_1$ or $C_2$.

If initial conditions fall within the region to the right of curve 30, then both capacitors can be fully discharged through sequential discharging with some residual current remaining in inductor L. As noted above, the residual current in inductor L can supply the initial condition for discharging a third capacitor (not shown), where the combined condition of the first two capacitors, if appropriately selected, will permit the full discharge of the third capacitor. Following the above reasoning, it should be apparent that the solution for $V_{03}$ (i.e., the voltage(s) at which full discharge is possible) will have four roots or, once the voltage for the first two capacitors is specified, two roots. This process can be continued as long as a residual inductor current remains on subsequent discharges. The discharge sequence is best performed with the discharge of capacitors in the order of decreasing voltages.

Figure 3A:
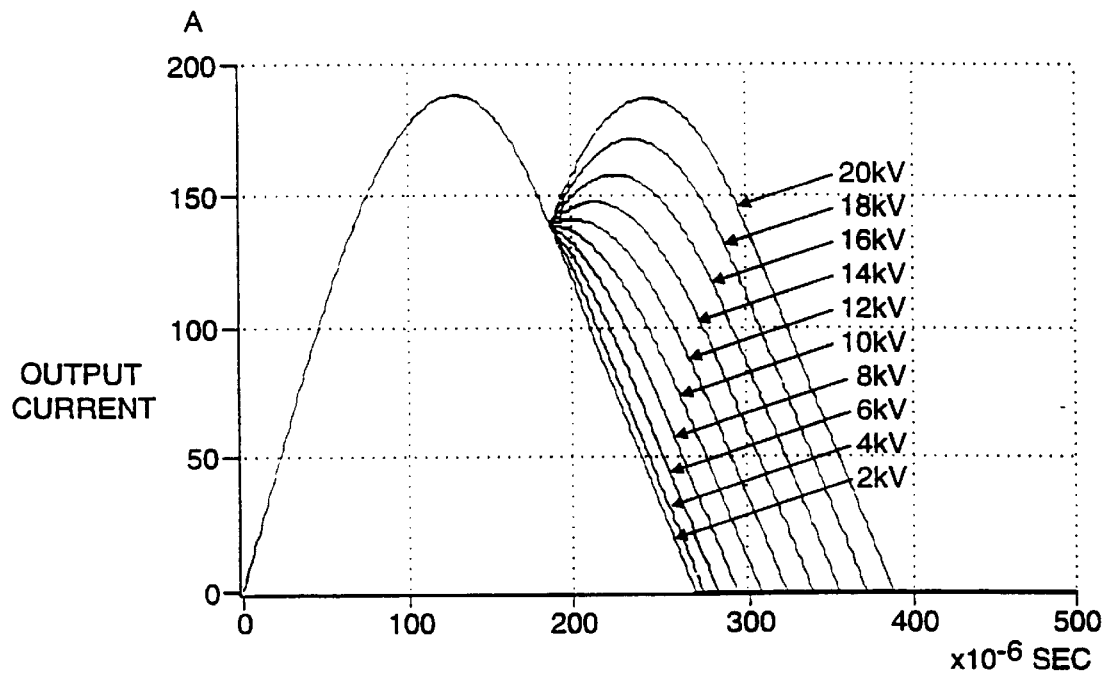
FIG. 3A shows plots of the output current, $I_{out}$, of the circuit of FIG. 1 as a function of time for different values of $V_{O2}$ (for first operating mode)
Figure 3B:
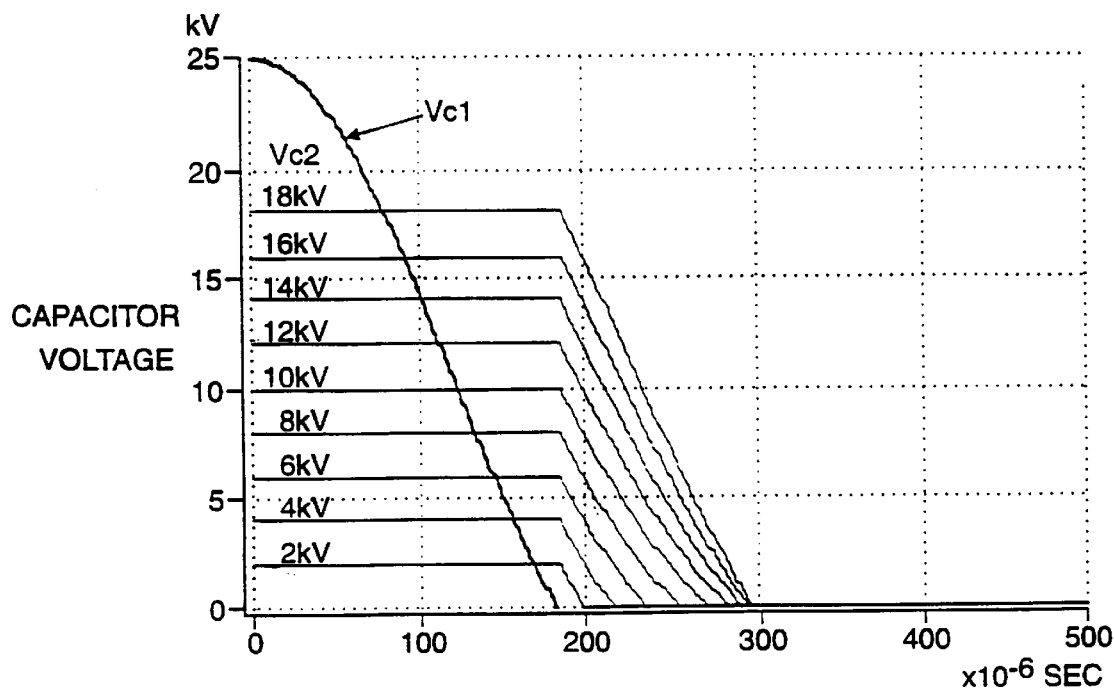
FIG. 3B shows plots of the capacitor voltages, $V_1$ and $V_2$, as a function of time for different values of $V_{O2}$ (for first operating mode)

FIGS. 3A and 3B show simulated output current and voltage waveforms, respectively, for one complete discharge cycle of operation of the above-described sequential discharge technique. In this example, $SCR_1$ is triggered first and when $V_1$ reaches zero volts, $SCR_2$ is triggered. The initial voltage $V_{01}$ was selected to be 25 kV and $V_{02}$ is some smaller value, as indicated on the curves. By selecting $V_{01}$ to be 2.5 times the output voltage $V_{out}$, this permits the full discharge of $C_2$ over the complete range of initial voltages that $C_2$ might have. If the voltage $V_{01}$ is between 25 kV and 20 kV, the voltage range for $V_{02}$ which will allow full discharge is restricted in the manner which will be described below. For the numerical calculations that were performed, the capacitors all had values of 1 $\mu$F and the inductors all had values of 6.338 mH. In FIGS. 2A and 2B, the family of curves represent the different values of $V_{02}$, i.e., the initial voltage across $C_2$.

As indicated in FIG. 3A, the output current $I_{out}$ through inductor L is relatively large at the time that $V_1$ reaches zero volts and $SCR_2$ is triggered on. This residual current helps to completely pull out the charge that is stored in $C_2$. As indicated in FIG. 3B, the voltage across $C_2$ remains at $V_{02}$ until $SCR_2$ is triggered on and then $C_2$ fully discharges to zero volts. It should be apparent that in all cases there is a residual current remaining in $L_{out}$ at the point that $C_2$ is fully discharged. In this case, free wheeling diode 26 provides a bypass path for the residual current in inductor L allowing the inductor to completely discharge and preventing its residual current from reversing the voltage on any of the capacitors. As noted earlier, the residual current could instead be used to discharge yet another capacitor if there were more input stages in the circuit.

Figure 4A:
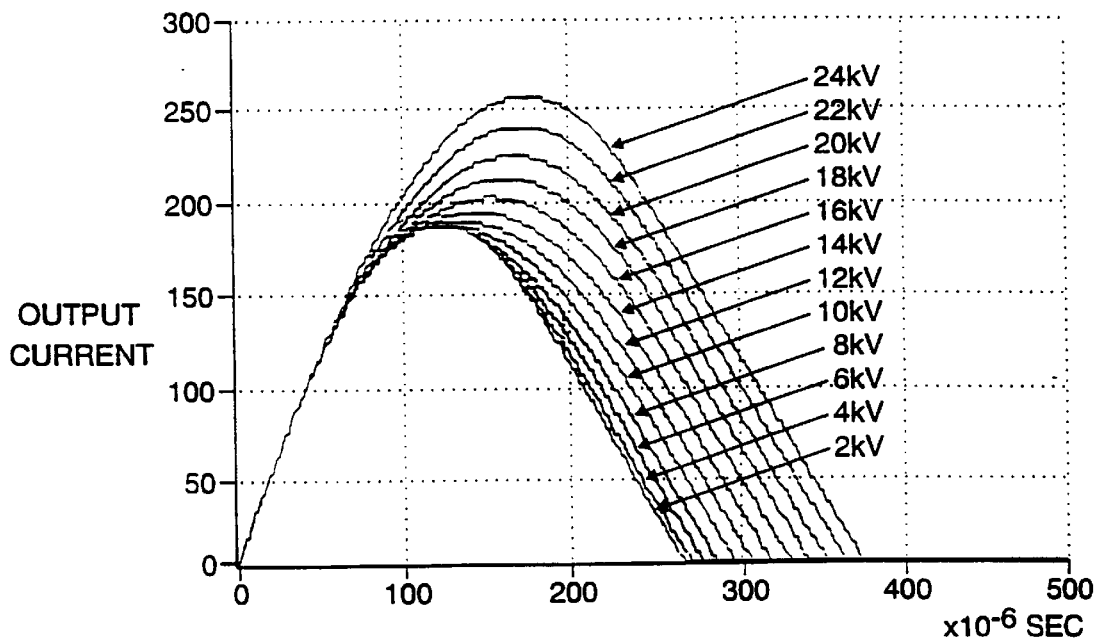
FIG. 4A shows plots of the output current, $I_{out}$, of the circuit of FIG. 1 as a function of time for different values of $V_{O2}$ (for second operating mode)
Figure 4B:
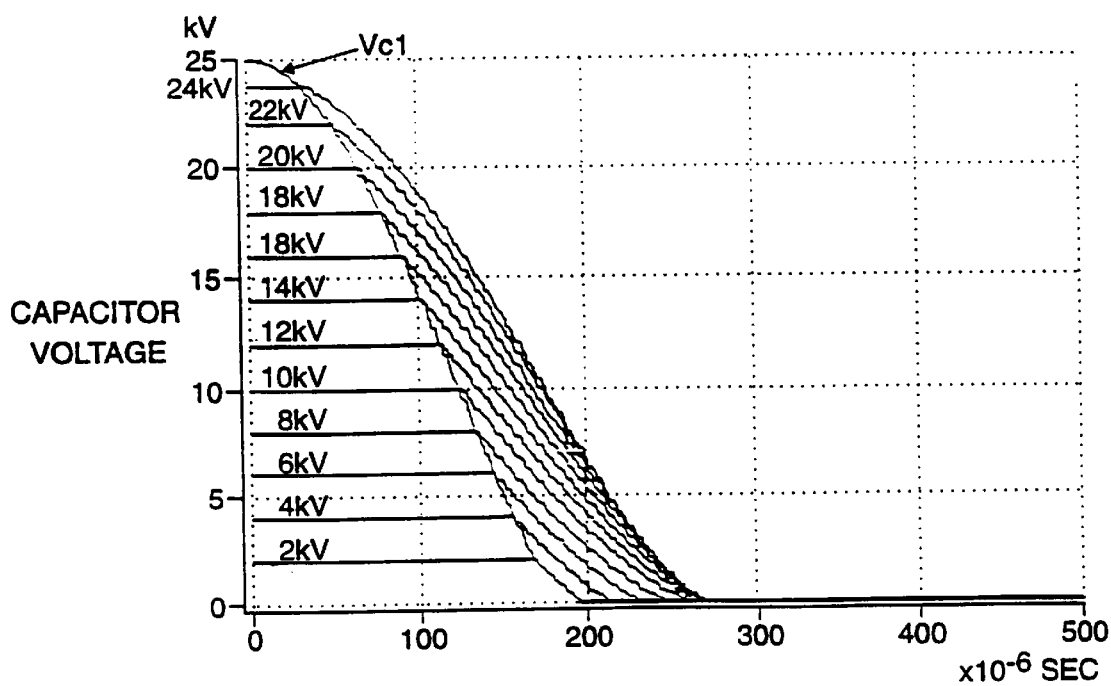
FIG. 4B shows plots of the capacitor voltages, $V_1$ and $V_2$, as a function of time for different values of $V_{O2}$ (for second operating mode)

As noted earlier, sequential discharge may also be performed in a second mode. Instead of triggering the second discharge at the point when the voltage of $C_1$ is zero, one may trigger it at the point when $V_1$ reaches $V_{02}$, the initial voltage of the second capacitor. By triggering at this point, both capacitors are effectively connected in parallel and are being discharged together. The current and voltage waveform for this type of discharge sequence are shown in FIGS. 4A and 4B, respectively.

Both sequential discharge modes of operation yield about the same discharge periods and require similar components. The first approach (i.e., triggering $SCR_2$ when $V_1$ reaches zero) has the advantage that correct timing of the second phase of discharging is easier to accomplish. From an operational point of view, the second approach (i.e., triggering $SCR_2$ when $V_1$ reaches $V_{02}$) is more difficult to implement. In the second mode of operation, if the timing of the start of the discharge of the second phase is not accurate, the first capacitor will not be fully discharged.

Sequential Discharge Rectification (SDR)

To summarize what was presented above, the sequential discharge rectification technique involves discharging in sequence all input modules (e.g. capacitors or PCS modules) through a shared output inductor using a shared freewheeling diode. In addition, the modules are discharged in decreasing order of the initial module voltage. The excess energy remaining in the output inductor from the discharge of the first module helps "pull out" energy from the capacitors of the second and third modules, which have lower voltage levels.

Figure 5:
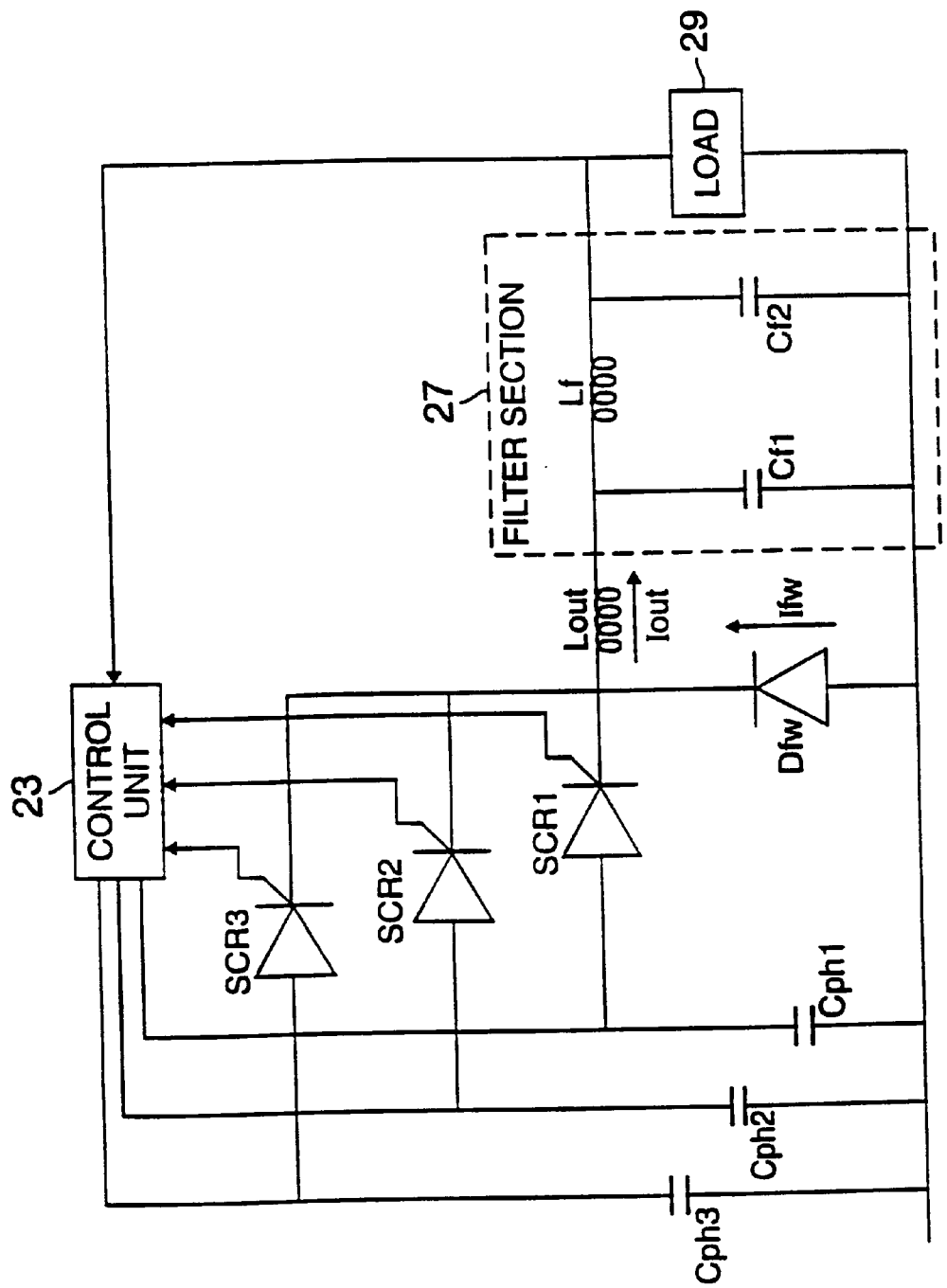
FIG. 5 is a circuit diagram of a sequential discharging circuit for use with a three phase line.

An output section for three phase rectification circuit is shown in FIG. 5. One SCR per phase (i.e., ($SCR_1$ $SCR_2$, and $SCR_3$) discharges a corresponding capacitor ($C_{ph1}$, $C_{ph2}$, and $C_{ph3}$) into a shared output inductor $L_{out}$, which is, in turn, connected through a filter section 27 to a load 30. Filter section 27 filters out any ripples that are caused by the pulsed discharge of the capacitors into the load.

The components of a low-pass output filter are also shown in FIG. 5 in the dashed box. Note that the illustrated filter design is very simple, consisting only of three reactive elements: $L_f$, $C_{f1}$ and $C_{f2}$, connected as shown. Since the energy is dumped into $C_{f1}$, its capacitance should by at least about 3–5 times larger than the capacitance of the storage capacitors, $C_{phi}$. By selecting a filter cut-off point that is lower than the lowest expected repetition rate of the circuit, a smooth output voltage is produced. The filter can, of course, be of any appropriate design which is capable of eliminating the ripple that the sequential discharge tends to introduce.

As noted previously, the shared output inductor is a key component for the sequential discharge operation since it allows any residual current remaining from the discharge of one capacitor to assist in achieving the complete discharge of another capacitor.

Capacitors, $C_{ph1}$, $C_{ph2}$, and $C_{ph3}$, each represent a different capacitor (in this case, "stack of capacitors") within a corresponding PCS module (not shown). Each PCS module is connected to a different phase of a three phase AC line. In other words, each capacitor is charged to a voltage that is proportional to the absolute voltage of the corresponding AC input phase at that time. It is assumed for purposes of this example that the PCS modules each provide a step-up factor of N. Thus, the voltages across each of the capacitors can be determined as follows:

$$V_{C1} = 2 \times |A \sin(\omega t)| \times N$$
$$V_{C2} = 2 \times |A \sin(\omega t + 2\pi/3)| \times N$$
$$V_{C3} = 2 \times |A \sin(\omega t - 2\pi/3)| \times N$$

where "A" is the AC input voltage amplitude and N is the step up ratio of the PCS module.

As before, a programmed control unit 23 controls the operation of the charging circuit and the sequential discharge circuit (e.g. the triggering of the SCR's).

The capacitor voltages for the three phases are shown in Table I over an angle of 60 degrees (see columns labeled Phase 1, Phase 2, and Phase 3). The numbers are for an rms input voltage of 11 kV and a step-up ratio of N=6. Table I has eight entries separated in time by 7.5 electrical degrees.

TABLE I

| Time (msec) | Phase 1 (Volt) | Phase 2 (Volt) | Phase 3 (Volt) | Triggering Sequence |
|---|---|---|---|---|
| 0.174 | 7,049 | 89,618 | 96,657 | 3-2-1 |
| 0.521 | 21,026 | 81,036 | 102,053 | 3-2-1 |
| 0.868 | 34,643 | 71,068 | 105,704 | 3-2-1 |
| 1.215 | 47,667 | 59,885 | 107,546 | 3-2-1 |
| 1.563 | 59,876 | 47,676 | 107,548 | 3-1-2 |
| 1.910 | 71,060 | 34,652 | 105,710 | 3-1-2 |
| 2.257 | 81,030 | 21,036 | 102,063 | 3-1-2 |
| 2.604 | 89,612 | 7,059 | 96,670 | 3-1-2 |

By triggering the charging cycle at the listed times the corresponding capacitor voltages are obtained. Identical voltage combinations are repeated every 60 degrees with the cyclic shift of all the columns to the right.

The SCR's are triggered starting with the capacitor having the highest voltage and proceeding sequentially through the rest of the capacitor in order of decreasing voltage. For each charge cycle, the discharge sequence is as shown in the last column of Table I. For example, look at the entries in the row at time 0.174 msec. The charging cycle associated at that time establishes voltages on $C_{ph1}$, $C_{ph2}$, and $C_{ph3}$ of 7,049, 89,618, and 96,657 volts, respectively. Given the relative ordering of the capacitor voltages, the discharge will be in the following order: $C_{ph3}$, $C_{ph2}$, and $C_{ph1}$.

It can be simply shown, either mathematically or numerically, that the combined energy of the three capacitors is at all times a constant and is given by:

$$E_t = 1.5 \times \frac{C}{2} \times N^2 (2A)^2$$

The quantity of combined charged energy is independent of the phase angle and source frequency. In other words, the combined energy is identical for each and every charge cycle. It follows that if one simply charges and discharges these capacitors together at controlled time intervals, the input power and output power can be independent in time and no synchronization with the AC cycle is required.

Also, by charging each capacitor at constant time intervals, the energy extracted from each line is proportional to the square of the instantaneous voltage. This is exactly what the power flow is into a resistive load. It therefore follows that by using this power extraction method, the power factor of the AC input is identical to unity and no reactive power flow occurs.

Control circuit 23 monitors the load and sets the repetition rate based upon the required throughput that is demanded by the load. If the load or the input voltage changes, a simple feedback loop can adjust the frequency at which the charging/discharging cycles occur to maintain a constant output voltage.

Figure 6A:
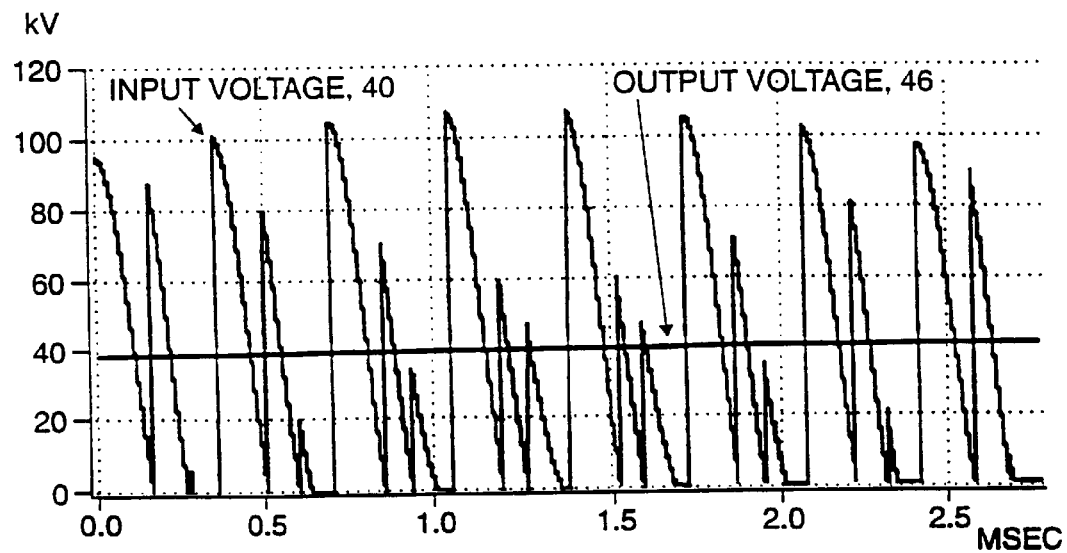
FIGS. 6A and B present a plot of the input and output current and voltage waveforms for the circuit shown in FIG. 1.
Figure 6B:
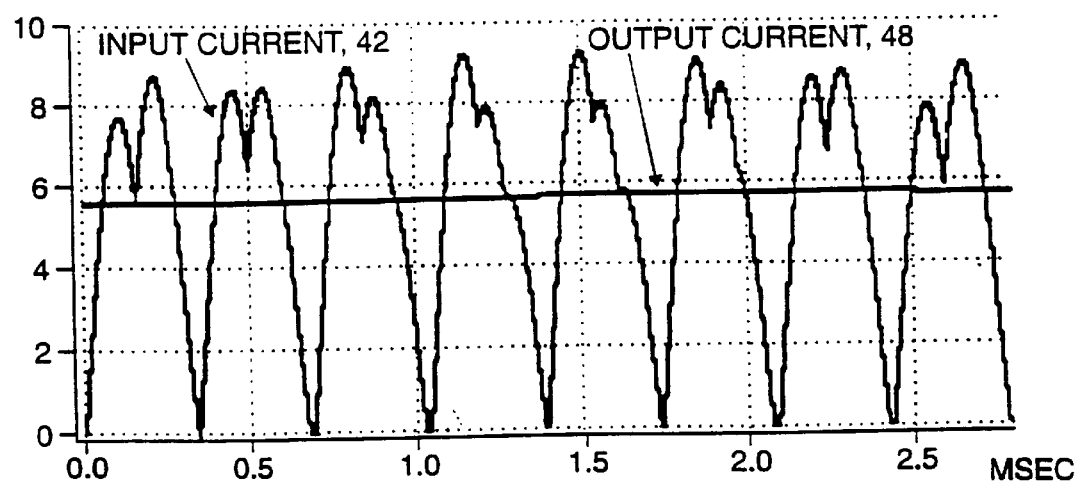

FIGS. 6A and 6B show, respectively, the input voltage waveform 40 and the input current waveform 42 over 60 degrees of a 60 Hz three-phase input, with the capacitors charged to the voltage levels listed in Table II. (Note that in this case "input" refers to the input of the output filter 27.) As can be seen, the input condition of the second 30 degrees is the image of the first 30 degrees. In addition, the input condition is repeated every 60 degrees. FIG. 6A presents the capacitor voltage of the switched on capacitors and the inductor current. As can be seen from the current discontinuities, the inductor current is substantial by the time the second and third capacitors are switched on line. In addition, the inductor and free-wheeling diode current do not have to be zero between consecutive capacitor discharge cycles.

In FIGS. 6A and 6B, the charging of the three capacitors occurs at the same time. It is assumed that the charging time required to charge each of the capacitors through a corresponding input inductor (not shown) takes about 250 $\mu$sec. This determines how frequently the capacitors can be charged and how soon one discharge cycle can follow a previous discharge cycle. It should be noted that to generate the waveforms that are shown, in particular, the repetition frequency of the discharge cycle, there is implied (but not shown for purposes of simplifying the circuit) a second set charging and discharging circuits, including three additional capacitors. The second set of circuits is coupled into the circuit shown in FIG. 5 in parallel with the illustrated set of discharging circuits. Each of the capacitors in the other charging/discharging circuits is coupled to shared inductor $L_{out}$ through a corresponding SCR. While the first set of capacitors (i.e., $C_{ph1}$, $C_{ph2}$, and $C_{ph3}$) is being discharged, the second set of capacitors (not shown) is being charged. In this way, there will always be a set of capacitors that is immediately available for the next discharge cycle without having to wait for a charging cycle to be performed. Thus, the circuit can be operated at a higher repetition rate.

FIGS. 6A and 6B also show the low pass output filter voltage 46 and output current 48. Of prime importance is that both the output current and output voltage are constant. Not shown, but of equal importance, is that both the input voltage and input current of all three phases is sinusoidal and ripple-free even with the use of small low-pass input filters.

Note that as the repetition rate increases so does the ripple frequency. If the low-pass output filter section is designed to handle the lowest repetition rate that is anticipated for the system, it will then handle the higher ripple frequencies that are produced at faster repetition rates.

If thyristors are used for the SCR's, they should have a rapid recovery rate, i.e., a short $t_Q$. Since the discharge is completed within about 250 $\mu$sec, the SCR's will see forward bias in about 125 $\mu$sec. They need to be recovered before they experience the forward voltage. Thyristors having the required recovery are available commercially.

For the conditions described above, the output capacitor values are 9.1 nF, the load is 7 k$\Omega$ for a total power throughput of 225 kW. A much higher throughput can be obtained by using a single string of standard and unparalleled high voltage thyristors for the SCR's. Using typical 8 kA thyristors, an output power of over 200 MW can be obtained with one set of three modules. The same technique can be used in the lower or consumer voltage range. In this regime faster and lower voltage switching devices can be used with a higher switching speed and lower forward voltage drop. This will lead to a more optimized throughput and higher efficiency.

Alternative SDR Configurations:

For rectification applications, the capacitor voltages must always be the same polarity as the output voltage to transfer power out of the system into the load. Since the input voltage to the charging circuit is negative over half of the input waveform cycle, this portion of the waveform cannot be used. This problem can be solved in at least two ways. One approach is to allow the input capacitors to charge to a negative voltage and then use an inversion cycle to flip the voltage to a positive value. The inclusion of the inversion cycle in this later approach reduces the maximum repetition rate that is achievable with the system. Another approach is to generate six phases. Thus, there will always be input waveforms having positive polarity throughout the entire cycle. Examples of these two approaches are described below.

Figure 7:
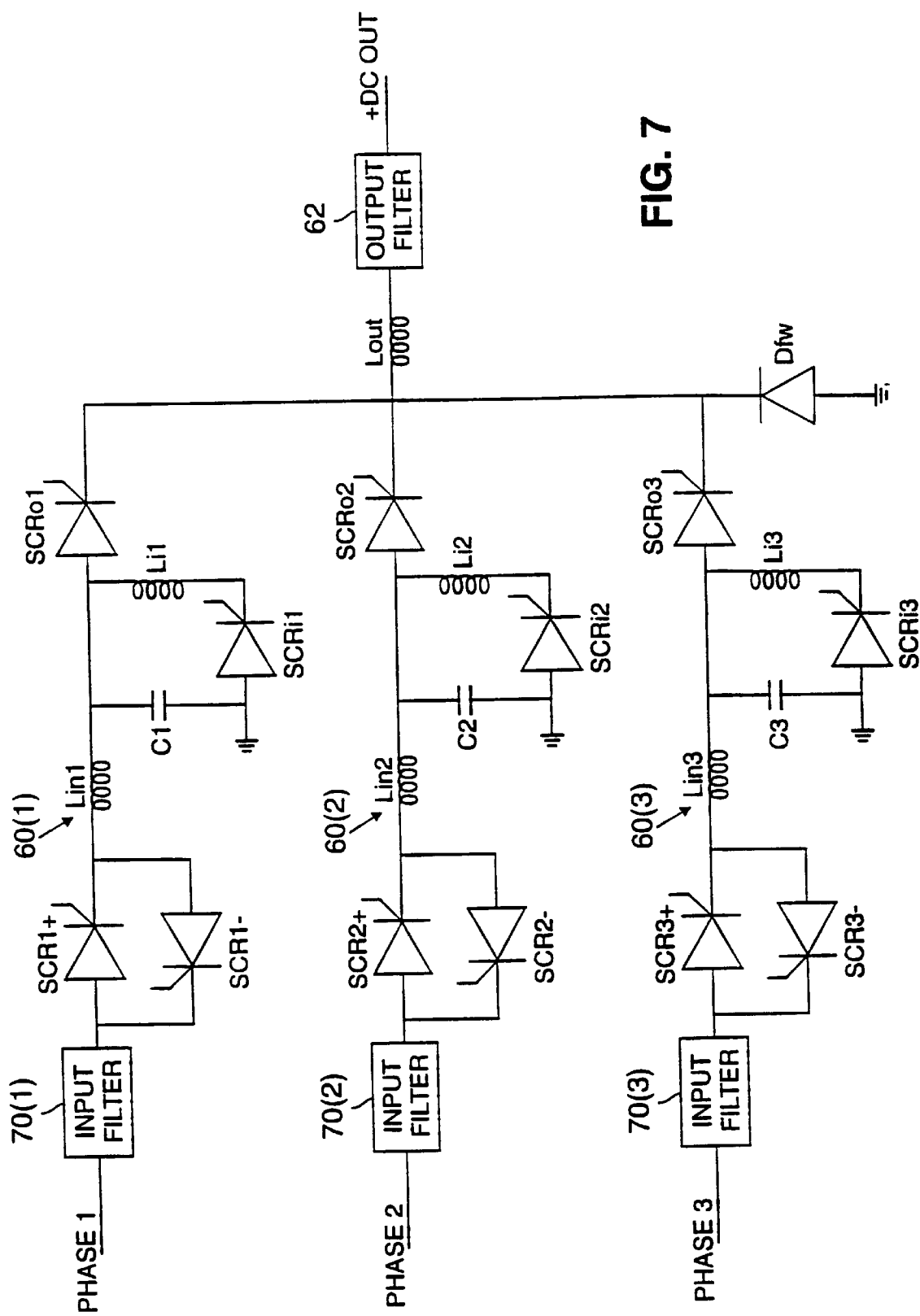
FIG. 7 is a circuit diagram of another charging and sequential discharging circuit for use with a three phase line.

An alternative three phase rectification circuit without transformation (i.e., without using the PCS module for transforming the input waveform) is shown in FIG. 7. The three phases of the AC input line are represented by the inputs labeled Phase 1, Phase 2, and Phase 3. The circuit includes three charging circuits 60(1–3), one for each phase, for charging a corresponding one of three capacitors, $C_1$, $C_2$, and $C_3$. The charging circuit for $C_1$ includes an input filter section 70(1), a pair of SCR's (i.e., $SCR_{in1+}$ and $SCR_{in1-}$) and an input inductor, $L_{in1}$. $SCR_{in1+}$ is for charging $C_1$ from the positive polarity portion of the AC input waveform and $SCR_{in1-}$ is for charging $C_1$ from the negative polarity portion of the AC input waveform. The charging circuits for the other two capacitors (i.e., $C_2$ and $C_3$) are constructed identically to the first charging circuit and thus their corresponding components are similarly labeled.

Each capacitor is resonantly charged through its input inductor from the input phase to which it is connected. For example, $C_1$ is resonantly charged through $L_{in1}$ from phase 1, and similarly for the other capacitors. Thus, the charging period is determined by the selection of the value of the input inductor.

On a three phase line, at any given time there will be either one or two phases which have negative polarity. Thus, the corresponding capacitor(s) will be resonantly charged to a negative voltage. An inversion circuit connected across the capacitor invert the negative voltage after the charging cycle is complete and prior to the discharge cycle. In the case of capacitor $C_1$, the inversion circuit includes an inductor $L_{i1}$ and silicon controlled rectifier $SCR_{i1}$. Similar inversion circuits are connected across the other capacitors $C_2$ and $C_3$. With the inverting circuits, all three capacitors can be made positive prior to the discharge cycle even though they were charged from a negative portion of the input waveform. This simply requires the inclusion of an inverting cycle between the charging cycle and the discharging cycle. Thus, all three phases can contribute to every discharging cycle.

In this rectification circuit of FIG. 7, the discharge circuits are constructed basically as previously described. Each capacitor $C_1$, $C_2$, and $C_3$, is connected through a corresponding one of SCR's (i.e., $SCR_{oi1}$, $SCR_{oi2}$, and $SCR_{oi3}$) into a shared output inductor $L_{out}$. The other side of $L_{out}$ is connected through an output ripple filter to a load 62 (e.g. power distribution node). A control unit (not shown) controls the triggering of the SCR's to produce the charging, inversion, and discharging cycles of operation.

Figure 8:
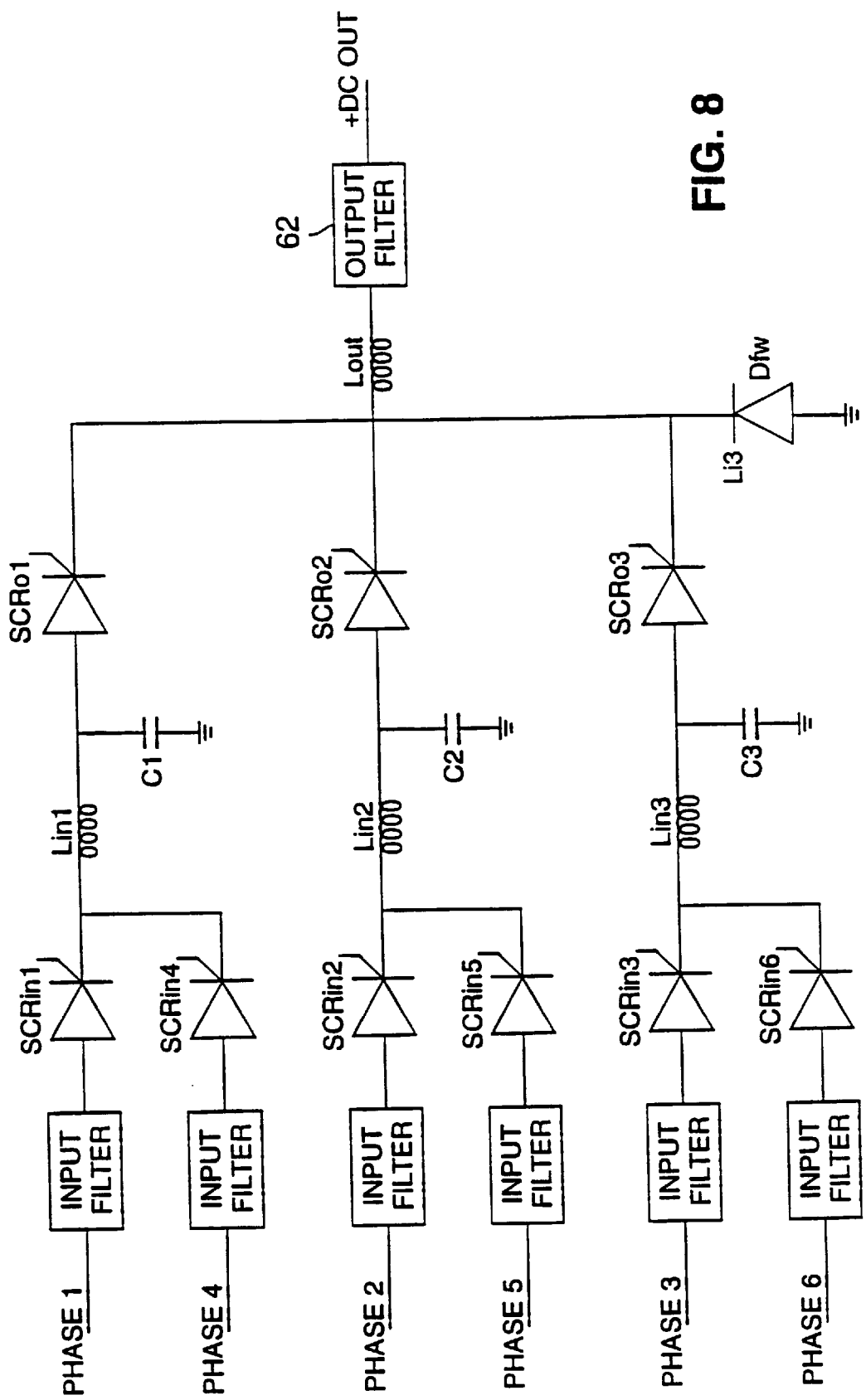
FIG. 8 is a circuit diagram of a sequential discharging circuit for use with a six phase power source.

If a six-phase source is available, the inversion components and the inversion cycle can be eliminated, as shown in FIG. 8. The circuit is the same as that shown in FIG. 7 except that each capacitor can be charged from two phases of the six phase source. Thus, for example, capacitor $C_1$, which is resonantly charged through $L_{in1}$, is connected to Phase 1 through $SCR_{in1}$, and to Phase 4 through $SCR_{in4}$. The two phases from which $C_1$ is charged are selected to be 180° out of phase with each other so that when the voltage of one waveform is negative the voltage of the other waveform is positive. The charging of each of the other capacitors $C_2$ and $C_3$. Thus, at all times throughout the AC cycle, each capacitor can be charged from a positive voltage source. With this arrangement, the inverting circuit are not needed; instead, the triggering of the SCR's is controlled to correctly select that Phase from which power will be extract during each charging cycle.

The configuration of FIG. 8 provides each input phase with the correct polarity, requires no inversion, and permits a 50% higher throughput than for the three-phase throughput. This configuration can be further exploited by adding a second rectification circuit of identical design to generate both a positive and a negative DC output polarity.

Figure 9:
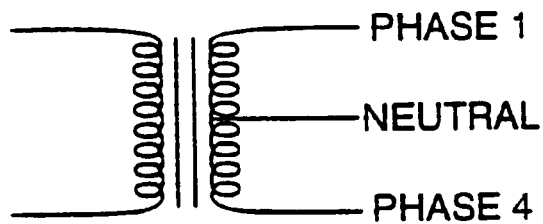
FIG. 9 is an example of a center-tapped transformer for use in generating two phases from a single phase line.

For large power systems, the six phases can be generated simply by using two sets of transformers with half of full ratio. A three phase system can be easily converted to a six phase system with the use of center-tapped transformers, such as are shown in FIG. 9. The center tap of the secondary is the neutral line and the outside lines of the secondary furnish the two phases, one being the inverse of the other.

The six-phase rectification and step-up may also be attractive with transformation. The complexity of the transformation modules can be reduced depending on power throughput. In addition, efficiency can be increased and triggering requirements reduced, since several diodes can be used in place of SCRs.

Another beneficial configuration is rectification of a six-phase power source generating a plus and minus DC output source. The six phases may be made available with small modifications of generators by bringing out three additional phases from the generator windings. Using the typical output of 10 kV a one-step rectification and step-up to a voltage range of ±40 to ±120 kV can be obtained with a power level in excess of 100 MW.

Control Module:

The interpulse separation sets the output voltage to the desired level. The algorithm for controlling the interpulse separation or repetition rate of the charging/discharging cycles is straight forward. Note that the same amount of energy is taken in per pulse of operation. Thus, the power throughput of the system is proportional to $A^2 \times$(repetition rate). If the input voltage drops by 10%, the power throughput will drop by about 20%. To compensate for the 10% drop in input voltage, the repetition rate must be increased by about 20%. Similarly, if the output power drops by 10% (e.g. because loading is less), then to compensate, the repetition rate must be decreased by 10%. If the repetition rate is not decreased, the output voltage will rise.

By measuring the input voltage, the output voltage, and the output current, one has all of the information that is required to control the operation of the system.

Figure 10A:
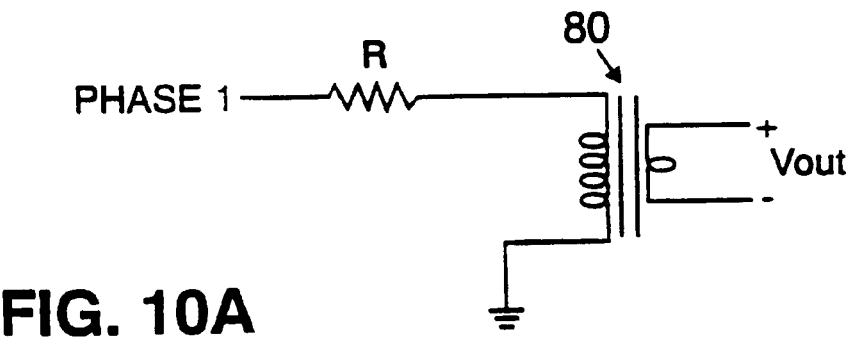
FIG. 10A shows a simple zero crossing detector circuit.
Figure 10B:
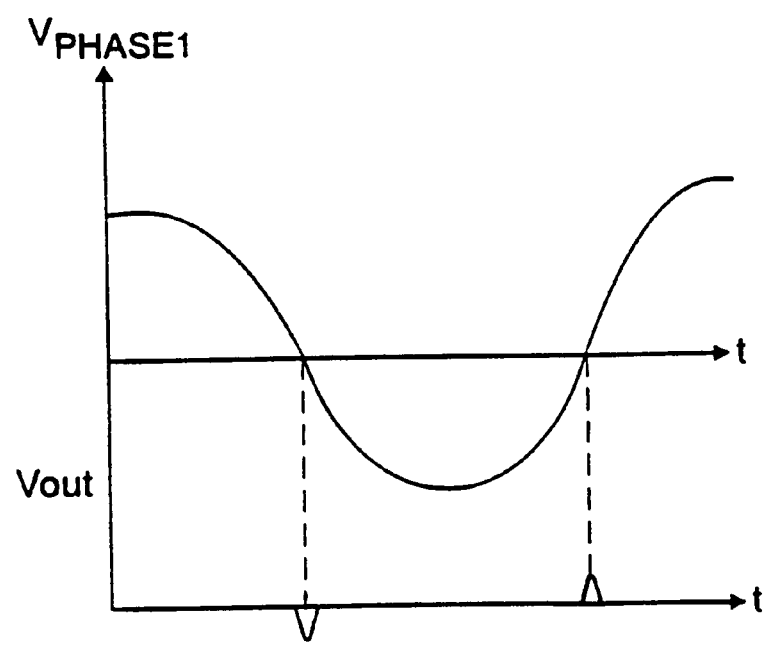
FIG. 10B shows the voltage waveforms on the primary and the secondary of the transformer used in the zero crossing detector circuit of FIG. 10A.

To accurately set the firing sequence, it is necessary to know where you are within the cycle of the input waveform. This can easily be determined by locating the zero crossings of the waveform. One approach to detecting the precise time at which zero crossings occur is to use a small transformer with an easily saturated iron core. Referring to FIG. 10A, such the primary of such a transformer 80 is connected between the phase line and ground with an appropriately large resistor limiting the current through the primary. Throughout most of the AC cycle on the phase 1 line, the core will remain saturated, except for a very short period when the voltage waveform crosses zero. While the core is saturated, the output voltage on the secondary will be zero. When the core comes out of saturation at the zero crossing, a pulse or blip will appear on the secondary marking the precise location of the zero crossing, as illustrated in FIG. 10B.

Rectification with Step-down Transformation

The conversion of power from AC to DC is typically accomplished using a rectification bridge in concert with other active and discrete components. The most common bridge configurations are half-wave, full-wave and six-phase, with the latter producing the most refined output voltage. Less common is the twelve-phase configuration, which can be accomplished by placing two six-phase rectifiers in series. The twelve-phase system minimizes output voltage ripple by increasing the frequency at which power is delivered to the load. In high current applications where the output voltage is relatively low (<50 v), half-wave rectification is used because the inherent losses are lower.

The above-described SDR systems are regulated high power AC to DC converters. The relatively high operating frequency and continuous power transfer produce a ripple-free output voltage that can be effectively regulated by varying the rate of conversion. The conversion process continuously draws current from the source thereby eliminating reactive power generation.

However, the SDR systems depicted in FIGS. 5, 7 and 8, have losses that are even higher than those found in a full-wave bridge rectifier. As in the full-wave bridge rectifier, the above-described SDR systems also use two solid state devices (i.e., SCR's) in series: one for the resonant charge cycle and the second for the discharge cycle. Unfortunately, the SCR's, which are typically multijunction devices, have much larger forward voltage drops than the single junction diodes that are used in the conventional full-wave bridge rectifier (e.g. 2 volts versus 0.7 volts). In low voltage applications where the ratio of the operating voltage to the SCR forward voltage drop to $(V_o/V_f)$ is small, the losses can become significant. In applications such as aluminum production, electro-plating or copper refinement where high currents at voltages less than 50 v are required, thus a modified SDR configuration would be more suitable to reduce the impact of the losses on system efficiency.

In general, the modified SDR system includes a front end which performs the sequential discharge functions at high voltage levels and it includes an output stage which uses a small, high frequency transformer to step down the voltage to the required low voltage level. This greatly improves the overall system efficiency by increasing the $V_o/V_f$ ratio of the sequential discharge section of the circuit. The modified SDR system has an efficiency similar to that of the standard half-wave rectifier while eliminating the need for an AC power transformer. The front end which performs the sequential discharge appears as a resistive load to the grid. Thus, it exhibits of the previously described benefits of SDR including harmonic free rectification and producing a power flow of unity power factor.

Figure 11:
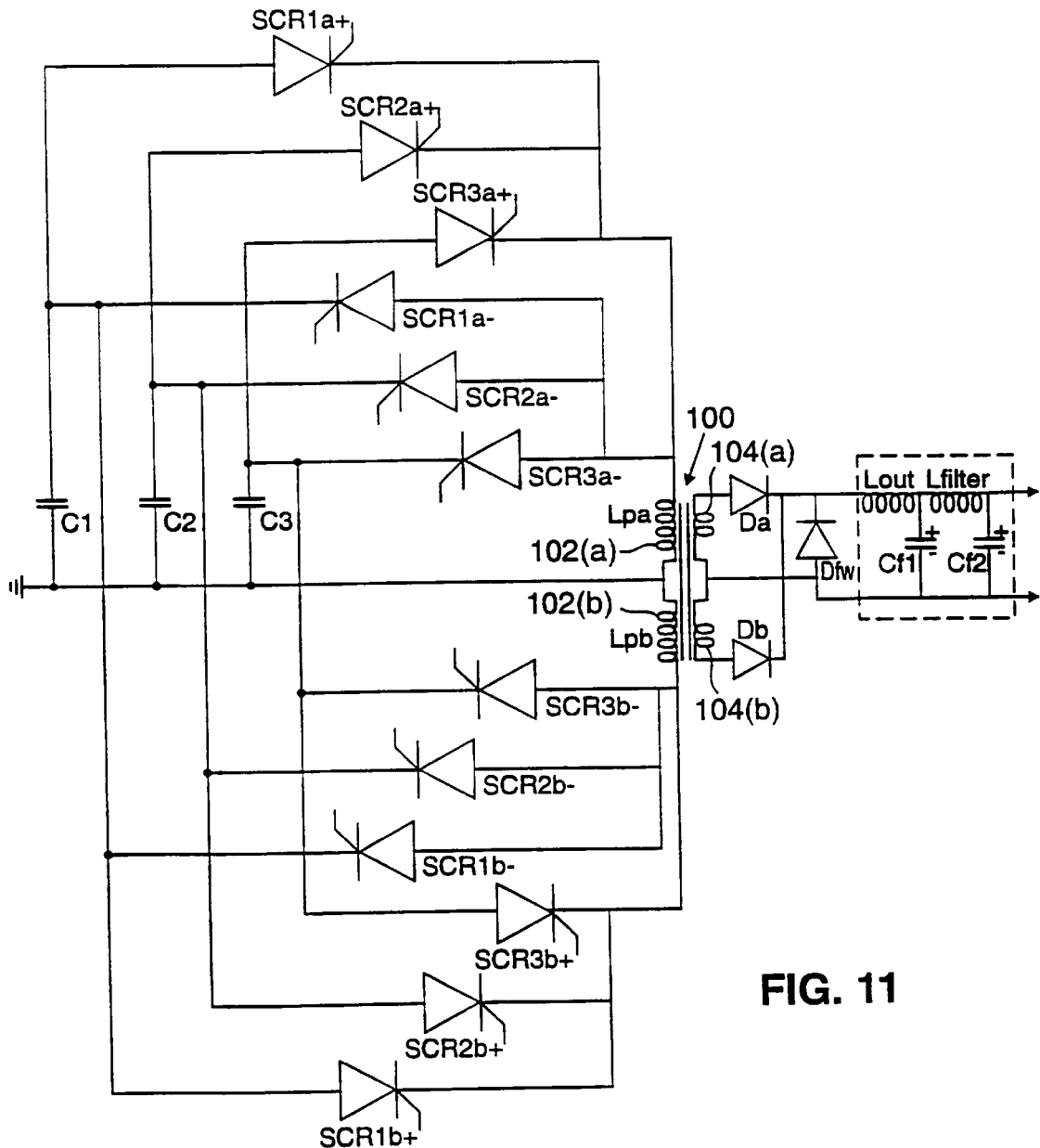
FIG. 11 is a circuit diagram of a circuit which uses sequential discharge in connection with a step-down pulse transformer.

An illustrative configuration is shown in FIG. 11. As before, there are three capacitors, $C_1$, $C_2$, and $C_3$, each of which is charged from some power source, e.g. a three phase line (not shown). The charging circuit for each capacitor might be a corresponding different PCS module or it might be a simple resonant charging circuit, such as is illustrated in FIG. 8. In the latter case, each capacitor $C_1$, $C_2$ and $C_3$ is resonantly charged by an SCR and inductor in series. The resulting voltage on each capacitor will be twice the instantaneous voltage of input line and it will have the same polarity as that instantaneous line voltage. When the resonant charging is complete, the capacitors are sequentially discharged in order of their absolute voltage levels, as has been described previously.

In the circuit of FIG. 11, the capacitors are discharged through a coupling pulse transformer 100 into a shared output inductor, $L_{out}$. Transformer 100 has two primaries 102(a) and 102(b) and it has two secondaries 104(a) and 104(b). Each of the dual secondaries 104(a) and 104(b) is connected to inductor $L_{out}$ through a corresponding one of two output diodes $D_a$ and $D_b$, which select the positive voltage output polarity. The rest of the output section is as previously described. It includes a free-wheeling diode $D_{fw}$ and a low pass output filter section including $L_{filter}$, $C_{f1}$, and $C_{f2}$. Free-wheeling diode $D_{fw}$ assures that any energy remaining in the output inductor $L_{out}$ is transferred to the load following the last capacitor discharge and it also prevents the voltages across the capacitors from reversing after they are discharged to zero volts during the discharging cycle.

An array of SCR's coupling the capacitors to the transformer 100 steer the discharge of each capacitor to the appropriate one of the two primaries 102(a) and 102(b) of transformer 100, depending upon the polarity of the voltage on the capacitor that is being discharged and depending upon the direction of the magnetic flux within the core of transformer 100 from a preceding discharge cycle. Four SCR's (namely, $SCR_{1a+}$, $SCR_{1a-}$, $SCR_{1b+}$, and $SCR_{1b-}$) provide separate discharge paths from capacitor $C_1$ to transformer 100. $SCR_{1a+}$ is used to discharge a positively charged $C_1$ through primary 102(a); $SCR_{1b+}$ is used to discharge a positively charged $C_1$ through primary 102(b); $SCR_{1a-}$ is used to discharge a negatively charged $C_1$ through primary 102(a); and $SCR_{1b-}$ is used to discharge a negatively charged $C_1$ through primary 102(b). A corresponding set of SCR's, which are labeled in a similar manner, are used steer the discharge of capacitors $C_2$ and $C_3$.

A control module (not shown, but previously described) establishes the triggering sequence which assures proper transformer flux reversal from one discharge cycle to the next. The circuit of FIG. 11 permits the use of three-phase input power directly, and eliminates the need for both a AC step-down transformer and a polarity inverting transformer.

Note that the use of the dual primary—dual secondary transformer allows one to reverse the magnetic flux in the core from one triggering sequence to the next. This means that an even smaller transformer can be used without fear of saturating its core during operation.

An example of a triggering sequence will now be presented in detail to further illustrate the operation of the circuit shown in FIG. 11. Assume, for purposes of this example, that the three capacitors $C_1$, $C_2$ and $C_3$ are being charged from a three-phase 440 V, 60 Hz AC line and that the trigger rate is 48 times per cycle or 2,880 times per second. The voltage on each capacitor at the end of each charging cycle can be determined by the following equations:

$V_{c1} = 2 \times A \sin(\omega t)$ $V_{c2} = 2 \times A \sin(\omega t + 2\pi/3)$ $V_{c3} = 2 \times A \sin(\omega t - 2\pi/3)$ where "A" is the AC input voltage amplitude of 392 volts.

Table II shows capacitor voltages vs. time and it presents the triggering sequence over an angle of 60 degrees. The table has eight entries separated in time by 7.5 electrical degrees, or every 0.347 msec. The capacitor charge voltage and polarity is shown in columns 2 through 4. Column 5 shows the capacitor discharge sequence, and column 6 shows the SCR triggering sequence.

TABLE II

| Time (msec) | $V_{c1}$ (Volt) | $V_{c2}$ (Volt) | $V_{c3}$ (Volt) | Capacitor Sequence | Triggering Sequence |
|---|---|---|---|---|---|
| 0.174 | 51.3 | 651.8 | −703.0 | 3, 2, 1 | 3b−, 2a+, 1a+ |
| 0.521 | 152.9 | 589.4 | −742.2 | 3, 2, 1 | 3a−, 2b+, 1b+ |
| 0.868 | 251.9 | 516.9 | −768.8 | 3, 2, 1 | 3b−, 2a+, 1a+ |
| 1.215 | 346.7 | 435.5 | −782.2 | 3, 2, 1 | 3a−, 2b+, 1b+ |
| 1.563 | 435.5 | 346.7 | −782.2 | 3, 1, 2 | 3b−, 1a+, 2a+ |
| 1.910 | 516.8 | 252.0 | −768.8 | 3, 1, 2 | 3a−, 1b+, 2b+ |
| 2.257 | 589.3 | 153.0 | −742.3 | 3, 1, 2 | 3b−, 1a+, 2a+ |
| 2.604 | 651.7 | 51.3 | −703.1 | 3, 1, 2 | 3a−, 1b+, 2b+ |

To understand how to interpret Table II, look at the first row where time equals 0.174 msec. A charging cycle occurring at this point in the input voltage cycle, charges each of the capacitors to the voltages shown in the columns labeled $V_{c1}$, $V_{c2}$, and $V_{c3}$. Thus, at the end of the first charging cycle, the voltages on $C_1$, $C_2$, and $C_3$ are +51.3, +651.8, and −703.0, respectively. Since the magnitude of the voltage on $C_3$ is largest and the magnitude of the voltage on $C_1$ is smallest, the discharge sequence will be 3-2-1, as indicated in the column which is entitled "Capacitor Sequence". Since $C_3$ is charged to a negative voltage, either $SCR_{3a-}$ or $SCR_{3b-}$ must be used to discharge it through coupling transformer 100. In this case, the choice was $SCR_{3b-}$, as indicated in the column entitled "Triggering Sequence". Once the voltage across $C_1$ reaches zero volts, $C_2$ is discharged through $SCR_{2a+}$, followed by the discharge of $C_1$ through $SCR_{1a+}$. Notice that the SCR's that are selected to steer the discharge are selected to keep the magnetic flux in the transformer core going in the same direction throughout the entire discharge sequence.

At the end of the discharge sequence the voltages on the capacitors will be zero. During the next charging cycle, which occurs at T=0.521 msec, the capacitors will be charged to the voltages shown in the second row of Table II. Since $C_3$ again has the largest voltage and $C_1$ the smallest, the discharge sequence will be the same as before, namely, 3-2-1. This time, however, the SCR's are selected so as to reverse the magnetic flux in the transformer core as compared to the previous discharge cycle. Thus, to discharge $C_1$ instead of triggering $SCR_{3b}$, the control module triggers $SCR_{3a-}$. When $V_{c1}$ reaches zero, $SCR_{2b+}$ is triggered to discharge $C_2$ and then $SCR_{1b+}$ is triggered to discharge $C_1$.

Figure 12:
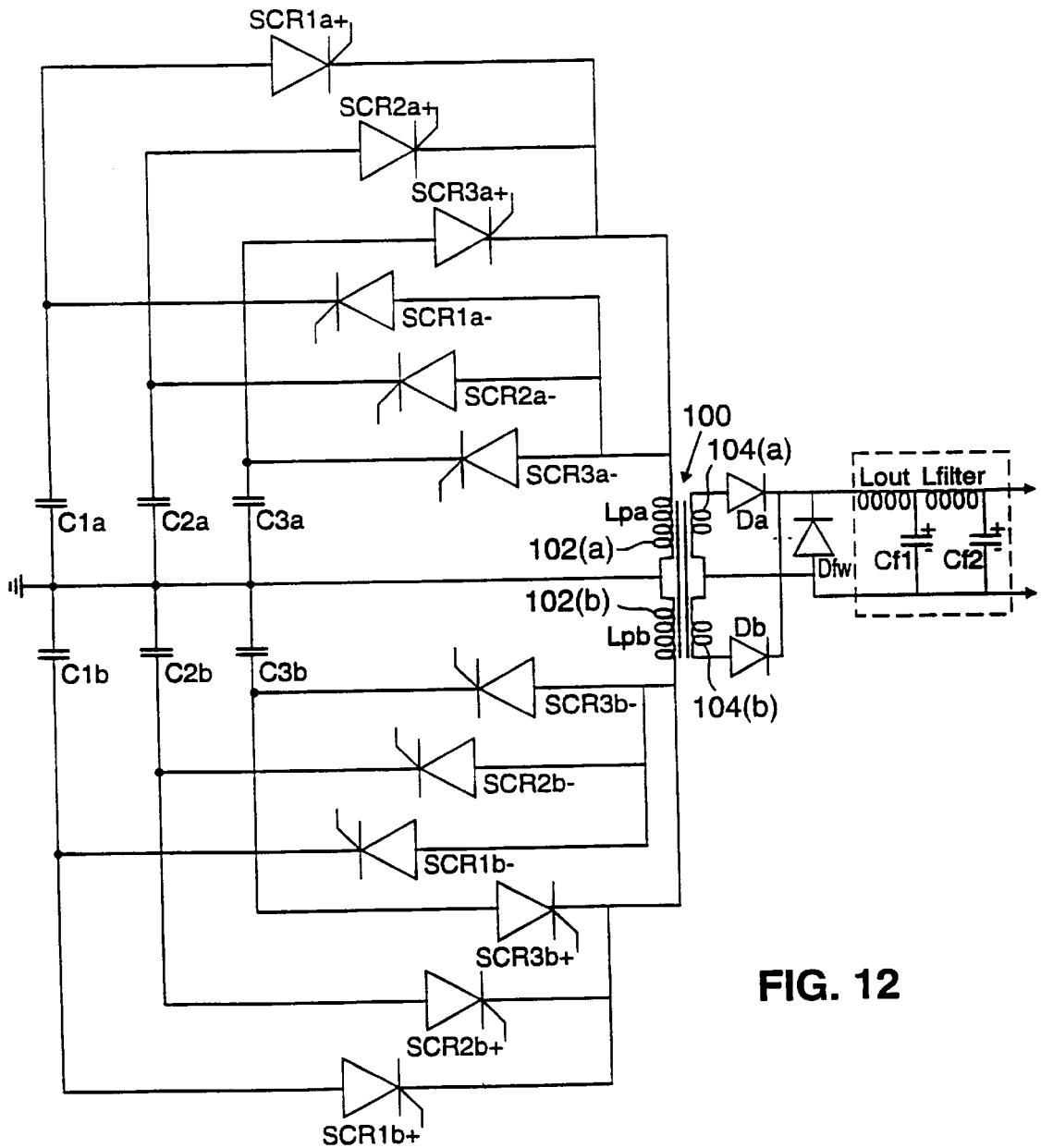
FIG. 12 is a modified version of the circuit shown in FIG. 11 including two sets of input capacitors for increased throughput.

By adding a second bank of capacitors as shown in the dual input configuration shown in FIG. 12, we can effectively double the power throughput of the system. In this configuration, there are two banks of capacitors, an upper bank labeled "a" and a lower bank labeled "b". The upper bank includes capacitors $C_{1a}$, $C_{2a}$, and $C_{3a}$, each of which is charged from a different phase of a three phase input grid. The lower bank includes capacitors $C_{1b}$, $C_{2b}$, and $C_{3b}$, each of which is also charged from a different phase of a three phase input grid. The capacitors are grouped in pairs (e.g. $C_{1a}$ and $C_{1b}$), each pair being charged from the same phase of the input grid. As one capacitor of a pair is being charged, the other capacitor of that pair is being discharged.

Each of the capacitors in the upper bank is connected to an upper primary 102(a) of coupling transformer 100 through two SCR's that are arranged in parallel but with their polarities reversed with respect to each other. For example, $C_{1a}$ is connected to upper primary 102(a) through $SCR_{1a+}$ which when triggered allows current to flow from capacitor $C_{1a}$ to upper primary 102(a), and through $SCR_{1a-}$ which when triggered allows current to flow from upper primary 102(a) to capacitor $C_{1a}$. $SCR_{1a+}$ is used to discharge capacitor $C_{1a}$ when its voltage is positive and $SCR_{1a-}$ is used to discharge capacitor $C_{1a}$ when its voltage is negative. The discharge circuits for capacitors $C_{2a}$ and $C_{3a}$ are arranged similarly and thus the corresponding components in FIG. 12 are labeled in like fashion.

Similarly, each of the capacitors in the lower bank is connected to a lower primary 102(b) of coupling transformer 100 through two SCR's that are arranged in parallel but with their polarities reversed with respect to each other.

This circuit configuration greatly improves the utilization of the thyristors by allowing the first set of capacitors to be charged from the input grid during the discharge cycle of the second set. It also allows the operating frequency to be about twice that of the configuration of FIG. 11. If the operating frequency is doubled, this reduces the filter requirements and lessens the total cost per unit power throughput.

In the dual input configuration, each pair of capacitors (e.g. $C_{1a}$ and $C_{1b}$) shares an input filter, and all capacitors may share an output transformer, output diodes and the output filter. Thus, this configuration also has the effect of lowering the overall system cost.

The doubled operation is shown in Table III. As can be seen, the charging rate and power throughput has been increased by a factor of two. The charging and discharging sequence is identical to than of Table II, except that the rate has been increased.

TABLE III

| Time (msec) | $V_{c1}$ (Volt) | $V_{c2}$ (Volt) | $V_{c3}$ (Volt) | Capacitor Discharge Sequence | Triggering Sequence |
|---|---|---|---|---|---|
| 0.174 | 51.3 | 651.8 | −703.0 | 3b, 2a, 1a | 3b1, 2a+, 1a+ |
| 0.347 | 102.3 | 621.9 | −724.1 | 3a, 2b, 1b | 3a−, 2b+, 1b+ |
| 0.521 | 152.9 | 589.4 | −742.2 | 3b, 2a, 1a | 3b−, 2a+1b+ |
| 0.694 | 202.9 | 554.3 | −757.1 | 3a, 2b, 1b | 3a−, 2b+, 1b+ |
| 0.868 | 251.9 | 516.9 | −768.8 | 3b, 2a, 1a | 3b−, 2b+, 1a+ |
| 1.042 | 300.0 | 477.2 | −777.1 | 3a, 2b, 1b | 3a−, 2b+, 1b+ |
| 1.215 | 346.7 | 435.5 | −782.2 | 3b, 2a, 1a | 3b−, 2a+, 1a+ |
| 1.389 | 391.9 | 392.0 | −783.8 | 3a, 2b, 1b | 3a−, 2b+, 1b+ |
| 1.563 | 435.5 | 346.7 | −782.2 | 3b, 1a, 2a | 3b−, 1a+, 2a+ |
| 1.736 | 477.2 | 300.0 | −777.1 | 3a, 1b, 2b | 3a−, 1b+, 2b+ |
| 1.910 | 516.8 | 252.0 | −768.8 | 3b, 1a, 2a | 3b−, 1a+, 2a+ |
| 2.083 | 554.2 | 202.9 | −757.2 | 3a, 1b, 2b | 3a−, 1b+, 2b+ |
| 2.257 | 589.3 | 153.0 | −742.3 | 3b, 1a, 2a | 3b−, 1a+, 2a+ |
| 2.431 | 621.8 | 102.4 | −724.2 | 3a, 1b, 2b | 3a−, 1b+, 2b+ |
| 2.604 | 651.7 | 51.3 | −703.1 | 3b, 1a, 2a | 3b−, 1a+, 2a+ |
| 2.778 | 678.8 | 0.0 | −678.9 | 3a, 1b, 2b | 3a−, 1b+, 2b+ |

Notice that in Table III the time steps have been reduced and there is reference to capacitor banks a and b (for the upper or lower capacitors, respectively).

The trigger timing of the second and third output SCR's, in the sequence shown in Table III, is such that no energy remains in the capacitors and no free-wheeling current flows until the last capacitor is discharged. During normal operation, the maximum free-wheeling current is only a fraction of the total output current. The free-wheeling diode's function is not only to facilitate the full capacitor energy transfer but also to permit output voltage regulation.

The losses in the output diode of a standard half-wave rectification system are identical to those in the free-wheeling diode in a SDR system. For low output voltage systems the dominating losses occur in the output diodes. In either configuration, the total output current has to flow through one of the two diodes. The SDR system overcomes the inherently greater losses by operating at a higher voltage, thus minimizing the current through the switches. The losses in the thyristor are inversely proportional to the input voltage. If the input current is a factor of 20% to 50% higher than the output voltage, the thyristors increase the effective rectification losses by less than 10%. A large SDR installation could efficiently operate directly off the 11 kV substation voltage, thereby reducing the thyristor losses to an insignificant value.

An SDR system operating at a frequency of 1.5 kHz will be able to use a much smaller step-down transformer with a smaller amount of core material than can a system that operates at 60 Hz. The cost savings realized by using a significantly smaller transformer can be used to improve the quality of the core, improving the overall system efficiency without effecting the overall cost. This will, in part or completely cancel the thyristor losses, depending on the detailed operating conditions. Also, it should not be forgotten that SDR systems do not require any harmonic filtering or VAR compensation, therefore, the losses of these components are also eliminated.

The triggering sequences given in Tables II and III are such that the flux in the core is not reversed during a single discharge sequence. This requires a minimum core size based on the full duration of a discharge sequence. The core flux is reversed for the next sequential discharge, completing the transformer output cycle.

The core size can be reduced even further with the same components by reversing the core flux during each output sequence. Selecting a charging and triggering sequence as shown in Table IV meets this objective. The core flux is typically alternated for the first pulse of each consecutive discharged sequence, while the current and flux for the second and third discharge of the sequence is reversed from that of the first discharge. This results in a nearly complete core reset for each sequential output. The net result is an additional reduction of the core size over the cores with the discharge sequence shown in Table II and Table III.

TABLE IV

| Time (msec) | $V_{c1}$ (Volt) | $V_{c2}$ (Volt) | $V_{c3}$ (Volt) | Capacitor Discharge Sequence | Triggering Sequence | Flux Direction |
|---|---|---|---|---|---|---|
| 0.174 | 51.3  | 651.8 | −703.0 | 3a, 2a, 1a | 3a−, 2a+, 1a+ | up down down |
| 0.347 | 102.3 | 621.9 | −724.1 | 3b, 2b, 1b | 3b−, 2b+, 1b+ | down up up |
| 0.521 | 152.9 | 589.4 | −742.2 | 3a, 2a, 1a | 3a−, 2a+, 1a+ | up down down |
| 0.694 | 202.9 | 554.3 | −757.1 | 3b, 2b, 1b | 3b−, 2b+, 1b+ | down up up |
| 0.868 | 251.9 | 516.9 | −768.8 | 3a, 2a, 1a | 3a−, 2a+, 1a+ | up down down |
| 1.042 | 300.0 | 477.2 | −777.1 | 3b, 2b, 1b | 3b−, 2b+, 1b+ | down up up |
| 1.215 | 346.7 | 435.5 | −782.2 | 3b, 2b, 1b | 3b−, 2b+, 1b+ | up down down |
| 1.389 | 391.9 | 392.0 | −783.8 | 3b, 2b, 1b | 3b−, 2b+, 1b+ | down up up |
| 1.563 | 435.5 | 346.7 | −782.2 | 3a, 1a, 2a | 3a−, 1a+, 2a+ | up down down |
| 1.736 | 477.2 | 300.0 | −777.1 | 3b, 1b, 2b | 3b−, 1b+, 2b+ | down up up |
| 1.910 | 516.8 | 252.0 | −768.8 | 3a, 1a, 2a | 3a−, 1a+, 2a+ | up down down |
| 2.083 | 554.2 | 202.9 | −757.2 | 3b, 1b, 2b | 3b−, 1b+, 2b+ | down up up |
| 2.257 | 589.3 | 153.0 | −742.3 | 3a, 1a, 2a | 3a−, 2a+, 2a+ | up down down |
| 2.431 | 621.8 | 102.4 | −724.2 | 3a, 1b, 2b | 3b−, 1b+, 2b+ | up down down |
| 2.604 | 651.7 | 51.3  | −703.1 | 3a, 1a, 2a | 3a−, 1a+, 2a+ | up down down |
| 2.778 | 678.8 | 0.0   | −678.9 | 3b, 2b     | 3b−, 2b+       | down up |

SDR systems have several advantages over standard half-wave rectification systems. The output can be precisely regulated, and one can provide short circuit protection and fast disconnect capability. Should a fault occur, the system can be shut down in less than one millisecond. Only the residual energy stored in the filter capacitor can rush into the fault. With the typical energy stored in the filter capacitors this is generally less than the energy used in 2.5 milliseconds.

To see how the SDR system stacks up against a system of similar performance, one could compare it with a phase-control regulated system with regulated output and fault protection. A phase-control regulated system increases the half-wave system losses by the losses of the phase-control thyristors. Assumed to be on the input side of the AC step-down transformer, the additional losses equal that of the SDR thyristors and make the total solid-state device losses for both systems identical. Furthermore, the phase control devices produce additional harmonics that need to be neutralized with additional and larger harmonic filters.

Using the SDR technology will significantly reduce transformer size, as well as system size and volume. The transformer couplings, in conjunction with sequential discharging, permits several different electrical configurations. Multiple input transformer windings may be used. For example, one is not restricted to use the phase-to-neutral configurations implied in FIGS. 11 and 12. Instead, one may use the phase-to-phase input voltage directly in conjunction with isolated transformer windings. This opens up additional options and, for some applications, improves the performance even further.

In addition, full wave rectification may replace the half wave rectification if the required output voltage level is higher.

Figure 13:
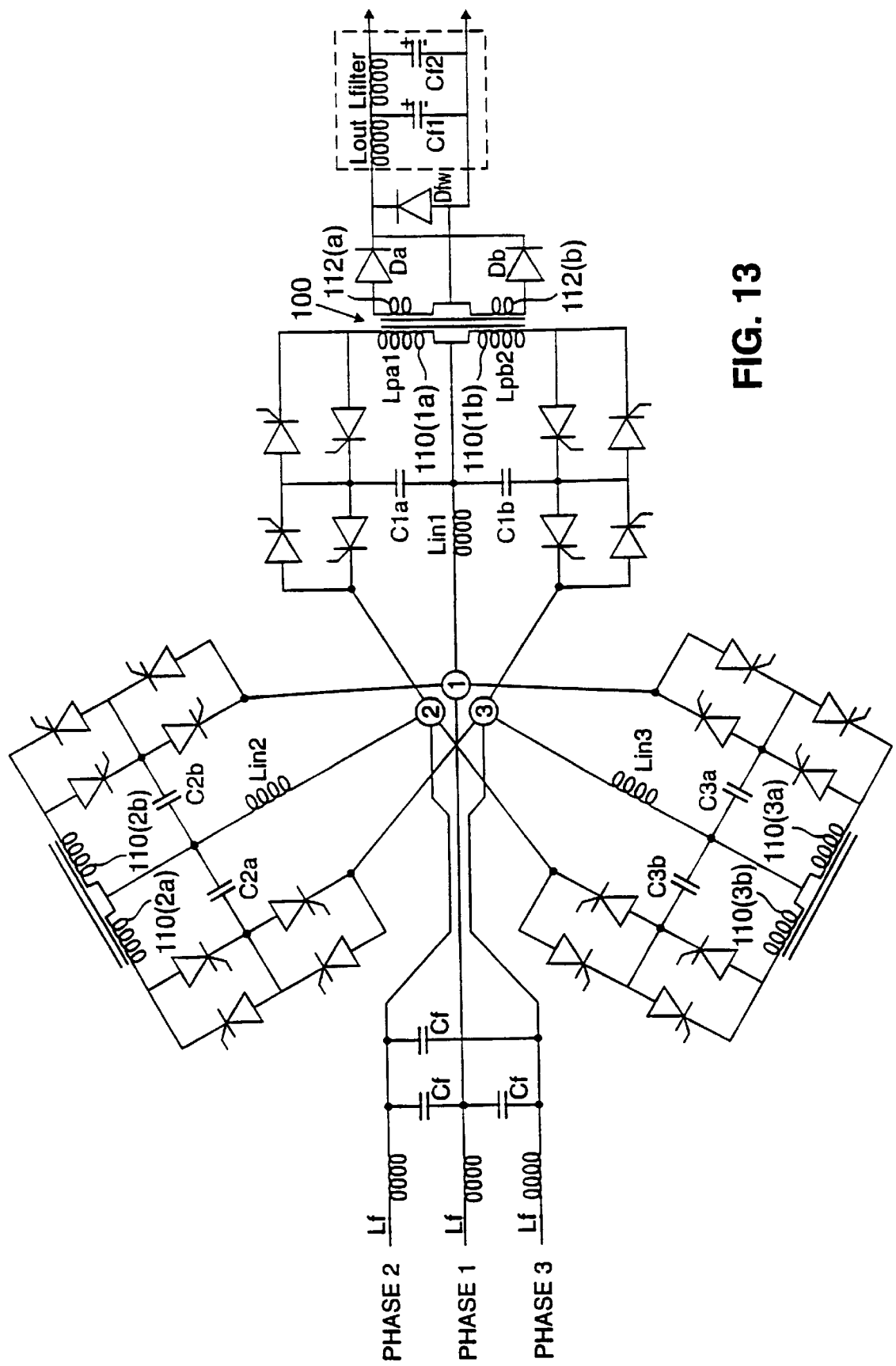
FIG. 13 is another modified sequential discharge rectification circuit which employs a phase-to-phase input section.

FIG. 13 shows a three-phase configuration that permits charging directly from a three-phase grid using a phase-to-phase input. Six capacitors, labeled $C_{1a}$, $C_{1b}$, $C_{2a}$, $C_{2b}$, $C_{3a}$, and $C_{3b}$, make up two separate sets of three capacitors that can be charged and discharged alternately, as described above. The circuit of FIG. 13 uses three dual primaries 110(1a) and 110(1b), 110(2a) and 110(2b), and 110(3a) and 110(3b), and one dual secondary 112(a) and 112(b), permitting flux reversal for each capacitor discharge within a discharge cycle. The system is configured so that each pair of capacitors (i.e., $C_{1a}$ and $C_{1b}$, $C_{2a}$ and $C_{2b}$, and $C_{3a}$ and $C_{3b}$) has in its output leg a corresponding pair of dual primaries which makes it possible to reverse the flux between alternate discharges, as previously described in connection with FIG. 12. In each case, the shared output inductor $L_{out}$ is the one being 'charged'.

Note that FIG. 13 also includes the input charging circuits for all of the capacitors. The power from each phase is filtered by a low pass filter which, in this example, includes a series inductor $L_f$ and a shunt capacitor $C_f$. Each of the capacitors is then resonantly charged through an inductor $L_{INi}$ (where I=1,2,3). The charging cycles for each capacitor are controlled by a pair of parallel SCR's. the discharging circuits are the same as those which were illustrated in FIG. 12, except that each pair of capacitors (e.g. $C_{1a}$ and $C_{1b}$) is connected to a different dual primary instead of the same dual primary (e.g. in the case of $C_{1a}$ and $C_{1b}$ it is dual primaries 110(1a) and 110(1b)).

The discharging is controlled so that a first set of capacitors, consisting of $C_{1a}$, $C_{2a}$, and $C_{3a}$, may use one set of three primary windings during one discharge phase while a second set of capacitors, consisting of $C_{1b}$, $C_{2b}$, and $C_{3b}$, uses the other set of three primary windings during the next discharge phase. In this way, the voltage polarity is reversed on each dual winding per charge and discharge cycle. Typically, the core would see an operation similar to that covered in Table IV.

Finally, a transformer, configured as in the previous operation, would create a complete flux reversal only between each charge and discharge cycle. This would correspond to the operation as described in Table III. Depending on the operating conditions and component characteristics, each configuration (i.e., the circuits of FIGS. 11, 12, and 13) may have an advantage over the other two. The second operating configuration (i.e., FIG. 12) would permit use of a smaller total core volume, while the first and third configurations (i.e., FIGS. 11 and 13) might be more appropriate for high power throughput requirements.

The transformer-coupled configuration permits isolation between the primary and secondary and increases system flexibility. This permits the secondary to float and permits the use of the phase to phase voltage or a dual input power system. In addition, a standardized input section with optimum design might be developed for many different output voltage requirements. Only the output transformer and filtering section need to be modified for the different voltage requirements. No problems can occur while parallel modules are operational, since the power throughput sharing can be precisely controlled.

In summary, the SDR can be adopted to any voltage range of interest with high efficiency with the use of a high frequency output transformer. This permits the sequential control to be performed at a high voltage to minimize the thyristor losses. In addition, this technique produces a reduction in cost, losses, volume and weight of the AC step-down transformer.

Using Transformer Input/Output with the PCS

Step-Up Configurations:

As indicated in the earlier patent, an advantage of the Power Conditioning System (PCS) is that it requires no transformer or AC link to change the voltage. Eliminating AC transformers from the power distribution system significantly reduces complexity and cost, increases efficiency, and most importantly appeals to the technical community. However, as suggested above, there may be instances in which it is beneficial to also use transformers in the PCS system.

For example, note that the PCs losses are mainly switching losses from the thyristors. It can be shown that the loses (i.e., η) are approximately equal to:

$$\eta(\%) = 100 \times 2 \times (V_f/V_o) \times (N+2);$$

where N is the transformation ratio of the PCS, $V_f$ is the forward voltage drop of the switch, and $V_o$ is the switch voltage operating level. The advantage of a thyristor is that devices up to $V_o=12,000$ volts are available for efficient high voltage operation. Since the typical thyristor has a forward voltage drop of $V_f=2.0$ volts, the efficiency is better than 99.5% for a transformation ratio on the order of N=10. The problem, however, is that thyristors, both SCRs and GTOS, are four layer devices with a voltage drop that is independent of the operating voltage. Therefore, it follows that if we use a thyristor for low voltage operation, such as 10 volt solar or fuel cells or 110 volt consumer power, the ratio ($V_f/V_o$) is high, thus lowering the overall efficiency of the system. If lower input voltages are used to generate higher output voltages, the transformation ratio N also needs to be larger, thereby causing an additional reduction in efficiency. With such losses, the PCS would have limited appeal in consumer markets and some industrial markets in comparison o alternative more conventional approaches. However, by adding a pulsed transformer to the PCS that operates at high frequencies, the efficiencies can be significantly improved and the overall transformation ratio can also be increased.

Figure 14:
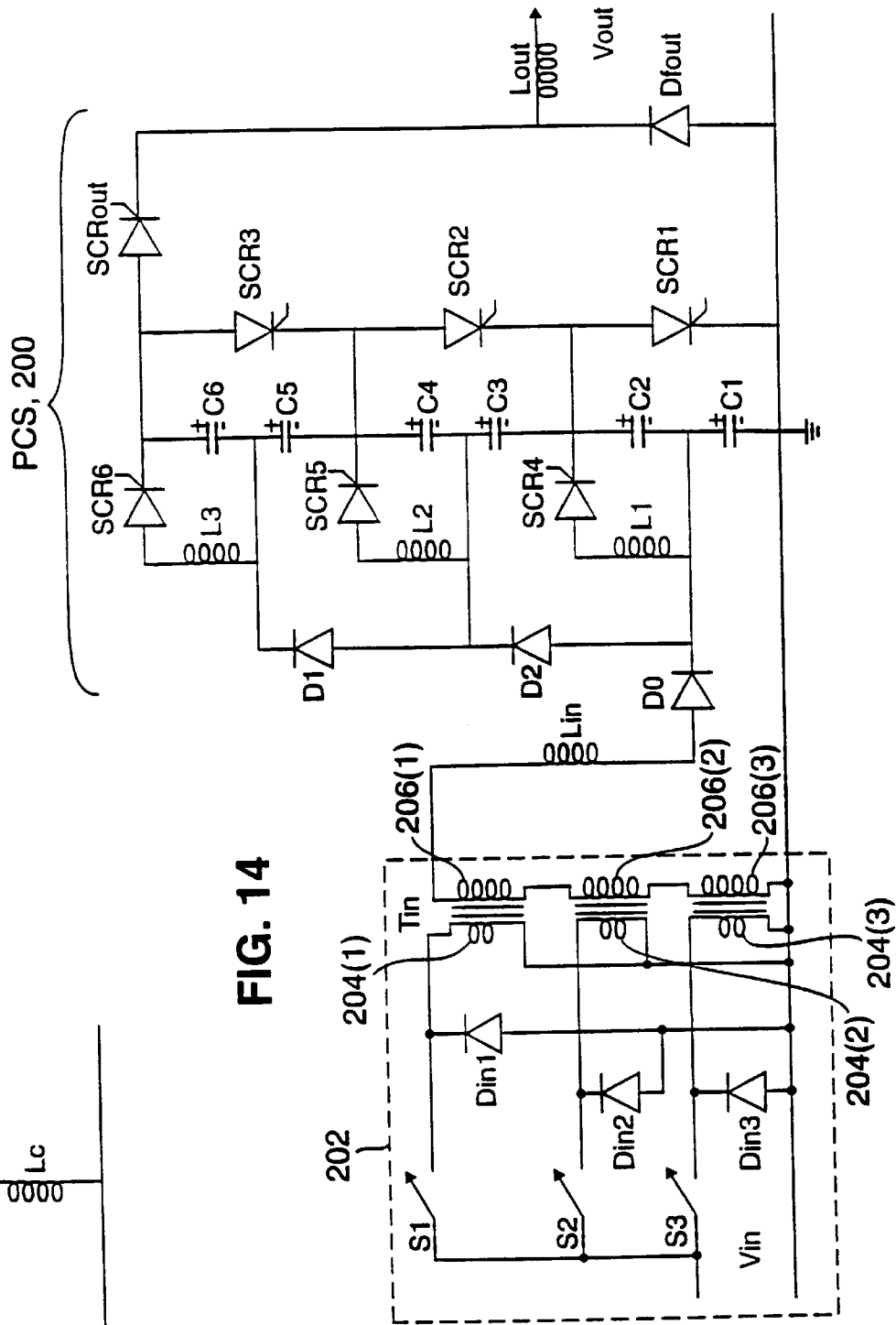
FIG. 14 is a circuit diagram of a PCS with a transformer coupled input section.

In this hybrid configuration, which is used for medium power, lower voltage operation, the pulsed transformer can be either added to the input or the output of the PCS. If the initial voltage is in the low voltage range and it must be stepped up to a higher voltage, the transformer would be added to the input side. If the input voltage is high and it must be stepped down, then the transformer would be added on the output side. To illustrate this approach, I will first describe a PCS step-up circuit using a modified low voltage input, as show in FIG. 14.

The circuit includes a basic step-up PCS module 200 connected to a pulsed transformer input section 202. The basic PCS circuit is a 1:6 voltage step-up configuration constructed as described in U.S. Pat. No. 5,270,913, with the exception that a diode ($D_o$) is used in place of an SCR on the input side of the PCS module.

Pulsed transformer input section 202 includes a transformer $T_{IN}$ configured to step-up the input voltage by a moderate amount. In the described embodiment, transformer $T_{IN}$ includes multiple (e.g. three) primary input windings 204(1), 204(2), and 204(3) operated in parallel and three secondary windings 206(1), 206(2), and 206(3) connected in series. Depending on the magnetics design, one may either use a separate transformer core for each primary input winding or a single core with multiple primary input windings. In the illustrated embodiment, three cores each with an associated secondary winding are used. In this configuration, the effective transformer step-up ratio is the product of the number of cores times the turns ratio of each transformer section.

Transformer input section 202 also includes three input switches labeled $S_1$, $S_2$, and $S_3$, each of which controls the power to a corresponding one of the primary windings. This configuration permits good current sharing control and full average current rating utilization. Transformer input section 202 steps-up the input voltage before it is applied to the PCS charging system. This permits us to operate the SCR's (e.g. thyristors) in the PCS module at a higher voltage and thus achieve a higher efficiency, since both the ($V_f/V_o$) ratio and the PCS multiplication of N (N=6) is kept low.

Solid state switching devices have been developed to operate at the low to medium voltage ranges with a significantly lower forward voltage drop than is found in thyristors. Examples of devices which can be used for the switches $S_1$–$S_3$ are power FET's, IGPT's and, depending upon the application, even conventional bipolar transistors.

Figure 15:
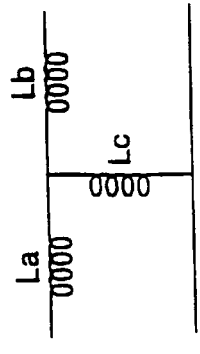
FIG. 15 is an equivalent circuit of the transformer shown in FIG. 14.

The pulsed input transformer is shown in an equivalent configuration in FIG. 15. It includes an input inductance $L_a$, an output inductance $L_b$, and a shunt inductance Ls. Typically, shunt inductance $L_s$ is large so that, from an operational point of view, the charging inductance as seen by the transformer input section consists of three inductors in series: $L_a$, $L_b$, and $L_{in}$. The operation of the circuit includes a charge cycle, an inversion cycle, and a discharge cycle. During the charge cycle, capacitors $C_1$–$C_6$ of the PCS module are all charged to the same voltage from the power source. During the inversion cycle, the voltages on capacitors $C_2$, $C_4$, and $C_6$ are inverted with the aid of inductors $L_1$, $L_2$, and $L_3$, respectively. And during the discharge cycle, the charge that was stored in the series connected capacitors $C_1$–$C_6$ is injected at the transformed voltage into a load through output inductor, $L_{out}$.

Charging is started by simultaneously closing the low voltage input switches $S_1$, $S_2$, and $S_3$ and triggering the return current thyristors $SCR_1$, $SCR_2$, and $SCR_3$. Assuming that the transformer ratio is N, then each of the capacitors will be resonantly charged through a resonant charging inductor $L_{IN}$ to $2 \times 3 \times N \times V_{IN}$. Note that diode $D_o$ prevents capacitor $C_1$ from discharging through the secondary pulse transformer.

In this voltage step-up mode, the capacitor string is charged in an alternating sequence such that each adjacent capacitor has the opposite voltage polarity. The voltage of the capacitor string, when fully charged, is thus zero. The charging period is defined by the input charging inductance (i.e., $L_{IN}+L_a+L_b$) and the parallel capacitor value (i.e., six times $C_1$, assuming the capacitors are all of the same value).

With $SCR_1$, $SCR_2$, and $SCR_3$ recovered, the triggering of $SCR_4$, $SCR_5$, and $SCR_6$ starts the inversion cycle. The purpose of the step-up inversion cycle is to change the polarity of half of the capacitors in the capacitor string such that all of the capacitors have the same polarity. In the circuit shown in FIG. 14, the polarity of capacitors $C_2$, $C_4$, and $C_6$ are reversed to generate a positive output voltage. The SCR's are important for the inversion process because they prevent the current from ring back through the inductor and allow the extraction of the inverted energy in an efficiently and controlled fashion.

At the conclusion of the inversion cycle, the total voltage across the string of series connected capacitors (i.e., $C_1$ through $C_6$) will be six times the voltage across $C_1$ (or twelve times the output voltage of the transformer). The positive voltage across the $C_1$ to $C_6$ capacitor stack can then be switched to the output by another SCR (i.e., $SCR_{out}$).

Note that as previously described, the sequence of charging, inversion, and discharging occurs multiple times per second, e.g. 1–2 kHz or higher. Thus, if the voltage source is a 60 Hz AC voltage source, then $V_{IN}$ to transformer input section 202 is the instantaneous voltage of the AC voltage waveform at the time at which the charge cycle. The components are selected so that the charge cycle, the inversion cycle, and the discharge cycle can each complete in a short time, e.g. shorter than 1 ms.

Assuming that we start out with a low voltage ($V_{in}$) from a low voltage power source such as solar cells, storage batteries or fuel cells, the input voltage will be significantly lower than 100 volts and the required step-up ratio that is required will typically be much higher than 6. If only a PCS module were to be used to handle the entire transformation, the low input voltage and the high step-up ratio that is required would result in poor efficiency. However, by using the pulsed transformer input section to provide some of the step-up transformation, the overall efficiency of the circuit can be greatly improved.

Figure 16:
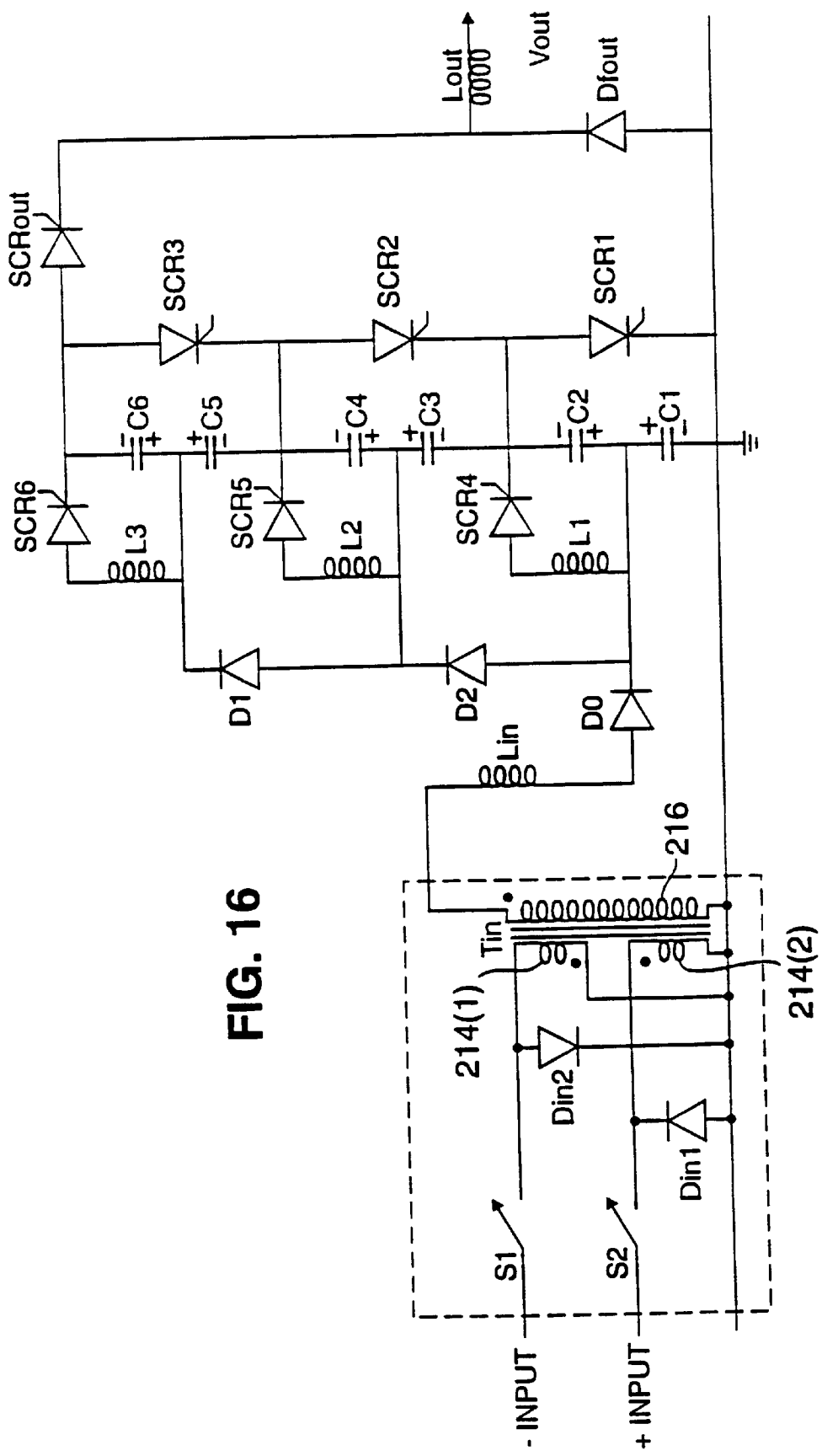
FIG. 16 is a circuit diagram of a PCS with a dual polarity transformer coupled input section.

Additional windings may be used on each core to implement additional input from separate voltage sources or sources of opposite polarity. An example of such an implementation is shown in FIG. 16. In that case, a dual polarity source, identified as –Input and +Input, is used. In this case, transformer input section 212 includes a pulse transformer with two primary windings 214(1) and 214(2) wound in opposite directions around a common core. A secondary winding input 216 is connected to the input side of the PCS module as previously described. In all other respects, the circuit is the same as that shown in FIG. 14 and thus the other components are similarly identified.

To utilize both polarities of the AC input waveform in the basic PCS module, it is necessary to add thyristors in parallel (but of opposite polarity) with the thyristors in the charging and inversion circuits. As can be seen, in the embodiment of FIG. 16, the second set of thyristors is not necessary. Thus, this modified circuit with the dual polarity input section significantly reduces the parts count and cuts the probability of thyristor failure nearly in half, in comparison with a basic PCS module without a transformer input section. In addition, if diodes are be used for the PCS interstage isolation components, such as $D_1$ and $D_2$ in FIGS. 14 and 16, additional benefits are obtained. First, the use of a high voltage diode with only one junction for a thyristor which has three junctions, reduces the losses in those locations where this substitution is possible. Secondly, the control system is simplified, since diodes require no triggering. And finally, the cost is reduced, since diodes with similar power ratings are less expensive.

As indicated above, each input may have several switches and cores connected in parallel. This concept may be extended to multiple input sources in polarity and/or AC phases, and to multiple AC sources. In addition, the capacitor charging voltage may be regulated by using input switch on/off control, of specific benefit for lower power flow and input/output filter optimization.

Figure 17:
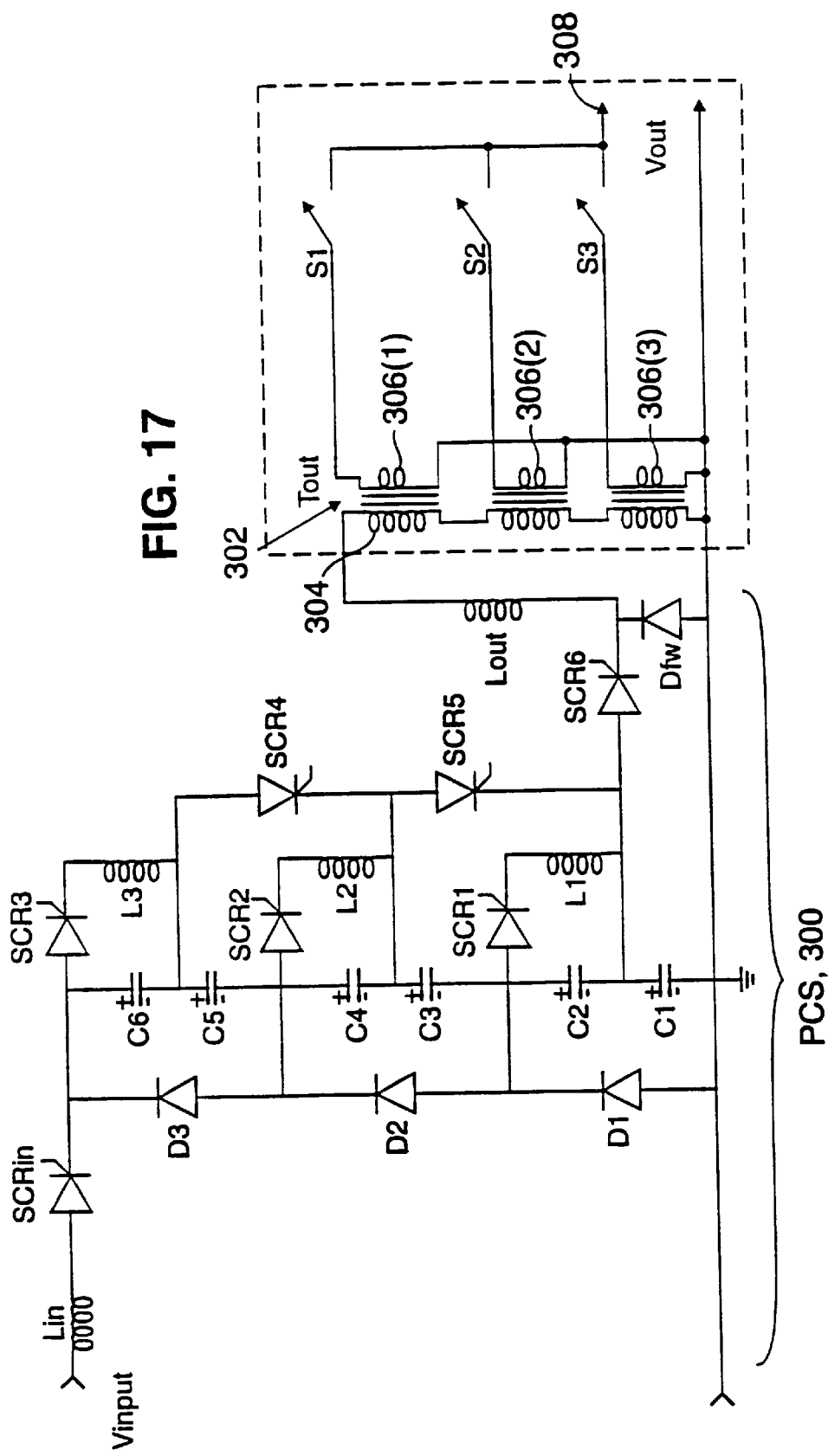
FIG. 17 is a circuit diagram of a PCS with a transformer coupled output section.

Step-Down Configurations:

A transformer may also be used in a step-down configuration, as shown in FIG. 17. In this example, a PCS module 300, which is configured as a step-down module, is used as a high voltage input section to the circuit. An additional step-down ratio is obtained by then using a low-loss, output step-down pulse transformer(s) 302 at the low voltage end. Transformer 302 include a primary 304 and three secondaries 306(1), 306(2), and 306(3). One side of each secondary is connected to ground and the other side of each secondary is connected through a corresponding one of low loss, low voltage switches ($S_1$, $S_2$, and $S_3$) to the output node 308. In this example, the step-down ratio from the primary to each secondary is 1/N; thus the overall step-down ratio of the transformer is 1/3N.

As before, there is a charge cycle, an inversion cycle and a discharge cycle. During the charge cycle, $SCR_{IN}$ is triggered and the series connected chain of capacitors $C_1$–$C_6$ is resonantly charged through $L_{IN}$ Up to $2V_{INPUT}$. During the inversion cycle, $SCR_1$, $SCR_2$, and $SCR_3$ are simultaneously triggered to enable inductors $L_1$, $L_2$, and $L_3$ to invert the voltages across each of capacitors $C_2$, $C_4$, and $C_6$, respectively. Finally, during the discharge cycle, $SCR_4$, $SCR_5$, and $SCR_6$ are triggered to discharge the capacitors, which are now configured in parallel arrangement through diodes $D_1$, $D_2$, and $D_3$. The discharge is through output inductor $L_{OUT}$ into the primary 304 of transformer 300. Simultaneously with the triggering of $SCR_6$, switches $S_1$ through $S_3$ are also turned on to allow the injection of the energy from the output of transformer 300 to be delivered to the output node, which might by a power distribution point or a terminal of a load (not shown).

As in the case of previous embodiments, the pulsed operation (consisting of a charge cycle, an inversion cycle, and a discharge cycle, occurs many times per second, e.g. 1–2 kHz.

Switches $S_1$ through $S_3$ can be implemented by any one of a wide selection of conventional switching devices such as, power FET's, IGPT's, IPET's, conventional bipolar transistors, thyristors or other semiconductor switching devices. Alternatively, for many applications (e.g. rectification or injection into a DC load) simple diodes may be used instead of switches. One advantage of using diodes is that using them simplifies the control circuitry which operates the switches within the circuit.

Again, by operating the PCS module in this way at the higher voltages, we are able to avoid that region of operation where its efficiency begins to suffer due to the relatively high forward voltage drops of the SCR's in the module. In other words, as before we achieve the higher efficiencies associated with high voltage operation. In addition, by relying on the transformer to achieve part of the overall step down ratio that is required, we also avoid multiplying the losses within the PCS module by the full amount of the step-down ratio.

The output section utilizes for the discharge a transformer and an inductor in series. These two components define the discharge period and the effective inductance for the resonant discharging mode. The inductor may also be placed in the output of the transformer or its effected value may may be incorporated into the transformer during its design. It follows that the output section can be coinfigured in such a way that this section may be shared by several modules to permit sequential discharging for the various applications and configurations described in an earleir section herein. In fact, the transformer coupled input, the PCS control, and the inversion functions, as well as the transformer coupled output section may be selectively combined into one module. By adding a completely or partially shared output section, multiple such modules may be combined to permit dual or multiple resonant discharge operations as previously described. Such modules may be used beneficially in any of the circuit applications covered herein or described in the earlier patent.

It should be noted that the input voltage to the circuits shown in FIG. 14–17, as with the previously escribed embodiments, can be either AC or DC. This should be readily apparent from the fact that the circuit is being operated in a pulsed mode which samples the voltage of the waveform many times per second.

Real and Reactive Power Control

In U.S. Pat. No. 5,270,913, filed Apr. 6, 1992, entitled "Compact and Efficient Transformerless Power Conversion" and incorporated herein by reference, I disclosed that energy can be extracted and injected into a terminal using resonant charging and discharging. In U.S. patent application Ser. No. 08/494,236 filed Jun. 23, 1995, entitled "Sequential Discharge and Its Use for Rectification," and also incorporated herein by reference, I disclosed a technique that permits the controlled extraction of energy and power from a multiphase AC system to produce harmonic free rectification. I have also configured a circuit that permits the inverse process of reconstructing a multi-phase system either from a DC potential or from an AC source. I utilized multiple interactions of a capacitor with one or more terminals to permit the control of real and reactive power extraction and injection. Below, I give the specific mathematical derivations as well as how to implement the process with practical circuitry. The following topics are covered with practical implementations:

a. Real power flow control
b. Reactive power flow control
c. Combined real and reactive power flow control
d. Harmonic power flow control Mathematics of Power Control In this section, I show that by proper selection of the initial conditions on the capacitors in the charge transfer circuits, it is possible to control power flow into and out of the charge transfer circuit and to determine its character, i.e., what proportion of it is real and what proportion of it is reactive. For this mathematical presentation, we assume a three phase system with a voltage on each of the three phases of:

$$V_a = V_o \sin(\omega t) \quad \text{Eq. 1(a)}$$

$$V_b = V_o \sin\left(\omega t - \frac{1}{3}\pi\right) \quad \text{Eq. 1(b)}$$

$$V_c = V_o \sin\left(\omega t - \frac{2}{3}\pi\right) \quad \text{Eq. 1(c)}$$

Figure 18:
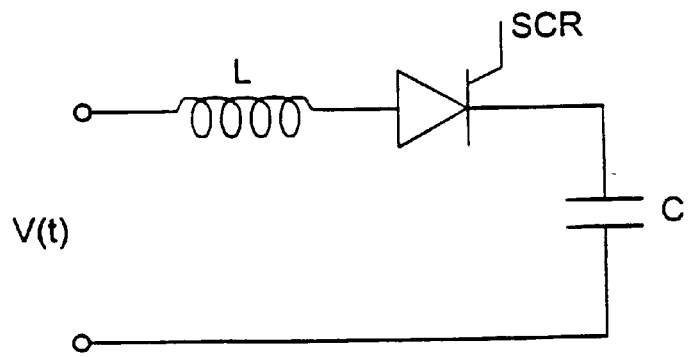
FIG. 18 is a simple charging circuit.

Referring to FIG. 18, it can be readily show that by charging a capacitor C through an inductor L from a voltage source of voltage V(t) and by controlling this charging with a switch, such as an SCR, the voltage of the capacitor will be 2 V(t). By repeating this process at a frequency f; with f larger than $\omega/2\pi$, we will be loading down that terminal as if the load was resistive. This was demonstrated in my rectification system which was described above and in U.S. patent application Ser. No. 08/494,236. However, if we start out with an initial voltage $V_1$ on the capacitor, after resonant charging the capacitor voltage $V_f$ will be as follows:

$$V_f = 2V_{in} - V_i \quad \text{Eq. 2}$$

This yields a change in the potential of the capacitor of $\Delta V = 2(V_{in} - V_i)$. The change in the charge of the capacitor is $C\Delta V$ and thus if we repeat this process at a frequency f, the current flow in or out of the terminal will be:

$$I = \Delta V C f = 2Cf(V_{in} - V_i) \quad \text{Eq. 3}$$

For the purposes of drawing any repetitive current waveform, we can define the current in terms of a Fourier series, as follows:

$$I(t) = + \sum_{n=1}^{m} A_n \sin(n\omega t) + \sum_{n=1}^{m} B_n \cos(n\omega t) \quad \text{Eq. 4}$$

with $A_1$ being the real current component I and $B_1$ being the reactive current $I_1$. The component $A_n$ is the harmonics amplitude for the $n^{th}$ harmonic with n>1. By combining Eq. 3 with Eq. 4, we can calculate the initial voltage requirements for the capacitors in order to draw or inject any desired current from the voltage terminal. The resulting equation is as follows:

$$V_i(t) = V_o \sin(\omega t) - \left(\sum_{n=1}^{m} A_n \sin(n\omega t) + \sum_{n=1}^{m} B_n \cos(n\omega t)\right) / Cf \quad \text{Eq. 5}$$

This can be done by either operating at a constant frequency or by varying the interpulse duration, i.e., f=f(t), as long as this is reflected in Eq. 5.

Real Power Flow Control

With the voltage on the first phase given by the following equation:

$$V_a = V_o \sin(\omega t) \quad \text{Eq. 6}$$

we may solve specific problems. For example, we can generate a current that is in phase with the voltage:

$$I(t) = I \sin(\omega t) \quad \text{Eq. 7}$$

and thereby achieve real power flow with no reactive component. First, we let $I = I_o(1+\gamma)$, where $I_o$ is the current amplitude and where $\gamma$ is a parameter that describes the amount of residual capacitor charge. To see that $\gamma$ is indeed a fair representation of the amount of residual charge, notice that Eq. 3 above can be rewritten as follows:

$$I = 2Cf(V_{in} - V_i) = 2CfV_{in}\left(1 - \frac{V_i}{V_{in}}\right)$$

Thus, $-\gamma$ corresponds represents $V_i/V_{in}$, and is thus indeed proportional to the residual charge.

Substituting Eqs. 6 and 7 into Eq. 5, we find an expression for what the initial voltage of the capacitor must be:

$$V_i(\omega t) = \left(V_o - \frac{I}{2Cf}\right)\sin(\omega t) \quad \text{Eq. 8}$$

With the initial voltage of the capacitor equal to zero, it follows that:

$$I_o = 2CfV_o, \quad \text{Eq. 9}$$

and thus $$V_i(\omega t) = -\gamma V_a(\omega t) \quad \text{Eq. 10}$$

In other words, $$I(t) = 2V_o Cf(1+\gamma) \sin(\omega t) \quad \text{Eq. 11}$$

In this case, the power throughput is equal to:

$$P(t)=I(t)V_{in}(t)$$

$$=2Cf(1+\gamma)V_o^2\sin^2(\omega t) \qquad \text{Eq. 12}$$

$$=P_0(t)(1+\gamma),$$

where $P_0(t)=2CfV_o^2\sin^2(\omega t)$

From Eqs. 11 and 12, it can be seen that the power throughput can be controlled by simply controlling the initial voltage $V_i$ on the capacitor and without changing the frequency f.

The same applies for the other two phases such that the total throughput is independent of time. This can be seen by summing the power of all three phases, which equals:

$$P(t)=2Cf(1+\gamma)V_o^2\{\sin^2(\omega t)+\sin^2(\omega t-120°)+\sin^2(\omega t-240°)\}.$$

The quantity in the brackets { } equals a constant, i.e., 3/2. Thus, the total power is not a function of time.

Also of importance is that the output can be varied over a large range and that the power flow can be bi-directional. This technique permits one to transfer power from a lower voltage AC line to a higher AC line.

Reactive Power Flow Control

Assuming again that the voltages are as shown in Eq. 1, then reactive power flow is represented by:

$$I_r(t)=I_r\cos(\omega t) \qquad \text{Eq. 13}$$

Substituting $I_r(t)$ into the right side of Eq. 5, one obtains $$V_i(t) = V_o\sin(\omega t) - \left(\frac{I_r}{2Cf}\right)\cos(\omega t) \qquad \text{Eq. 14}$$

or, equivalently:

$$V_i(t) = V_o\left(1+\left(\frac{I_r}{I_o}\right)^2\right)^{1/2}\sin(\omega t - \beta) \qquad \text{Eq. 15}$$

where:

$$\beta = \tan^{-1}\left(\frac{I_r}{I_o}\right) \qquad \text{Eq. 16}$$

The total energy in all three capacitors is given by:

$$E_{it} = \frac{3}{4}CV_0^2\left(1+\frac{I_r^2}{I_o^2}\right) \qquad \text{Eq. 17}$$

which is also independent of time.

Eqs. 13 and 16 show that one may produce both leading or lagging VAR. Again, this is produced without changing the frequency f. However, to change the VAR, Eq. 17 makes it clear that the total energy must be changed. This can be accomplished by drawing or dumping energy back into the power source for one cycle.

The computation for the real and reactive power flow is given in the next section. The VAR requirement can be changed immediately without a change of the total energy in the capacitors by simply changing the pulse repetition rate f.

In a practical device, however, we must actually control the system so as to draw real power since we have to compensate for component losses.

Real and Reactive Power Flow

I have shown that both the real and reactive power flow can be controlled separately by controlling the initial capacitor voltage. They can also be controlled together. How to do this can be seen by looking at an expression for current which contains both real and reactive components as follows:

$$I(t)=I_o(1+\gamma)\sin(\omega t)+I_r\cos(\omega t) \qquad \text{Eq. 18}$$

Using the approach described above, one obtains the following expression for the initial voltage that must be created on the capacitors prior to each charge transfer cycle:

$$V_i(t) = \left(V_o - \frac{I_o(1+\gamma)}{2Cf}\right)\sin(\omega t) - \frac{I_r}{2Cf}\cos(\omega t) \qquad \text{Eq. 19}$$

When one uses $V_i(t)=A\sin(\omega t-\beta)$ for Eq. 19, one obtains:

$$V_i = V_o\left(\frac{I_r^2}{I_o^2}+\gamma^2\right)^{1/2}\sin\left(\omega t - \tan^{-1}\left(\frac{I_r}{I_o(1+\gamma)}\right)\right) \qquad \text{Eq. 20}$$

By taking the limit as $\gamma-1$, one obtains only the reactive term. Similarly, with $I_r=0$, one obtains the real power flow.

It should be understood that for a three phase system, the current voltage and residual voltage must be shifted by $-120$ and $-240$ electrical degrees for the other two phases, respectively.

Power, VAR, and Harmonics

Power flow, harmonics correction, and VAR control can all be combined. This is done as follows. Assume that the current is given by:

$$I(t)=I_o(1+\gamma)\sin(\omega t)+I_r\cos(\omega t)+I_n\sin(n\omega t) \qquad \text{Eq. 21}$$

where $I_n$ is the amplitude of the nth harmonic. Then, one proceeds through the same steps as described above and derives the following requirement for the initial voltage:

$$V_i(t) = \left(V_o - \frac{I_o(1+\gamma)}{2fC}\right)\sin(\omega t) - \frac{I_n}{2fC}\sin(n\omega t) - \frac{I_r}{2fC}\cos(\omega t) \qquad \text{Eq. 22(a)}$$

$$V_i(t) = -\gamma V_o\sin(\omega t) - \left(\frac{I_r}{2Cf}\right)\cos(\omega t) - \frac{V_o I_n}{I_o}\sin(n\omega t) \qquad \text{Eq. 22(b)}$$

That is, Eq. 22 specifies the initial voltage condition that is required to control the real power, VAR and the nth harmonic.

One may also proceed to control all of the harmonics along with the real power by letting:

$$I(t) = I_o(1+\gamma)\sin(\omega t) + \sum_{n=2}^{m} I_n\sin(n\omega t) \qquad \text{Eq. 23}$$

which yields:

$$V_i(t) = -\gamma V_o\sin(\omega t) - V_o\sum_{n=2}^{m}\left(\frac{I_n}{I_o}\right)\sin(n\omega t) \qquad \text{Eq. 24}$$

From a circuit point of view, it can also be readily shown that VAR and harmonics correction can be performed in a single device by letting:

$$I(t) = I_r \cos(\omega t) + \sum_{n=2}^{m} (I_n \sin(n\omega t)) \qquad \text{Eq. 25}$$

It then follows that the initial voltage must be:

$$V_i(t) = -V_0 \left( \frac{I_r}{I_o} \cos(\omega t) + \sum_{n=2}^{m} \left( \frac{I_n}{I_o} \sin(n\omega t) \right) \right) \qquad \text{Eq. 26}$$

With $I_r$ and $I_n$ given by measurements of the VAR and harmonics, the correction can be readily implemented.

The harmonic and VAR power per phase can be obtained by multiplying the current by $V(t) = V_o \sin(\omega t)$. If one proceeds with the other two phases, $$V_{i\pm} = V_i \left( \omega t \pm \frac{2\pi}{3} \right),$$

it can again be seen that the total power flow is zero and that the total energy in the combined capacitor does not change over time unless $I_r$ or $I_n$ changes, assuming that n is a multiple of 3. (Note: For harmonics other than multiples of 3, energy must be stored.) It follows that if the frequency f is high, all harmonics, to a specific number, may be simultaneously corrected or induced.

If the frequency f is lower, corrections must be applied to take into consideration that the requirement for the next $V_i$ at the correct time when the charge interchange between the capacitor and the line takes place.

In a practical device for VAR and harmonics generation, the circuit of course has losses. To make up for these losses, a small additional term needs to be added to Eq. 26. The real and reactive term then has the form of Eq. 20, while the harmonics term does not change.

To start such a Static VAR and Harmonics Generator, real power has to be drawn off the grid to build up the capacitor voltages. This can be performed in one charge cycle of over several AC cycles.

AC—AC Frequency Charger

Figure 19:
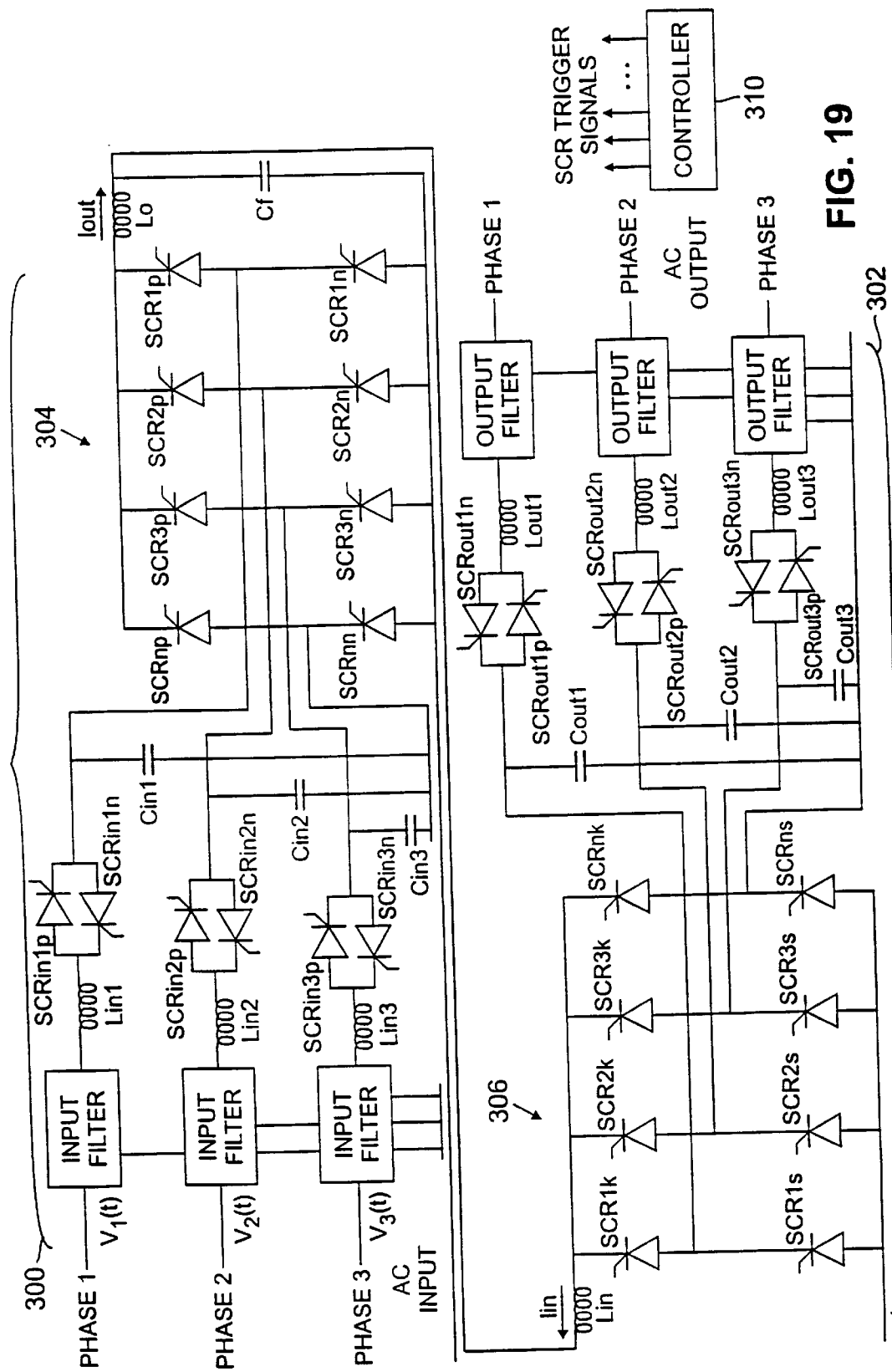
FIG. 19 is an example of an AC to AC frequency changer circuit which embodies the invention.

The preceding mathematical analysis yields the voltage requirements for the operation of various systems. FIG. 19 shows a practical circuit with which the above-described techniques can be implemented. The circuit of FIG. 19 includes a rectification section 300 at the front end to produce a DC output, a filter capacitor Cf receiving the DC output of the rectification section, and a derectification section 302 on the back end to reconstruct three-phase AC from the DC voltage on Cf. The technique for operating this circuit relies in part on harmonic free rectification and on derectification, which is described in detail below. Suffice it to say at this point that derectification is in essence the inverse process to rectification, i.e., it is rectification performed in reverse to generate an AC waveform, typically, but not necessarily from a DC source. Note that if both the discharging process of the rectification section and the charging process of the derectification section are synchronized, then filtering (i.e., capacitor Cf) is not required.

In the AC to AC frequency changer circuit of FIG. 19, there are three inputs, each connected to a respective phase of a three phase AC line through a corresponding input filter 310, and there are three outputs, each connected to a respective phase of another three phase AC line through a corresponding output filter 312. In some of the subsequent circuit diagrams, we may not always show the input and output filters, but it should be understood that such filters are present where and when it would be appropriate to use them. In addition, since the design and construction of such filters is well know to persons of ordinary skill in the art, no further details about the filters will be provide here.

The rectification section 300 includes for each phase, a resonant charging inductor Linj which is coupled through a pair of SCR's (i.e., SCRinjp and SCRinjn, where j=1,2,3) to a corresponding charge storage capacitor Cinj. The pair of SCR's is connected in parallel and with their polarities in opposite directions so that the corresponding charge storage capacitor can be charged from a voltage source of either positive or negative polarity. The capacitors are coupled to a filter capacitor Cf through an output inductor Lo.

The derectification section 302 is basically the same as the rectification section 300 except that it is arranged in reverse order.

I will be using the circuit of FIG. 19 and modifications of it to illustrate the use of residual voltage on both the input and output capacitors to show that we can control both the real and reactive power flow on the input as well as on the output side. In a later section, I will describe a second technique that will permit the same functions with a simpler circuit.

Input Power Control

First, I summarize the rectification process that was described above and in U.S. Ser. No. 08/494,236, but this time with two additional features. In this circuit, I use two three phase, common bridge circuits 304 and 306, one at the output of the rectification section 300 to charge the capacitor Cf to have the desired polarity and one at the input of the derectification section 302 to charge the capacitors in the derectification section to the desired polarity. In FIG. 19, the SCR's labeled SCRip and SCRin form the bridge circuit 304 on the rectification side and the SCR's labeled SCRik and SCRis form the bridge circuit 306 on the derectification side. The simultaneous charging or discharging from or to a three phase grid is initiated by triggering the correct input SCR (or other switches). By using the common bridge circuit, one does not need a neutral return. This permits the common capacitor connection to float. In addition, the use of the common bridge circuit also eliminates the need for an inversion circuit. (Note that an inversion circuit is described in U.S. Pat. No. 5,270,913, elsewhere in this description, and in U.S. patent application Ser. No. 08/494,236.) That is, Cf can be charged to a positive voltage regardless of whether the source is positive or negative. For example, if phase 1 is positive, capacitor Cf can be charged positive simply by triggering both SCR1p and SCRnp; and if phase 1 is negative, capacitor Cf can be charged positive simply by triggering both SCRin and SCRnn. However, there is a price to pay for using the bridge circuit, namely, higher voltage swings on the thyristors.

Note that the SCR's in the circuit of FIG. 19, and the switches in the other circuits described herein, are controlled by a programmed controller 310. Though this controller is not shown in the other figures, it should be assumed that one is present for porposes of performing the triggering and establishing the timing of that triggering.

The following example will illustrate the sequential discharge sequence that might be implemented by the rectification section in FIG. 19. If one charges at the 70° electrical angle, the voltages in three phases are $V_1/V_o = 1.88$, $V_2/V_o = -1.53$, and $V_3/V_o = -0.35$, with the unity being the maximum input voltage. In that case, one would have the following discharge sequence. One starts the sequential discharge sequence in order of decreasing absolute voltage level by first triggering SCR1p to discharge $C_1$. If one chooses to discharge $C_1$ completely, one would trigger SCR2n next at the point in time when $C_1$ is fully discharged. The bridge circuit permits the flow of current through the common inductor Lo that is used in this section, as shown. At the point when the voltage of $C_2$ is zero, one triggers SCR3n to discharge $C_3$. The components SCRnn and SCRpn permit the return of current to all three capacitors. Alternatively, if one uses diodes in place of SCRnn and SCRpn, these components then perform as free wheeling diodes at the point where the voltage in $C_3$ becomes zero. At that point, all the output SCRs are off and the recharging of the capacitors of the input section (i.e., C1in, C2in, and C3in) can commence for the next discharge cycle.

Alternatively, a second discharge mode may be used that permits a faster discharge and also yields a higher output voltage. In this case, SCR1p and SCR2n are triggered simultaneously to discharge $C_1$ and $C_2$ together. As capacitor $C_2$ reaches the zero voltage level, SCR3n is triggered, turning off SCR2n and continuing the discharge of $C_1$ together with $C_3$. In a balanced system, both capacitors will reach zero at the same time. Also, the discharge can be stopped at any time by selectively using free wheeling switches at the same time.

We can also trigger the second, third, and free wheeling switches (FWS, e.g. SCRnn and SCRns)) such that residual voltage remains on the capacitors. For example, if SCR2n is triggered before $C_1$ reaches zero, a partial residual voltage will be left on the capacitor. If we delay the triggering, capacitor $C_1$ will recharge to a negative value. The same applies for the last capacitor using the trigger timing of the FWS. For example, if one permits a residual voltage with a value of $\gamma$ as given by Eq. 10, one can control the real power without changing the repetition rate. If one lets $\gamma=0.1$ by triggering SCR2n late, capacitor $C_1$ will be charged up to a negative voltage and power flow is increased, as given by Eq. 12. The residual voltage requirements for the other two phases are identical to that of Eq. 10 but shifted in phase by 120° and 240°, respectively.

The above operation permits the use of self-commutating switches or switches that do not have to be actively opened. Also, since the bridge circuit does not require an inversion process, this allows one to increase the throughput. Finally, controlling the residual voltage on the capacitors permits one to actively control the throughput power with a constant repetition rate. The charging can be directly performed on a three phase AC grid, and a transformer or transformer isolation is not required. The residual voltage on the input side also permits us, using the inverse or reconstruction process, to synthesize a three phase output voltage higher than the input voltage. This allows us to transfer power from a lower voltage AC bus to higher voltage AC bus. However, this is achieved at the expense of including an additional inversion cycle.

Being able to control real and reactive power flow is of practical importance in many applications. In the case of induction generators, for example, both the extraction of real power and the supply of VAR is important. To control both real and reactive power flow, the residual voltage, as given by Eq. 14, must be supplied for each phase. In a later section, I will give a specific example for a VAR controller.

AC-Reconstruction

As described previously, AC can be reconstructed from a DC bus using a sequential charging technique that is the inverse of the sequential discharging technique previously described. That is, the three capacitors are charged in order of increasing output voltage requirements. For maximum efficiency and minimum number of energy transfer cycles, the preference is to completely discharge the output capacitors to obtain maximum charge transfer. However, this is not absolutely necessary and, in some cases, residual energy may be left in the capacitors. Indeed, residual energy is required if the output is designed for both real and reactive power flow control.

Assuming that the desired reconstructed wave form has a maximum voltage of $V_a$ and phase angle $\omega' t$, the required charge voltage on each of the output capacitors (e.g. capacitors Cout1, Cout2, and Cout3 in FIG. 19 or capacitors Cm1, Cm2, and Cm3 in FIG. 20) is:

$$V_1 = 2V_a\beta^{1/2}\sin(\omega't) \qquad \text{Eq. 27(a)}$$

$$V_2 = 2V_a\beta^{1/2}\sin(\omega't-120°) \qquad \text{Eq. 27(b)}$$

$$V_3 = 2V_a\beta^{1/2}\sin(\omega't-240°) \qquad \text{Eq. 27(c)}$$

The energy in each capacitor is thus:

$$E_1 = 2C\beta V_a^2 \sin^2(\omega't) \qquad \text{Eq. 28(a)}$$

$$E_2 = 2C\beta V_a^2 \sin^2(\omega't-120°) \qquad \text{Eq. 28(b)}$$

$$E_3 = 2C\beta V_a^2 \sin^2(\omega't-240°) \qquad \text{Eq. 28(c)}$$

with the total energy of all three capacitors given by Eq. 28(d) below:

$$E_t = 2C\beta V_a^2(3/2) \qquad \text{Eq. 28(d)}$$

If $\beta$ is unity or higher, then the output capacitors will be charged to the correct voltage for complete energy transfer during the discharge cycle and the product of the energy in the capacitors and the repetition rate will yield the desired energy flow in each phase and for the total throughput. With a lower $\beta$ the discharge will not be complete and will leave part of the energy in the output capacitors. The sequential resonant charging process, without the use of opening switches, yields a beta that is proportional to the square of the DC voltage and the instantaneous phase angle ($\omega't$) of the reconstructed waveform and $\beta^{1/2}$ is $$\beta^{1/2} = (2Vdc/3V_a)(|\sin(\omega't)|+|\sin(\omega't-120°)|+|\sin(\omega't-240°)|)$$

The value of $\beta$ must be computed for each cycle to permit the correct energy ratio and the correct power flow in each phase. By proper selection of $\beta$, we can avoid having to use a turn-off switch and the last capacitor bank will fully complete its charge transfer cycle and produce the correct charge voltage. In other words, the energy in the inductor will be completely transferred to the third capacitor and the energy ratio of all three capacitors will have the correct value for only one value of $\beta$ to satisfy Eqs. 27 and 28 without having to either prolong or terminate the third capacitor charging process. The $\beta(\omega't)$ value is a function of the required output phase. With a DC or DC bus input the inter-pulse duration must be adjusted to compensate for the beta variation to yield the correct power throughput. From Eqs. 27 and 28 it follows that the interpulse duration must be modulated over the 360 degree cycle to be inversely proportional to the value of $\beta(\omega't)$.

Figure 22A:
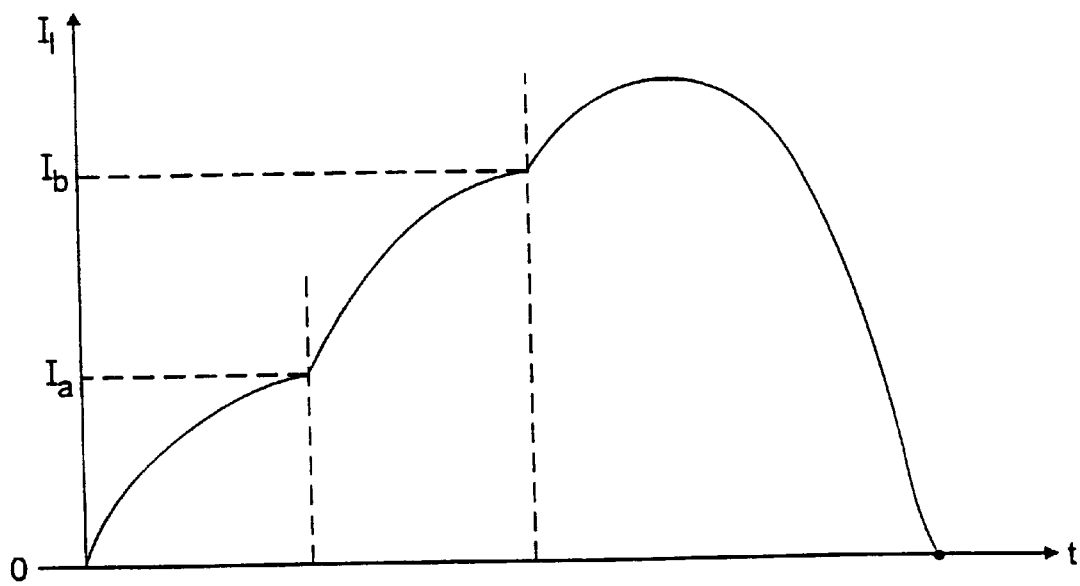
FIG. 22a is a plot of the current through the resonant charging inductor during an illustrative charging cycle of the derectification circuit.
Figure 22B:
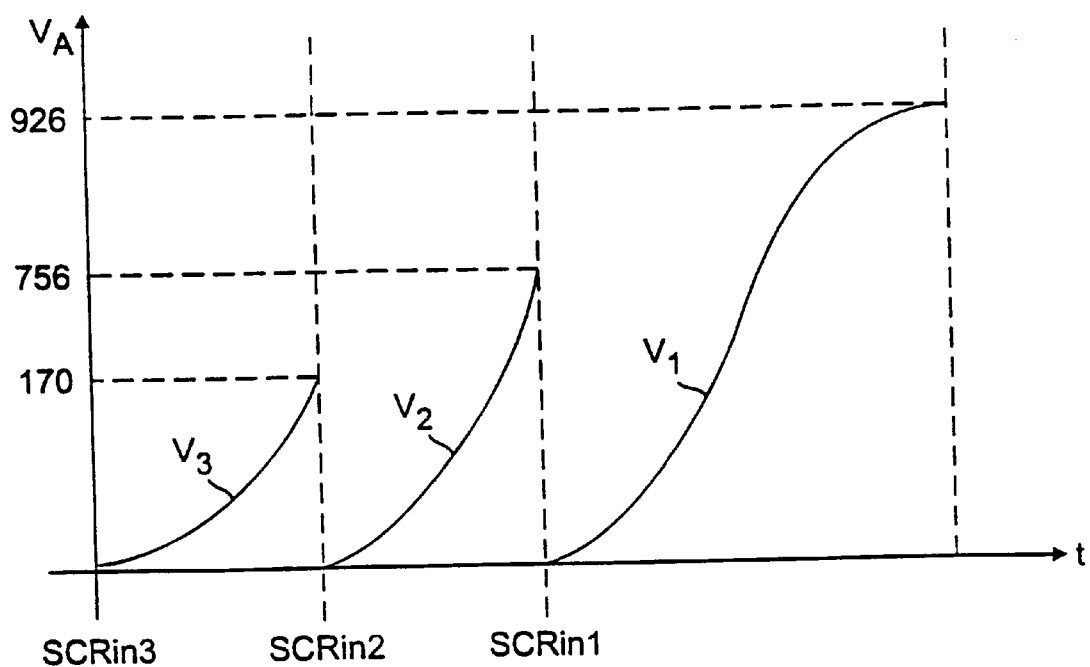
FIG. 22b is a plot of the voltage at the output of the charging inductor during a charging cycle of the derectification circuit.

Plots of $\beta$ and the interpulse duration are shown in FIGS. 22a and 22b, respectively, for the derectification section of FIG. 19. In both figures the horizontal axis is in electrical degrees and in FIG. 22a the vertical axis is in microseconds. The information which is presented in thee two figures is used to control the timing of the SCR triggering. It can be computed in real time by the controller or more preferrably it can be precomputed and stored in a table that is accessible by the controller.

The triggering of the SCR can be either controlled by monitoring the voltage on the capacitor or by precalculating the time the triggering needs to be performed with the information of both the input voltage and output condition.

The sequential capacitor charging triggering sequence for the DC to AC reconstruction is the inverse of the sequential capacitor discharging sequence for the rectification process. The circuit which I will use to describe the derectification process is shown in FIG. 20.

The derectification circuit receives transforms a DC voltage (Vdcin) on its input to a three phase AC output signal. The circuit includes a resonant charging inductor Lin connected through SCSRin1, SCRin2, and SCRin3 to charge storage capacitors Cm1, Cm2, and Cm3, respectively. Each capacitor has a corresponding inverting circuit connected across it. The inverting circuits include an SCRvi in series with an inductor Lvi, where i=1,2,3. Each of the capacitors is, in turn, connected to one side of a corresponding output inductor Louti through a pair of SCRs, namely, SCRoin and SCRoip. The SCR's in this pair are connected in parallel and with their polarities in opposite directions. The input side of each of the inductors Louti is connected to ground (or the other side of the DC supply) through another pair of SCR's, namely, SCRfwin and SCRfwfwip, which are connected in parallel and with their polarities in opposite directions. These pairs of SCR's function as free wheeling SCR's.

Figure 20:
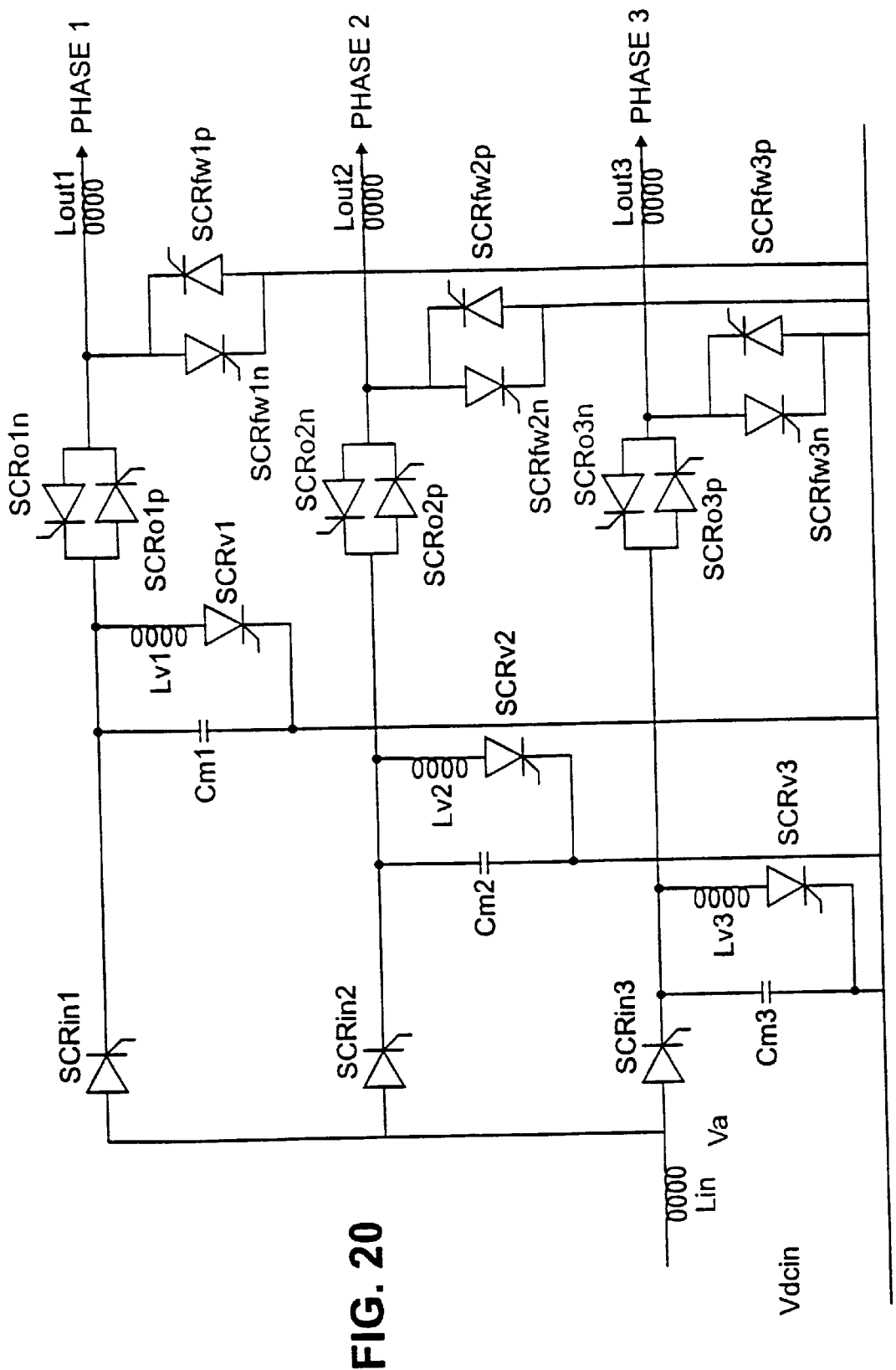
FIG. 20 is a derectification circuit.
Figure 21A:
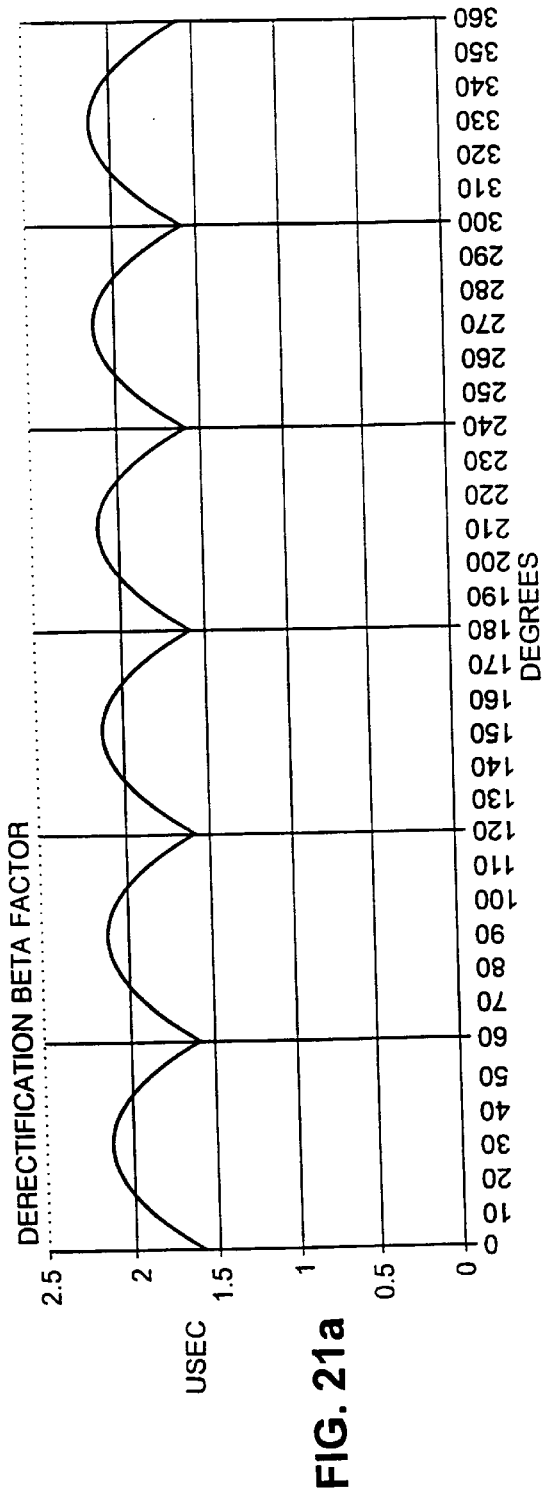
FIG. 21a is a plot of interpulse duration for the triggering of the SCR's in a derectification circuit which uses an input common bridge cricuit.
Figure 21B:
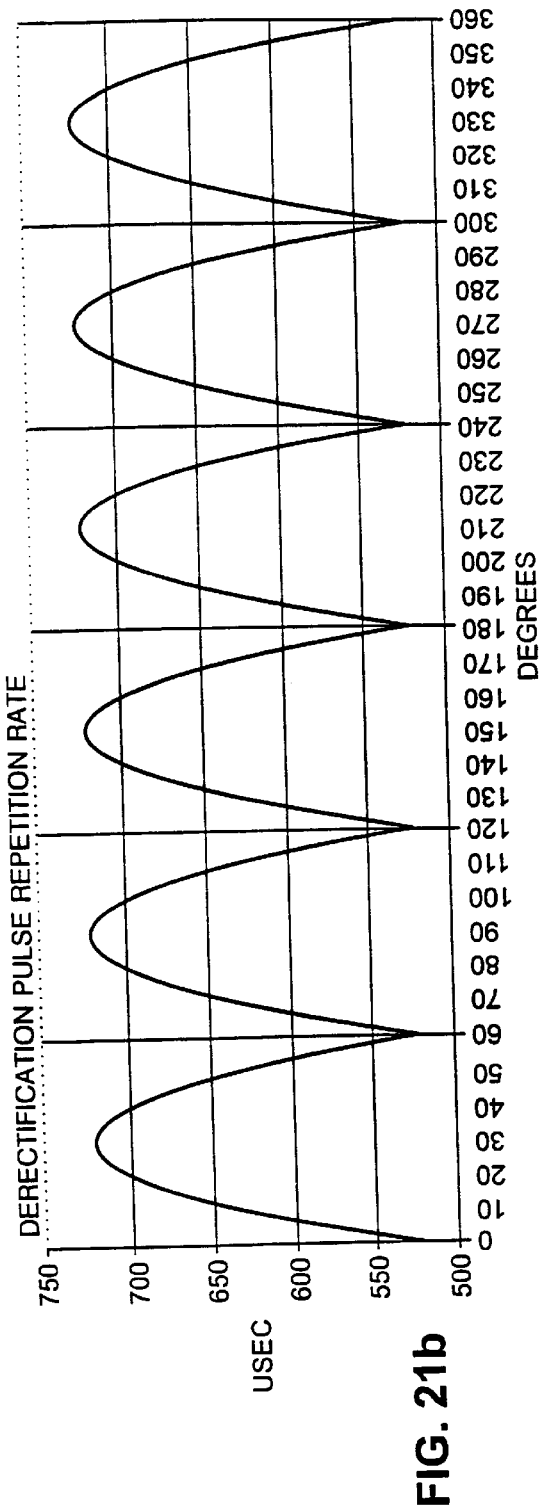
FIG. 21b is a plot of β for the triggering of the SCR's in a derectification circuit which uses an input common bridge circuit.

Referring to FIG. 20, the SCR for the lowest voltage capacitor is triggered first. As the voltage reaches the desired level, the capacitor requiring the second highest voltage is then triggered. At that point the first SCR is back biased and forced to turn off. The initial condition for the second capacitor discharge will include the remaining inductor current of the first capacitor charging process. With the voltage having reached the correct value on the second capacitor, the third capacitor SCR is then turned on, stopping the charging of the second capacitor. The remaining inductor current, forming part of the third capacitor initial condition, will yield a higher output voltage on the third and final capacitor. The third capacitor charge cycle is completed with all the energy transferred from the inductor to the last capacitor. If the β and timing is correctly selected, the energy ratio of all three capacitors will be correct for each cycle. The use of the bridge circuit permits the charging to the correct polarity and allows the immediate discharge of the capacitors. The capacitors having the incorrect polarity must to go through an inversion cycle. The discharging of the three capacitors can be performed at the same time. Free wheeling SCRs or other switches permit the complete energy output transfer or may be used to aid in the control of residual voltage levels for output VAR and harmonics compensation.

Using an output bridge circuit such as bridge circuit 306 in FIG. 19 permits me to eliminate the inversion process and, as a result, increase the power throughput. The bridge circuit permits me to charge the capacitors not only to the correct voltage, but also to the correct polarity.

Using FIG. 20 and a phase angle of 70 degrees, the three reconstruction voltages are $V_1$=338 V, $V_2$=−276 V, and $V_3$=−62 V for a 440 V AC output. With a DC supply voltage of Vdcin=393 V DC, we charge the capacitors Cm1, Cm2, and Cm3 in sequence to the 926 V, 756 V and 170 volts, respectively, by triggering SCRin3, SCRin2 and SCRin1 in sequence and at the correct time. The current through the charging inductor Lin and the voltage at the output of the charging inductor Lin are shown in FIGS. 22a and 22b, respectively.

More specifically, the sequential charging process starts by first triggering SCRin3. In response the current through Lin increases and capacitor Cm3 begins charging to a positive voltage. As soon as the voltage on Cm3 reaches the correct value, SCRin2 is triggered to terminate the charging of Cm3 and to begin the charging of Cm2. The current that is in Lin, i.e., Ia) provides an initial condition for the charging of Cm2 thereby enabling it to charge to a higher value. During the charging of Cm2, the current through Lin increases as shown in FIG. 22a. As soon as the voltage across Cm2 reaches the desired value, e.g. 756 V, then SCRin1 is triggered to terminate its further charging and to begin the charging of Cm1. Again the current in inductor Lin when SCRin1 is triggered (i.e., Ib) establshes the intitial condition for the charging of Cm1. As the current through Lin drops to zero, SCRin1 will self-commutate off and the voltage across Cm1 will have its desired value.

Note that the triggering times of SCRin2 and SCRin1 determine the correct voltage levels of Cm3 and Cm2, respectively, while Cm1 reaches its correct voltage level as SCRin1 commutates. Since the voltage on capacitors Cm2 and Cm3 have the incorrect polarity, we trigger SCRv2 and SCRv3 to invert their polarity. With the inversion completed, we trigger the output SCRs of SCR01p, SCR02n and SCR03n to discharge the capacitors into the output filters through the three output inductors. Since β½ has a value of about 1.37, the capacitors will fully discharge, requiring the triggering of the free wheeling SCRs SCRfw1p, SCRfw2n and SCRfw3n as the capacitor voltage becomes zero to assure full energy transfer. At that point the next recharging cycle may start.

Direct AC to AC Frequency Changer

AC to DC rectification with a DC filter and a derectification section permits AC to AC conversion going through a DC bus, as noted above. This architecture permits us to connect additional energy storage in parallel with the filter capacitor to configure it as an uninterruptible power supply (UPS). However, if there are no energy storage requirements, the DC bus can be eliminated by removing one of the inductors and filters, e.g Cf and Lin of FIG. 19, and by simply connecting the rectification section directly to the derectification section (i.e., the AC reconstruction module). This involves combining the sequential discharge cycle of the rectification section with the sequential charge cycle of the derectification section. In this case, referring to FIG. 19, the output inductor Lo of the discharge cycle is used as the input inductor for the charge cycle of the output section. The discharging of the capacitors of the rectification section is simultaneously performed with the charging of the AC reconstruction section, since they are connected in series.

The SCR of the capacitor with the highest voltage of the output section is triggered first together with the SCR of the lowest voltage capacitor in the input section. As soon as the voltage of the input capacitor reaches the correct value, the SCR for the input capacitor with the next highest voltage is triggered. When the output capacitor is discharged or reaches the correct voltage level, the input capacitor with the next higher voltage is connected. This process is repeated until all energy has been transferred. Again, the bridge circuit permits the elimination of the inversion process for both the rectification and derectification processes. If no bridge circuit is used, an inversion cycle has to be inserted between the simultaneous charge cycle and sequential discharge cycle. The power transfer can be both controlled by the repetition rate and by the control of the residual input capacitor voltage.

The reactive power control may be implemented on both the AC input and AC output end. For most applications, it is best to use only reactive power control for one end in order to keep the control complexity down. It appears that a good mode of operation is to draw only real power from the inputs by controlling the γ parameter of Eq. 9 and then control the reactive power on the output end to supply the reactive demand of the load. This is particularly important if the system is used as a stand alone power source, such as a UPS, a variable speed motor drive, or with any other load that has no other AC power source.

As power is transferred from the input capacitors, C1in, C2in, and C3in, through the common inductor Lo, residual voltage and charge may be left in the input capacitor for the next input charge cycle. This permits one to draw both real and reactive power from the input source. The voltage requirement is defined by Eq. 20 for the first phase. The remaining phases are the same, but shifted by −120 and −240 electrical degrees. The operational process for the direct AC to AC frequency changer is the same as the back to back rectification and derectification system. The major exception is that the operation of both processes needs to be coordinated and precisely controlled. This is not a problem using today's controller technology.

Figure 23:
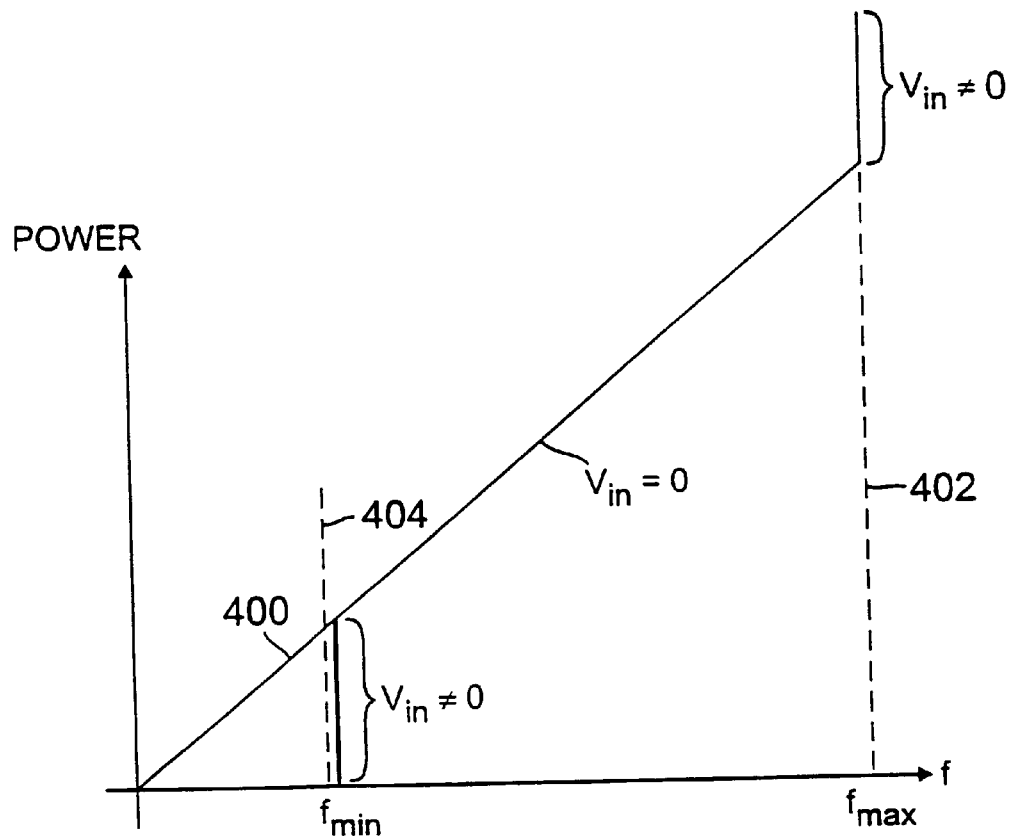
FIG. 23 is a plot of power throughput versus frequency of an AC to AC frequency changer.

The typical operation of an AC to AC frequency changer would be to draw only real power from the input side and supply both real and reactive power to the load, such as a variable speed motor. Referring to FIG. 23, such a system could be controlled over its normal operating range by using no residual voltage and by controlling the power flow with the repetition rate. This mode of operation, which is represented by line 400 extending from the origin, yields the best efficiency. However, under maximum power requirements a maximum repetition rate will be reached beyond which the circuitry will not be able to perform. At that point, one can switch into a constant frequency operation and use residual input voltage control to yield additional power throughput. This mode of operation is represented by the vertical line 402 (also labelled Vin≠0) at fmax. It should also be noted that operating with a variable inverter frequency requires a low pass filter. Such a filters are typically not effective at and below their cut-off frequencies during low power operation. Thus, to solve this problem, one can again transition into a constant frequency operation at lower frequency and use residual input voltage control to reduce the power throughput in a low power range. This type of operation, which is illustrated by the vertical line 404 (also labelled Vin≠0) located at fmin, could be used, for example, to start a motor, to transition through the low power requirement to normal operation, and to provide intermittent high power requirement as needed.

Under normal operation, power is typically transferred from one end to the other with the output voltage being lower than the input voltage. However, with the residual voltage control an output voltage can be provided that is higher than the input. In addition, since the circuit is symmetrical, the power flow can be controlled in both directions. It follows that such a circuit may include regenerative breaking, as required for some motor drive applications.

FIG. 19 and the described modifications are only representative of many other possible circuit configurations. Most of these circuits use the charge transfer operation between a set of capacitors and an AC system, e.g. a sequential charge transfer operation that typically uses a shared inductor. With residual voltages in the capacitor, we may control the charge transfer process to yield the desired, on average, current flow between the capacitor and the AC terminal. Depending on the details of operational requirements and the system configuration, we may find that it is desirable to use capacitor polarity inversion circuits.

Reactive Power Control

Figure 24A:
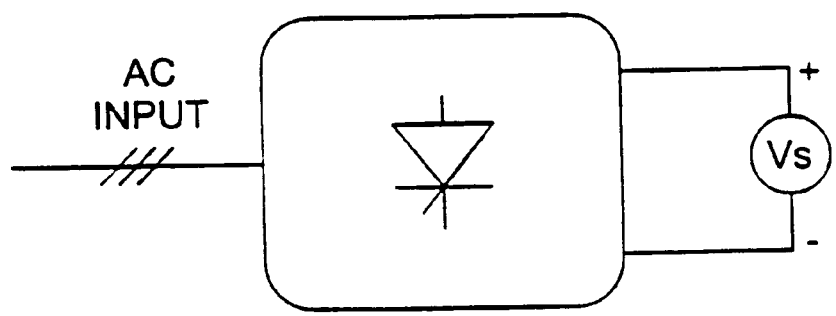
FIG. 24(a) is a standard voltage source inverter.

Static Var Controllers (SVC) operate and are available in both a voltage or a current source mode configuration. The typical voltage source mode consists of a rectification section transferring power into a voltage source that consists typically of a charge capacitor bank. It is basically an inverter operating into a capacitor. The net transfer of power between the voltage source and AC system, neglecting losses, is zero. A typical configuration is shown in FIG. 24*a*. The voltage level $V_S$ typically determines the reactive power flow. The rectification section typically consist of power sources shifted in phase with the input source.

Figure 24B:
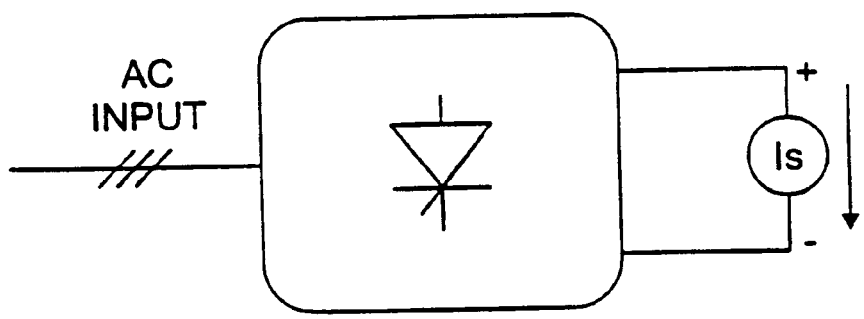
FIG. 24(b) is a standard current source inverter.

The current source inverter configuration shown in FIG. 24*b* is a similar scheme with the exception of having circulating current. The current source inverter has typically an inductor as the current source. The timing in the bridge rectification circuit again determines the energy or VAR flow. The major problem with this configuration is that harmonics are generated by the inverter. In addition, most available inverters require opening switches.

The PCS/SVC, which embodies the invention, can be configured in both the voltage source and current source inverter mode and it permits direct line to line power transfer, eliminating the transformer(s). Since the PCS/SVC inverters can use self-commutation switches, high voltage and high power thyristors may be used.

As an example, the PCS AC to DC rectification circuit (previously described above and in U.S. Ser. No. 08/494, 236) can be directly configured as a PCS/SVC voltage source inverter. And, if the capacitor is shorted out, it becomes a modified current source inverter. The advantage of the PCS/SVC is its simplicity and, most importantly, its harmonic-free operation. Furthermore, it essentially yields an instantaneous response.

Typical PCS/SVC operation

The objective is to inject and extract energy and charge out of each phase and at a high enough frequency to yield harmonic-free operation. To accomplish this, we set the initial voltages of the capacitors to the correct values, as given by Eqs. 14 or 15, for the first phase to obtain the desired charge transfer between the capacitor bank and the AC system to meet the average reactive current requirements as given by Eq. 13. The resonant interaction between the working capacitors and the input line will, according to Eq. 2, yield a final capacitor voltage of:

$$V_f(t) = V_o \sin(\omega t) + \left(\frac{I_r}{2Cf}\right)\cos(\omega t) \qquad \text{Eq. 29}$$

or, stated differently:

$$V_f(t) = \left(V_o\left(1 + \left(\frac{I_r}{I_o}\right)^2\right)\right)^{1/2} \sin(\omega t + \beta) \qquad \text{Eq. 30}$$

where $$\beta = \tan^{-1}\left(\frac{I_r}{I_o}\right) \qquad \text{Eq. 31}$$

Comparing the initial and final capacitor voltages of Eqs. 15 and 30, we see a phase shift of plus and minus β, respectively. Since, according to Eq. 17, no net energy has been transferred during the charge transfer process, the second cycle of the SVC operation is simply to redistribute the capacitor energy to obtain the desired initial capacitor voltage. The voltage is again given by Eq. 15 to be computed at t+Δt, with Δt being the time interval between charge interaction.

Figure 25:
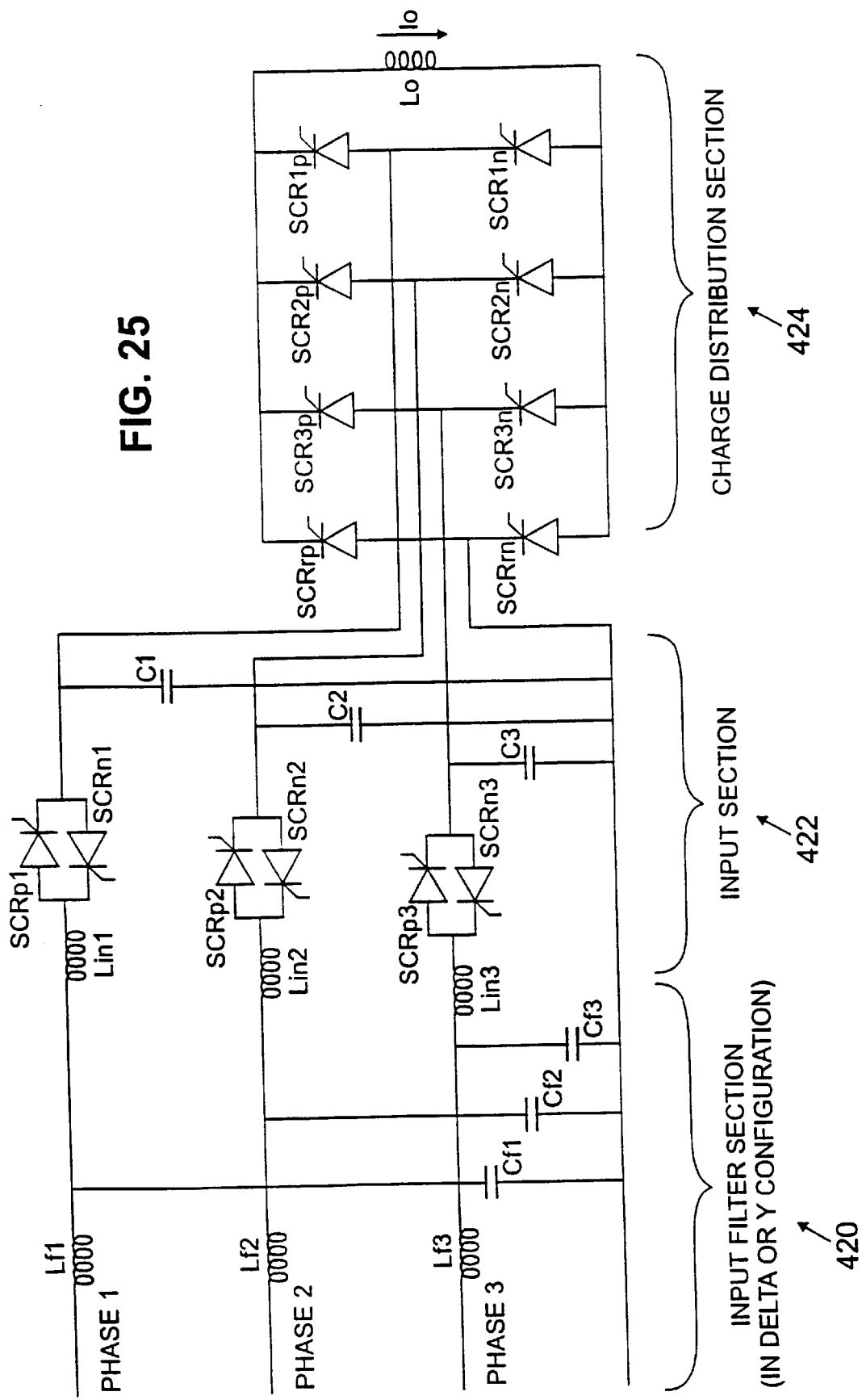
FIG. 25 is a schematic of a simplified Static VAR Generator with active harmonic filter capability.

FIG. 25 shows a circuit configuration for a PSC/SVC. It consists of an input filtering section 420, an input or charge interchange section 422, and a charge redistribution section 424. The filter section can be either configured in a γ or Δ configuration and can be either a low pass filter or tuned filters, if operating at a fixed frequency. In the input filtering section 420, there is an input filter for each phase of the three-phase line. Each filter includes an inductor Lfi and a capacitor Cfi. The input section 422 includes three charging sections, each similar to the charging sections used in the circuit of FIG. 19 and including an inductor Lini, a parallel arrangement of SCR's (i.e., SCRpi and SCRni) with opposite polarities, and a charge storage capacitor Ci. The parallel arrangement of SCR's allows the corresponding capacitor to be charge from either a positive or a negative voltage source. The charge redistribution section includes an inductor Lo connected to the three capacitors C1, C2, and C3, through a bridge circuit which includes a network of SCR's connected in the manner previously described.

Three input SCRs, one per phase are triggered during a charging period, resulting in a charge transfer as a consequence of the voltages changing in accordance with Eq. 2. In Tables 1 and 2, I have presented the voltages on capacitors C1–C3 for one such charging sequence occurring at a phase angle of 54 electrical degrees. To simplify, I have normalized the voltages and listed them as the ratio of the voltage of the capacitor to the maximum phase to neutral voltage Vo, as defined in Eq. 1. The first column identifies the parameter for which data is provide in the corresponding row. The second and third columns labeled initial and final, respectively, contain the "after" and the "before" capacitor voltages for the charge transfer sequence. The initial or "after" voltage is the voltage that exists on the capacitor at the start of the next charge transfer cycle. The 4th row contains a number which is proportional to the energy in the inductor Lo normalized to the total energy stored in the three capacitors. Finally, the bottom column identifies—by subscripts—the thyristors which are triggered on for each operation.

The control and trigger timing of the thyristors permit the redistribution of the energy in the capacitors from the final condition (see column 3) from the last charge transfer sequence to the next initial condition (see column 2) for the next capacitor charging sequence. There are several ways we can accomplish this with the circuit of FIG. 25. Two different illustrative sequences are described for the illustrated phase angle of 54 electrical degree. The first sequence given in Table 1 discharges all of the energy in a sequential way into the output inductor and then recharges the capacitor, using the inductor as a current source to yield the desired initial voltage for the next charge transfer with the three phase AC terminal. The discharging process follows the typical PCS rectification procedure described above and in U.S. Ser. No. 08/494,236, while the recharging process is similar to the charging process in the derectification process, described elsewhere in this document. The step by step procedure is presented in Table 1 as steps 1 through 5.

TABLE 1

Charge Transfer and Distribution Sequence #1

| Parameter | Initial | Final | step 1 | step 2 | step 3 | step 4 | step 5 |
|---|---|---|---|---|---|---|---|
| Vc1/Vo | 0.051 | 1.567 | 0.0 | 0.0 | 0.0 | 0.0 | 0.051 |
| Vc2/Vo | −1.438 | −0.389 | −0.389 | 0.0 | 0.0 | −1.438 | −1.438 |
| Vc3/Vo | 1.387 | −1.178 | −1.178 | −1.178 | 1.387 | 1.387 | 1.387 |
| $E_{ind}/E_{total}$ | 0.0 | 0.0 | 0.615 | 0.652 | 0.518 | 0.001 | 0.0 |
| SCRs | p1, p2, n3 | all off | 1p, rn | 2n, rp | 3n, rp | 2p, rn | 1n, rp |

Figure 26:
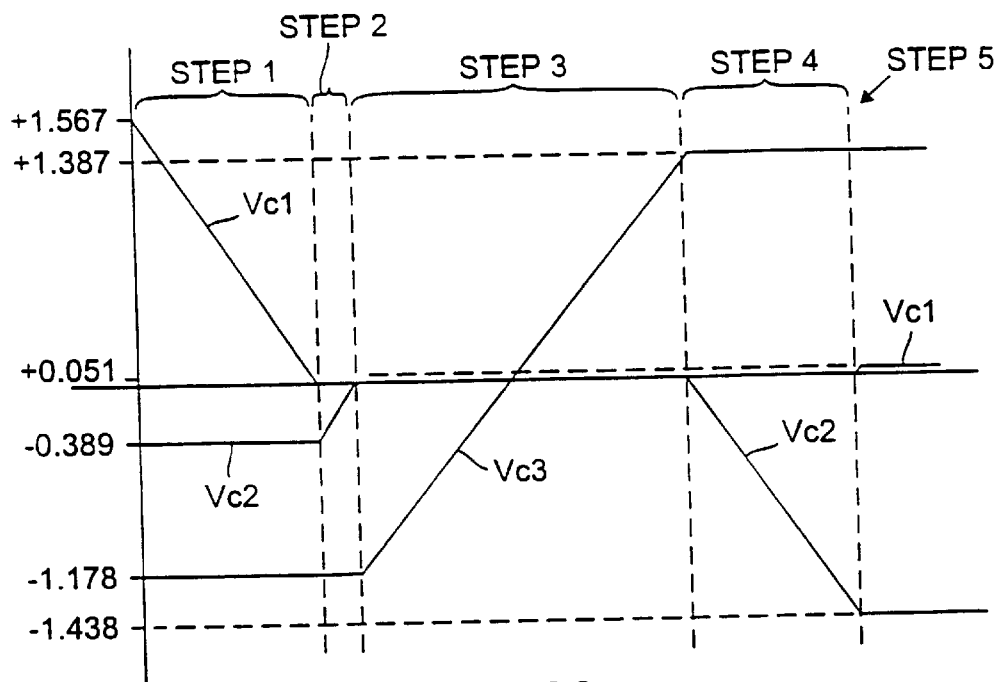
FIG. 26 shows a plot of the voltages in the static VAR circuit of FIG. 25 during one cycle of operation for the case that all capacitors are individually discharged before redistribution of charge takes place.

The operation of the circuit that is presented in Table 1 is also illustrated in FIG. 26 which shows how the capacitor voltages change in response to the triggering sequence presented in Table 1. It should be note, however, that for clarity the voltage transitions appearing in FIG. 26 are shown as being linear, when in reality they follow a curved paths that are characteristic of resonant charging and discharging processes. I will now explain the steps of the process shown in Table 1.

First, capacitor C1, which has the largest voltage, is discharged by triggering SCR1p and SCRrn (shown in Table 1 as 1p and rn) (step 1). Capacitor C1 will then begin to transfer its energy to inductor Lo and its voltage will drop towards zero. When the voltage across C1 reaches zero, we then trigger SCR2n and SCRrp which prevents the recharging of C1 and starts the discharging of C2 (step 2). Note that the triggering of SCR2n back biases SCR1p, thereby automatically turning off SCR1p (i.e., SCR1p is force-commutated). Capacitor C2 is permitted to discharge to zero voltage at which point SCR3n is turned on, thereby automatically turning off SCR2n and the flow of current into C2 and allowing C3 to discharge. When the voltage across C3 reaches zero, all of the energy that was originally in the three capacitors, C1, C2, and C3, will now be residing in the inductor Lo. C3 was selected to be the last discharging capacitor because a voltage polarity change is required in C3. In other words, we let C3 transition into a recharging mode and proceed until the voltage on capacitor C3 reaches its required voltage (i.e., 1.387). When the voltage of C3 reaches the correct level, SCR2p and SCRrn are triggered to terminate further recharging of C3 and to begin the recharging of C2 (step 4). This then completes the second recharging step. In step 4, C2 recharges to −1.1438 at which point, SCR1n and SCRrp are triggered to terminate the charging of C2 and begin the charging of C1 (step 5). At that point, there is only a small amount of energy left in the inductor and, assuming negligible losses, this will charge C1 to the final desired voltage. The current in the inductor Lo will go to zero and all of the SCRs will self-commutate off. Once the charge has been completely redistributed in the capacitors, the next charge interchange with the grid can take place after which the next cycle can start.

The advantage of this redistribution scheme is that it is conceptually simple. As can be seen from the operation the SCRs, the SCRrp and SCRrn can be replaced by diodes. Its disadvantage is that by discharging all of the capacitors, such as C1 and C2, the losses are potentially higher and more time may be required to complete the charge redistribution process. In this regard, note that five steps are required. I will next describe a second sequence that may be more efficient, uses fewer steps, and takes less time.

Figure 27:
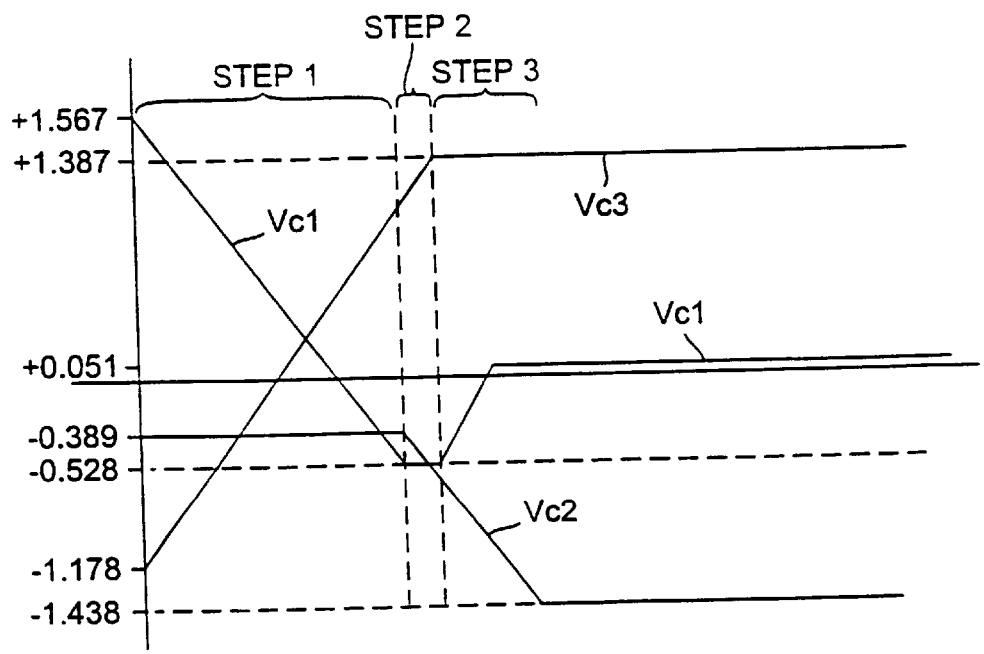
FIG. 27 shows another plot of the voltages in the static VAR circuit of FIG. 25 during one cycle of operation and for the case that two capacitors are discharged/charged simultaneously during each step.

A second redistribution sequence, which is presented in Table 2 and illustrated in FIG. 27, requires only three steps. In the first step, SCR1p and SCR3n are triggered on at the same time causing both capacitor C1 and C3 to discharge simultaneously (step 1). Notice that in this case the capacitors with the highest positive and highest negative voltages are selected to begin the charge redistribution process. As capacitors C1 and C3 discharge, current builds up in the inductor Lo. The voltage on C1 decreases to zero and C1 then recharges to a negative polarity. Since we cannot turn SCR1p off at its desired voltage of +0.051 volts, we let it continue to discharge and then recharge until it reaches about −1.567 volts. At this point, the voltage on C3 will be 0.916 volts. We now trigger SCR2p (step 2). This will back bias SCR1p and stop the recharging of C1 and it cause the charging of C2 and C3. As the voltage on C3 reaches its desired voltage of 1.387, we trigger SCR1n to turn off the charging of C3 and to begin charging C1 to a positive voltage (step 3). At this time, both C1 and C2 are charging. We let this charging process go to completion and obtain a final voltage of 0.051 volts on C1 and −1.438 volts on C2. At that point, all of the energy from the inductor Lo has been dumped back into the capacitors, the current through Lo begins to reverse and all of the SCRs self-commutate to off, thereby permitting the next charge interchange with the AC grid.

TABLE 2

Charge transfer and Distribution Sequence #2

| Parameter | Initial | Final | step 1 | step 2 | step 3 |
|---|---|---|---|---|---|
| Vc1/Vo | 0.051 | 1.567 | −0.528 | −0.528 | 0.051 |
| Vc2/Vo | −1.438 | −0.389 | −0.389 | −0.859 | −1.438 |
| Vc3/Vo | 1.387 | −1.178 | 0.916 | 1.387 | 1.387 |
| $E_{ind}/E_{total}$ | 0.0 | 0.0 | 0.662 | 0.263 | 0.0 |
| SCRs | p1, p2, n3 | all off | 1p, 3n | 2p, 3n | 2p, 1n |

The second sequence (Table 2) is faster and more efficient than the first sequence (Table 1). First, the charge flows only through half as many solid state devices. Second, the energy in the capacitors is not completely discharged, as can be seen in the 4$^{th}$ row. Third, the number of steps is reduced from 5 to 3. In addition, the distribution bridge circuit can be reduced to a total number of six SCRs by eliminating SCRrp and SCRrn, which are not needed.

The triggering sequences given in the 5th row remain the same over a phase angle of 60 degrees, and only the timing needs to be changed. For each subsequent sixty degree phase angle, the SCR designations have to be permutated. Also, the three step operation can be utilized over the complete AC cycle.

It should be understood that the above-described triggering sequences are by no means the only workable sequences. Other triggering sequences, which can be readily determined by persons skilled in the art, exist and can also be used. In any case, the main objective is to redistribute the charge in the capacitors so that the next charge transfer with the AC system can take place. Moreover, it may be desirable that the sequence of triggering be selected so that the switches self-commutate off. If self-commutation is not necessary or desired (for example, if switches such as GTO's are used which can be turned off), then other triggering sequences can be used.

Active Harmonics Filter

For a balanced system, a PSC/SVC does not need to store and inject energy, since the combined power flow of all three phases is zero. This also applies for the harmonics power flow for the 3rd, 6th, 9th, etc. harmonics. It follows that one can combine the VAR and harmonic correction for harmonics that are a multiple of three, and the circuit and the triggering sequences described in the previous section, can be used.

For the remaining harmonics, however, power must be stored and re-injected into the AC system during a complete AC cycle. This requires energy storage that must be sufficient to satisfy the total energy fluctuations which will occur. Obviously, both a voltage source inverter and a current source inverter may be used for harmonics mitigation. In a voltage source inverter, the size of the capacitor must be selected to meet the power fluctuations. To store energy in a current source inverter, the energy has to be stored in the inductor with current flowing all the time.

Figure 28:
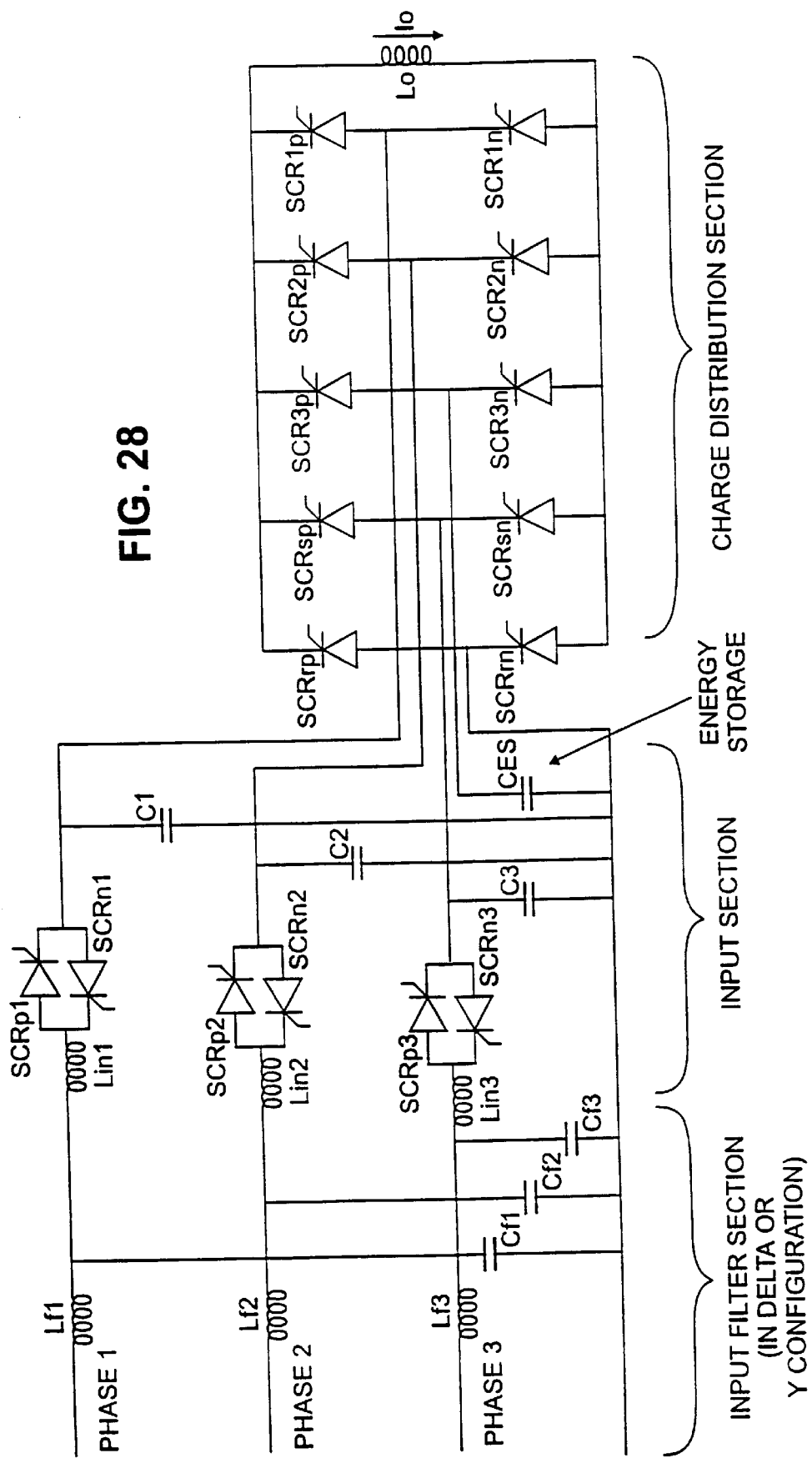
FIG. 28 is a schematic of an active harmonic filter circuit.

A third approach is to modify the PCS/SVC current source inverter to permit its operation in the current source mode while also adding capacitor energy storage. Such a circuit is shown in FIG. 28 and its operation is described below. This circuit is identical to the circuit of FIG. 25 except for the addition of Ces to store energy that can be injectd back into or extract from the capacitors C1, C2, and C3 through two SCR's, i.e., SCRsp and SCRsn. This is only one of several circuit configurations that can be used. The basic process involves a first cycle during which charge is interchanged between the grid and a set of charged capacitors, and a second cycle during which the energy in the charged capacitors is redistributed. During the redistribution cycle, energy is either absorbed or supplied, depending on what the capacitor voltage distribution requires. The charge storage in the capacitors appears to yield good efficiency and can be implemented using commercially available components.

With the harmonics give by:

$$I = \sum_{n=2}^{m} I_n \sin(n\omega t) \quad \text{Eq. 32}$$

the initial capacitor voltage requirement is:

$$V_i = V_o \sin(\omega t) - V_o \sum_{n=2}^{m} \left(\frac{I_n}{I_o}\right) \sin(n\omega t) \quad \text{Eq. 33}$$

This results in a final capacitor voltage of:

$$V_f = V_o \sin(\omega t) + V_o \sum_{n=2}^{m} \left(\frac{I_n}{I_o}\right) \sin(n\omega t) \quad \text{Eq. 34}$$

Following a charge interchange, the energy in the capacitor is given by Eq. 34. The new initial voltage requirement for the next interchange is given by Eq. 33. Since this interchange occurs at t+Δt, where Δt is the interval between charge interchanges, the initial voltage has to be computed for the next interchange. Performing the same computation for the other two phases, by replacing ωt with ωt−π2/3 and ωt−π5/3, respectively, produces the complete set of initial voltages for the next charge transfer condition. With this information, we can determine the net increase and or decrease of the energy for this specific interchange. If a net energy absorption is required, energy will be deposited in the energy storage capacitor Ces or if a net energy increase is required, energy will be released from the energy storage capacitor Ces.

The energy redistribution in the three capacitors is similar to the PSC/SVC operation described above. Conceptually, the simplest redistribution sequence would follow the process in Table 1 where all of the capacitors are being discharged into the inductor Lo during the first half of the distribution cycle. With the three normalized voltages being 1.567, −0.389, and −1.178 and with the energy storage capacitor voltage Ves/Vo being 1.00, we may proceed to the step 1 sequence by first extracting the necessary energy from Ces by triggering SCRsp and SCRrn. As soon as the additional energy for the next charge transfer has been extracted, we trigger SCR1p to terminate the energy extraction from Ces, shut off SCRsp, and proceed with the complete extraction of the three charge exchange capacitor. The only requirement is that the capacitor discharged after the energy extraction from Cep has an absolute voltage higher than the Ces voltage. The recharging of the capacitor can proceed in the same order and if the extracted energy and the computation was correct the desired voltage level will be obtained.

On the other hand, if energy needs to be absorbed from the set of three capacitors, we insert a charge sequence by triggering SCRsp. For the conditions shown in Table 1, such a sequence may, for example, be inserted between step 3 and step 4 or between step 4 and step 5, if the normalized voltage of Ces is on the order of 1.0.

Similar analysis indicates that either extraction or deposition cycles can be inserted into the second sequence described in Table 2. The importance is that the capacitor size and voltage requirements must be such that the Ces voltage is in the average capacitor range. With the capacitor voltage identified, the capacitor value must reflect the magnitude of the total harmonics correction requirement. This circuit can operate with either positive or negative voltage polarity.

The utilization and integration of an energy storage circuit, as described above, is not limited to the harmonics mitigation operation but can be also used for several other functions. This includes the simplified AC to AC frequency changer covered in the next section, UPS and SVC. In the SVC, VAR level changes requiring a change of energy in the working capacitors, as given by Eq. 17, may be implemented more effectively.

Simplified AC—AC Converter

Figure 29:
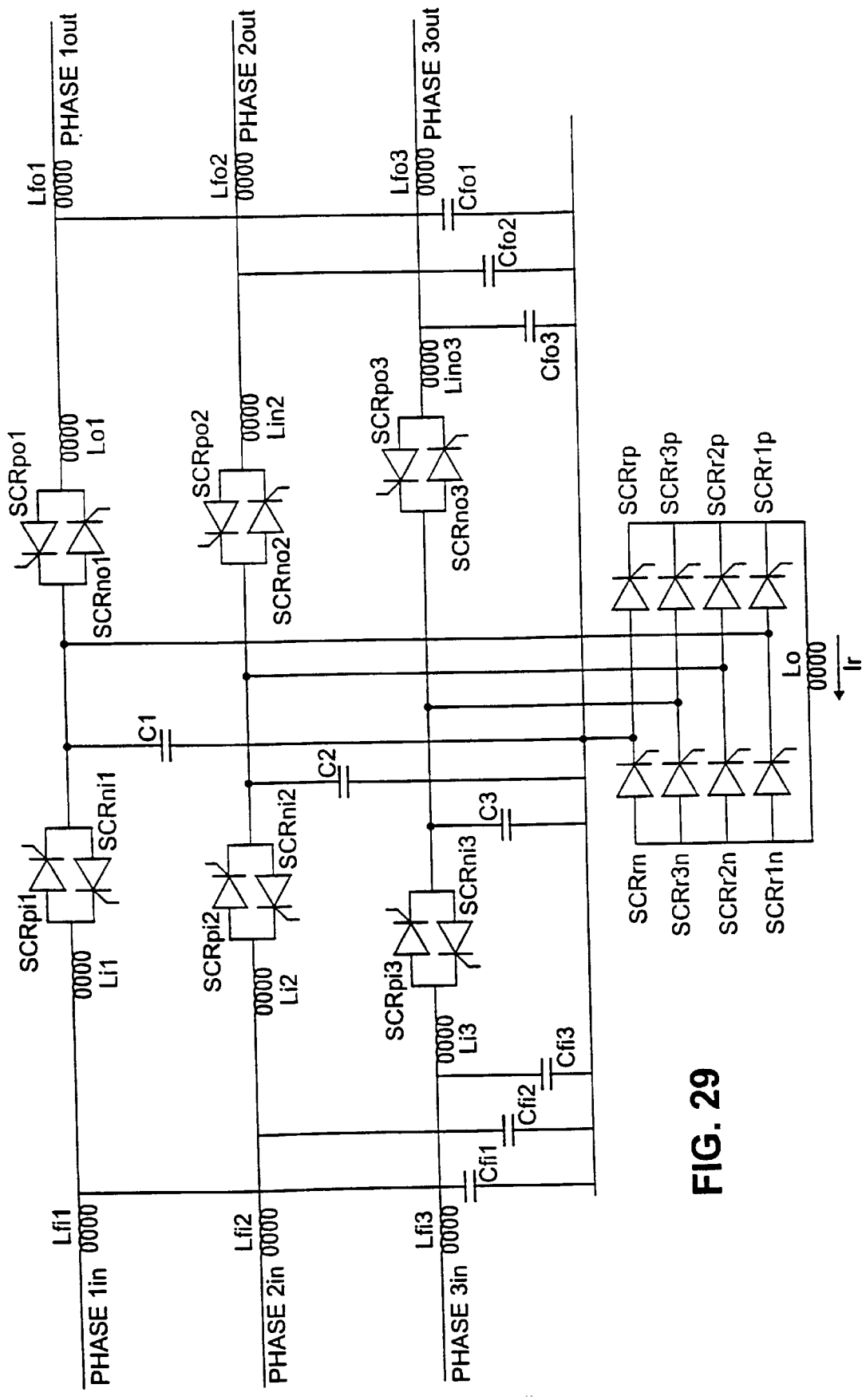
FIG. 29 is a schematic of a simplified AC to AC frequency changer circuit.

For the SVC application shown in FIG. 25, the three capacitor voltages and energy are redistributed for the next charge interaction with the input grid. The redistribution does not produce any energy change and, during the redistribution phase, the voltages in all three capacitors are shifted in phase by a specific number of electrical degrees. The change in the electrical angle is the difference between the phase angle of the initial voltage and the final voltage. For the SVC, the phase angle change is two times the expression given by Eq. 31. However, with the redistribution technique described above, we may change the phase angle from any phase angle to any other phase angle with a phase angle difference from zero to 360 electrical degrees. This permits us to configure a frequency changer as shown in the simplified schematic as shown in FIG. 29. This circuit is the same as the circuit shown in FIG. 25 but with the addition of a derectification section added at its output to inject power onto a second grid. In other words, rather than simply feeding the energy back onto the original grid, as was the case for the circuit of FIG. 25, we inject it onto another grid and at the frequency used on that grid (which may be different from the frequency used on the first grid).

After charging the three capacitors from the input grid, starting with either residual voltage or no residual voltage on the capacitors, we redistribute the energy in these capacitors to obtain a voltage to match the phase of the desired three phase output. With the redistribution complete, the additional SCR's SCRjoi can be used to discharge the capacitor energy into the output. This permits the reconstruction of a multiphase AC output with any frequency and any phase. In addition to the output filter shown, we may add freewheeling SCR's to add full power transfer control or further residual energy control.

The circuit shown may be used to transfer real power from one end to the other end. This requires a charge cycle from the input, a redistribution of the energy stored in the three capacitors to yield both the correct energy and voltage polarity, and a discharge cycle to the designated output. Both real and reactive power can be controlled on either end by adding an additional redistribution cycle between the discharge cycle and the next charge cycle. The energy for this redistribution cycle may originate from an incomplete discharge or by drawing reactive power from the output. The redistribution of the energy can be performed to aid the control of both real and reactive power demand of either the input or output or both.

Since the circuit can be configured to be symmetrical, it should be obvious that the power flow can be bidirectional. Using residual voltage, power flow can be also provided and controlled originating from an input power source having a voltage that is lower than the output voltage. The basis of this requirement is given above.

In addition to the real power transfer and VAR control, we may implement harmonic cancellation and harmonic current injection as has been described in previous section. Both the charge and discharge consists of a charge transfer between a set of capacitors and a multiphase AC terminal. This interchange may be configured to operate in any mode of operation, as described above. In addition, it should also be obvious that the charge interchange is not restricted to two AC terminals system. For example, an additional input would permit the power transfer between three terminals, with a two bus input and one bus output an instantaneous input bus transfer may be implemented should a problem with the power supply of one bus occur. In addition, power can be drawn in any power ratio from the two inputs or power transfer may be performed over any selected time.

Further Techniques for Real and Reactive Power Flow Control

If the PCS system transfers power from either an AC or DC source and injects that power into an existing AC network it is desirable to transfer only real power to that system. It follows that the system into which the power is injected will handle the reactive power of the load. However, if we reconstruct an AC waveform and no other means is available to source the reactive power by the line or the load, then the system must supply both the real and the reactive power.

Figure 30:
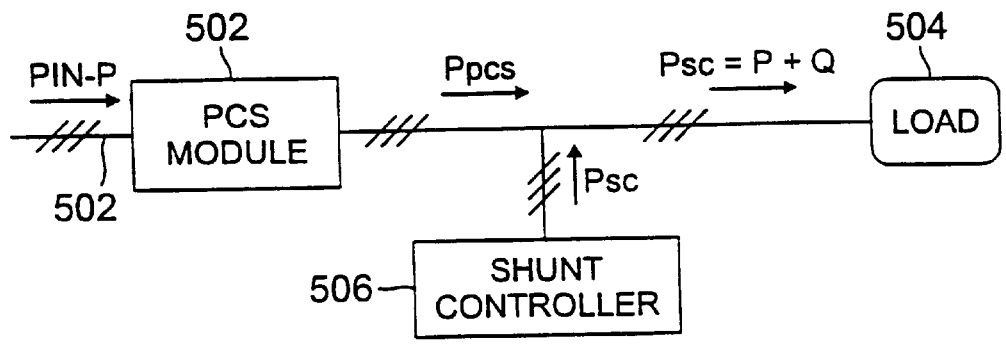
FIG. 30 is a block diagram of power flow control system.

FIG. 30 shows a block diagram of a basic PCS flow control configuration with real power P drawn from the left. The configuration includes a PCS module 500, a multi-phase power line 502, a load 504, and a shunt controller 506. Power (P) may be AC or DC and may go through a voltage transformation process provided by the PCS module 500.

The power provided by the PCS module 500 and the shunt controller 506 has to supply both the real and reactive power for the load 504. This can be expressed mathematically in the following form:

$$P_{PCS}+P_{SC}=P+Q \qquad \text{Eq. 35}$$

where $$P=3^{1/2}I_L V_L \cos(\theta) \qquad \text{Eq. 36}$$

$$Q=3^{1/2}I_L V_L \sin(\theta) \qquad \text{Eq. 37}$$

$$P_\phi(t)=V\phi I_o \sin^2(\omega t) \qquad \text{Eq. 38}$$

$$Q_\phi(t)=V\phi I_r \cos(\omega t)\sin(\omega t) \qquad \text{Eq. 39}(a)$$

$$=V\phi I_r \sin(2\omega t)/2 \qquad \text{Eq. 39}(b)$$

Figure 31:
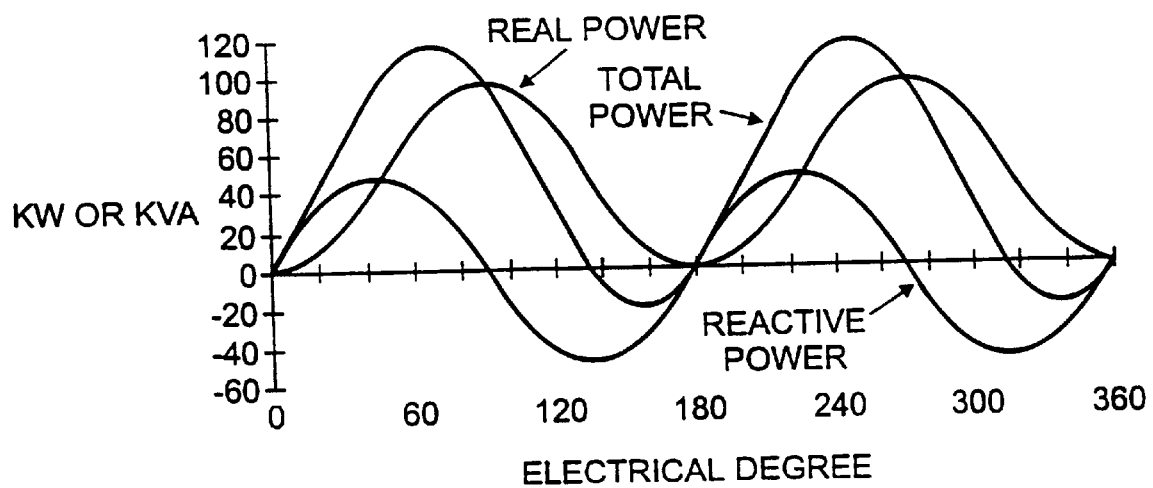
FIG. 31 is a plot of real and reactive power flow.

Eqs. 38 and 39 give the time dependent terms of the real and reactive power of one phase, where $V\phi$ is the maximum phase to neutral voltage, and $I_o$ and $I_r$ are the maximum real and reactive currents, respectively. As an example, real power, reactive power and total power are plotted in FIG. 31. The important point is that the real power term is only positive, indicating that real power is flowing only to the load; while the reactive power flow oscillates back and forth to the load at twice the line frequency ($2\omega t$).

In principle, both mathematically and also from a circuit and component point of view, the PCS module can be configured to supply both real and reactive power. This, of course, completely eliminates the need for a Shunt Controller. However, this is not too practical for both high power applications that require voltage transformation. The reverse power requires additional PCS cycles, thus reducing the power throughput. In addition, the losses are significantly increased.

Full Static VAR Operation

Another option is to configure the shunt controller 506 as a static VAR compensator (SVC), as described above. It follows that the power P that is supplied by the PCS module 500 and the shunt controller 506 do not have to be coordinated and the devices can be separated. However, it is practical to have them share the same output filter and to synchronize both units to minimize filter requirements. Synchronization is easily accomplished by using the same controller to control both modules. The coordination and control is desirable if no real power is drawn from the filter and the capacitive elements draw reactive power, allowing the voltage and the frequency to be maintained. In this case, the shunt controller 506, in its SVC mode, supplies the reactive power and it supplies the timing required to maintain the specified frequency. The PCS module 500, on the other hand, monitors the real load requirements and maintains the output voltage at the specified output voltage. Under this condition, the shunt controller 506 supplies the reactive power and maintains the oscillatory waveform, by recirculating the reactive power between the three phases at the desired frequency.

Negative Power Shunt Control Operation

Figure 32:
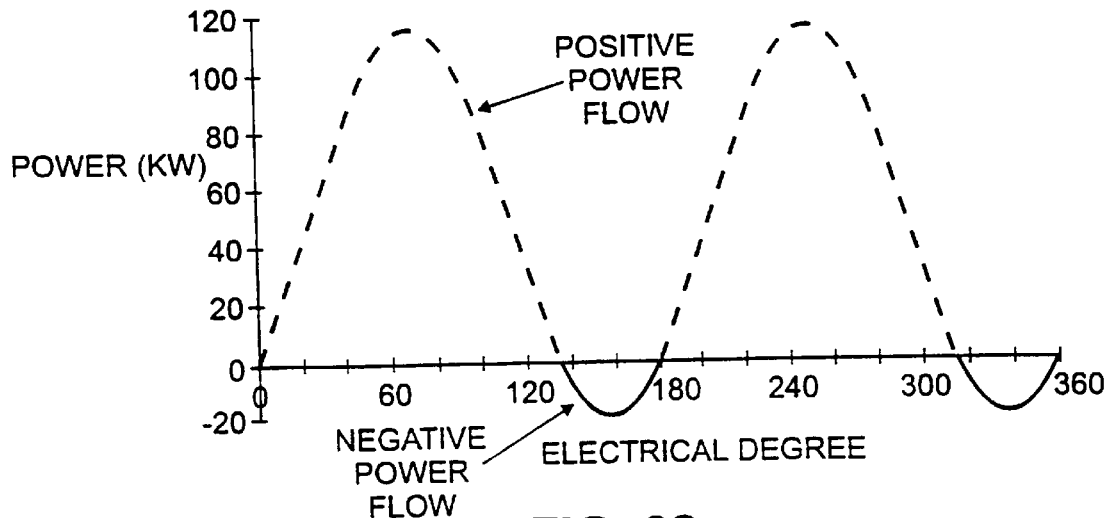
FIG. 32 is a plot of total power flow for one phase showing a period during which negative power flow occurs.

FIG. 32 shows the total power flow of one phase to the output load with the reactive power being of the order of the real power. The total power, as shown per phase, is positive if the sum of the reactive and real power to the load is positive. This implies that power is flowing to the load and that all of that power can be delivered by the PCS module. On the other hand, if the sum is negative, the power flow is from the inductive part of the load back to the source. In this operating mode, either the PCS module or the shunt controller has to absorbed that returning power in order to maintain a sinusoidal waveform.

As shown, only a small fraction of net power has to circulate back to the power source. It is significantly less than the reactive power recirculated by the SVC above. In the interest of efficiency, the shunt controller 506 can be operated to only absorb the negative power returning from the load (shown below the base line in FIG. 32). The power absorbed by the shunt controller 506 from the phase shown is being re-injected into one or both of the other two phases. To yield the total positive power flow for each phase, as shown above the baseline, the PCS module output provides the rest of the positive power flow. The operation of both the shunt controller and the PCS module are coordinated and synchronized.

The synchronization reduces the current flow requirements through the shunt controller and with it, reduces the losses. On the other hand, positive power flows through the PCS Module at maximum efficiency.

Figure 33:
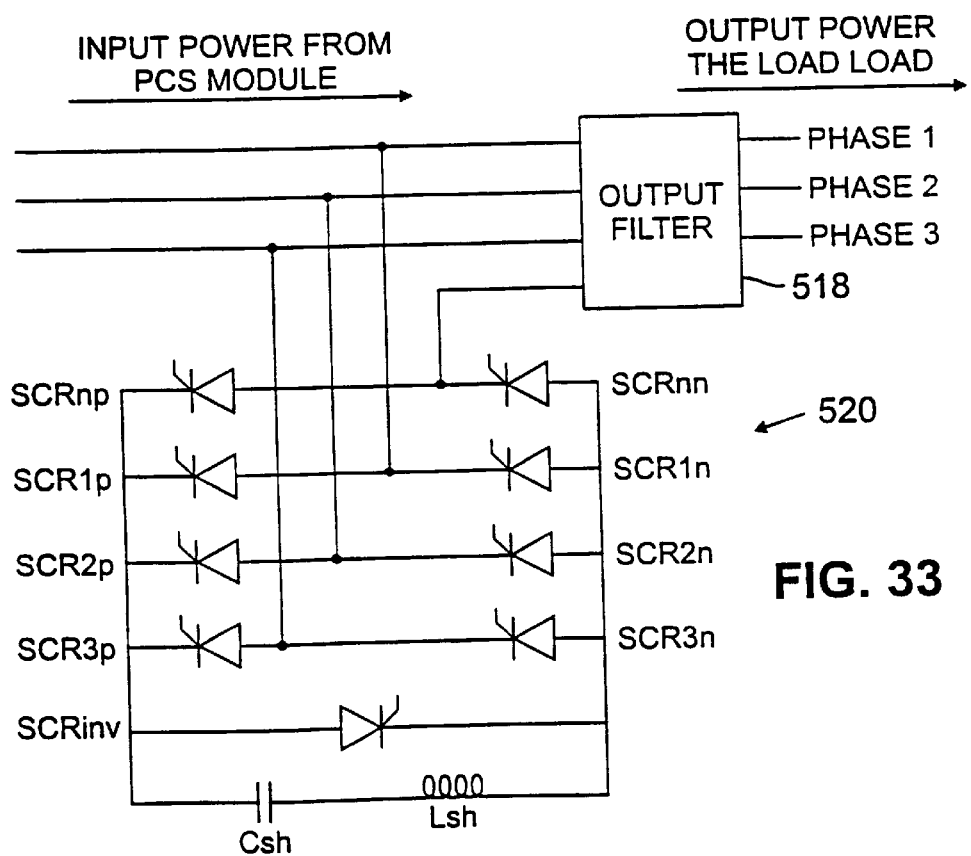
FIG. 33 is a schematic of a redistribution network.

If the shunt controller is used as an SVC, it can also be used as a negative power controller. In addition, an SVC can also perform harmonics correction in both the SVC mode and the Negative Power flow Control (NPC) mode. If only shunt control is required, however, with the real and reactive load being of equal magnitude, the shunt controller can be simplified and reduced in cost by reducing the component count, since only the energy that is absorbed from one phase will be re-injected into another phase. FIG. 33 shows such a simplified shunt controller. In this configuration it is assumed that an output filter 518 is shared by both PCS module and the shunt controller. The shunt controller includes a bridge circuit 520, similar to those described before, and it includes a shunt capacitor Csh in series with an inductor Lsh. An inverting SCR SCRinv is connected in parallel with the series connected Csh and Lsh.

The bridge circuit 520 permits the extraction of the negative flowing power out of the filter, with the line voltage at either a positive or a negative potential. The energy deposited in the capacitor Csh from one of the lines is then re-injected into one of the two other lines following an inversion using SCRinv. A multiple charge cycle may be adopted to build up the voltage in Csh to eliminate re-injection voltage issues. However, this should not be a problem for most applications. What is of importance is that the charge, discharge, and inversion cycles use Lsh. Each cycle may yield a complete half cycle waveform. This operation is compatible with high voltage thyristors and their higher tq and does not require inverter grade thyristors.

This type of shunt controller is only applicable if the period of the negative power is 60 electrical degree or less. This is not a full SVC and is to be used in conjunction with a PCS module. The PCS module could be a derectification module or AC to AC module with or without transformation. Its cost simplicity and high overall electrical efficiency will make it both technically and economically attractive.

Direct reactive power control of a Derectification Module

As described above, FIG. 20 illustrates the basic circuit of a derectification module. Two such modules can be run in parallel for a 144 kVA variable speed motor drive application. For operation at low output frequency, the voltage waveform will be satisfactory without the need for full static VAR support. However, at 80 Hz operation, voltage distortion are more likely to occur which may or may not influence the performance of the motor.

In applications where no voltage transformation is performed, the basic derectification circuit can be used to fully support the VAR or negative power follow provided the negative power flow does not extend over more than 60 electrical degrees. I will discuss this mode of operation using the circuit of FIG. 20.

Figure 34:
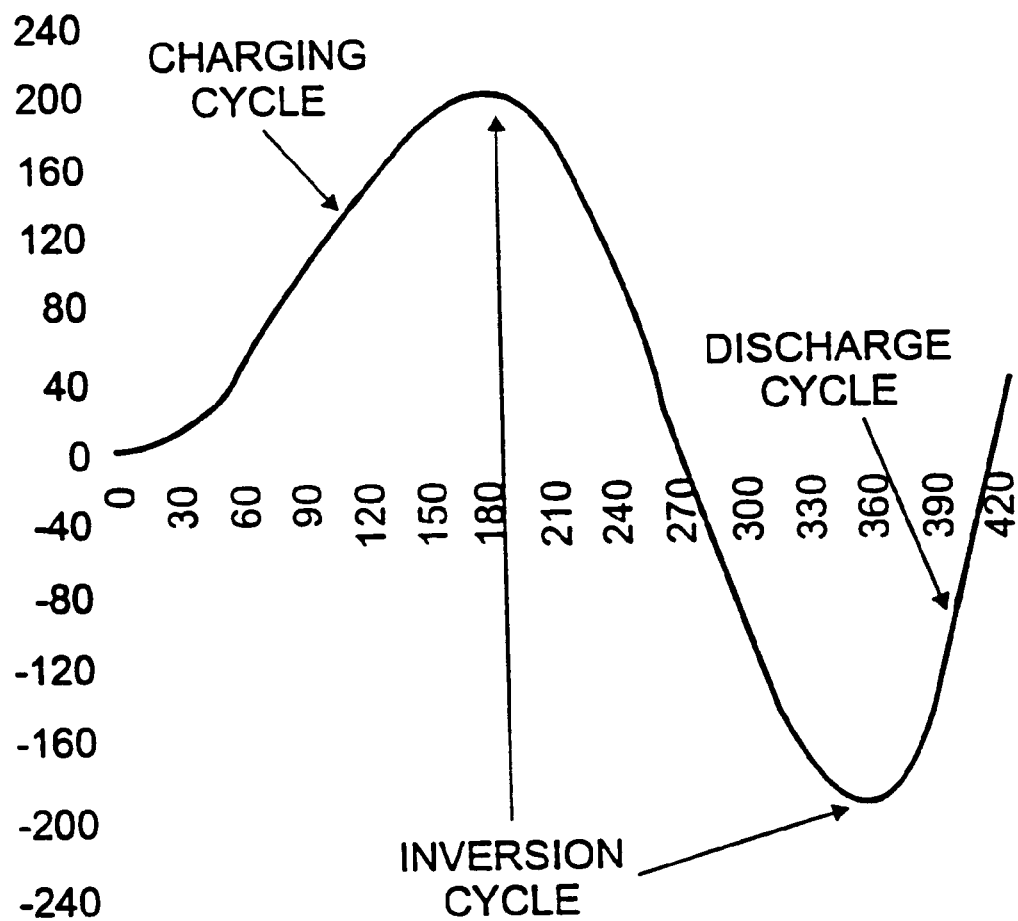
FIG. 34 is a plot of the voltage across Cm1 in the derectification circuit of FIG. 20.

FIG. 32, shows the real, reactive and total power requirement for a reactive load of phase 1. The real power requirements can be met by sequentially charging the capacitors to the correct voltage ratio from the DC input source. We will focus on the negative power flow requirement of phase 1 over the range of 134 to 180 and 314 to 360 electrical degrees. Over the first range, the voltage is positive and becomes zero at the 180 degree point. To draw power from the filter capacitor, SCRo1n is triggered to back-charge Cm1 to a positive value, as shown in the plot of FIG. 34. If the residual voltage was zero (note: this is not absolutely necessary), the capacitor voltage will be twice that of the output filter voltage. Next SCRv1 is triggered to invert the polarity of Cm1. This yields a negative capacitor voltage. We next perform the sequential charging process of all three capacitors by first triggering SCRin1. This discharges the Cm1 capacitor until the voltage is zero followed by a recharge to a positive polarity. SCRin1 is turned off by triggering either SCRin2 or SCRin3 and Cm1 having a slightly positive potential. Capacitor Cm1 is almost completely discharged and the charging of the Cm2 and Cm3 proceeds to the desired voltage level. The energy of Cm1 was momentarily transferred to the Lin inductor and then distributed to Cm2 and Cm3 capacitors. The initial current caused by the Cm1 energy discharge will cause a net energy input to the other two capacitors. The desired output power can be obtained by adjusting the interpulse duration and the energy ratio between Cm2 and Cm3. Also, energy transfer flexibility can be obtained by controlling the remaining Cm1 voltage, through the discharge timing.

The operation requires three cycles, with one being synchronized with the charging of the other two phases. Since the other two phases require also three cycles, the reverse power flow does not increase the total time of the derectification process. Going through a similar process over the 314 to 360 degree range yields similar results. However, since the voltage on capacitor Cm1 is negative the inversion cycle is not needed reducing it to a total of two cycles.

In summary, the real and reactive power can be supplied to a load using the circuit of FIG. 20 provided that the extent of the negative power flow is less than 60 degrees. Since most AC loads fall into this category, this approach can be used without an increase of additional hardware. Adding the control for the negative power section will only require the modification of the derectification control algorithm.

It should be understood that the charge transfer cycles described herein typically occur at a frequency that is higher than 60 Hz, e.g 1 kHz and above. In other words, the frquency f that was referred to above is greater than 60 Hz and usually greater than about 1 kHz.

Other embodiments are within the following claims. For example, though the sequential discharge technique has been described in the context of rectification, it can also be used to reconstruct AC waveforms of any frequency and/or phase. The triggering sequence that is generated by the control module would, of course, have to be different and would likely be more complicated; however, the principles are the same.

The desired rate of the charging and discharging dictate the values of the L and C components that are used in the circuit. In the described embodiment, the inductors on the input side and the inductors on the output side have been described as having the same value. This, however, need not be the case.

I claim:

1. A system for controlling VAR of a multiphase grid, said system comprising:
    a plurality of charge storage elements;
    a plurality of charge transfer circuits each connected to a corresponding phase of the multiphase grid and to a corresponding one of the plurality of charge storage elements; and
    a charge redistribution circuit connected to the plurality of charge storage elements, wherein during operation the charge redistribution circuit redistributes charge among the plurality of charge storage elements.

2. The system of claim 1 further comprising a controller which operates the plurality of charge transfer circuits and the charge redistribution circuit, wherein during operation the controller causes the plurality of charge transfer circuits to transfer charge to the plurality of charge storage elements, causes the charge redistribution circuit to redistribute the charge that was transferred to the plurality of charge storage elements, and causes the charge transfer circuit to transfer the redistributed charge to the grid.

3. A power flow control system for connecting to a multiphase grid, said system comprising:
    a plurality of charge storage elements;
    a plurality of charge transfer circuits each connected to a corresponding phase of the multiphase grid and to a corresponding one of the plurality of charge storage elements;
    a charge redistribution circuit connected to the plurality of charge storage elements, wherein during operation the charge redistribution circuit redistributes charge among the plurality of charge storage elements; and
    a controller which operates the plurality of charge transfer circuits and the charge redistribution circuit, wherein said controller controls the power flow into the system by establishing non-zero current initial conditions on the plurality of charge storage elements prior to a charge transfer cycle during which charge is exchanged between the grid and the charge storage elements.

4. A derectification system for generating from a power source a multiphase AC output onto a grid, said system comprising:
    a plurality of charge transfer elements;
    a first charge transfer circuit which charges the plurality of charge storage elements from the power source;
    a second charge transfer which transfer charge between the plurality of storage elements and the multiphase grid; and
    a controller which operates the first and second charge transfer circuits, wherein the controller causes the first transfer circuit to sequentially charge the plurality of charge storage elements to respective different voltages and in order of increasing voltage, starting with the charge storage element with the lowest voltage and ending with the charge storage element with the highest voltage.

5. In a system including a plurality of charge storage elements that are coupled to a power source through a circuit which includes an inductor, a method of generating a multiphase AC output onto a grid, said method comprising:
    sequentially transferring charge between the power source and each of the plurality of charge storage elements so that each of said charge storage elements is characterized by a voltage corresponding to the charge stored therein; and transferring charge between each of said plurality of charge storage elements and a corresponding one of said phases on said grid, wherein the process of sequentially transferring charge is performed in order of increasing voltage of the charge storage elements.

6. In a system which includes a plurality of charge storage elements, a method of controlling power flow between a multiphase grid and said system, said method comprising:

establishing non-zero current initial conditions in the plurality of charge storage elements; and after establishing non-zero current initial conditions in the plurality of charge storage elements, transferring charge between the multiphase grid and the plurality of charge storage elements.

* * * * *